United States Patent
Kaji et al.

(10) Patent No.: US 11,148,683 B2
(45) Date of Patent: Oct. 19, 2021

(54) VEHICLE CONTROL SYSTEM, VEHICLE CONTROL METHOD, AND PROGRAM

(71) Applicant: HONDA MOTOR CO., LTD., Tokyo (JP)

(72) Inventors: Toshiyuki Kaji, Wako (JP); Yoshifumi Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 43 days.

(21) Appl. No.: 16/617,005

(22) PCT Filed: May 23, 2018

(86) PCT No.: PCT/JP2018/019840
§ 371 (c)(1),
(2) Date: Nov. 26, 2019

(87) PCT Pub. No.: WO2018/221350
PCT Pub. Date: Dec. 6, 2018

(65) Prior Publication Data
US 2021/0146954 A1      May 20, 2021

(30) Foreign Application Priority Data

Jun. 2, 2017  (JP) .............................. JP2017-110185

(51) Int. Cl.
*B60W 60/00*   (2020.01)
*B60W 10/20*   (2006.01)
(Continued)

(52) U.S. Cl.
CPC .......... *B60W 60/005* (2020.02); *B60W 10/20* (2013.01); *B60W 30/12* (2013.01);
(Continued)

(58) Field of Classification Search
CPC .. B60W 60/005; B60W 30/143; B60W 50/14; B60W 60/001; B60W 30/12;
(Continued)

(56) References Cited

U.S. PATENT DOCUMENTS

| 8,352,110 B1 | 1/2013 | Szybalski et al. |
| 2015/0094896 A1* | 4/2015 | Cuddihy .......... H04N 21/41422 701/23 |

(Continued)

FOREIGN PATENT DOCUMENTS

| JP | 2010-000949 | 1/2010 |
| JP | 2016-115356 | 6/2016 |

(Continued)

OTHER PUBLICATIONS

Japanese Office Action for Japanese Patent Application No. 2019-522157 dated May 26, 2020.

(Continued)

*Primary Examiner* — Thomas Ingram
(74) *Attorney, Agent, or Firm* — Amin, Turocy & Watson, LLP

(57) ABSTRACT

A vehicle control system includes an operation detector configured to detect that an operation element has been operated by an occupant, an automated driving controller configured to execute automated driving control, a switching controller configured to switch a driving mode to one of a plurality of driving modes including a first driving assistance mode and a second driving assistance mode, and an output controller configured to cause an information outputter to output prescribed information when the driving mode is switched from the second driving assistance mode to the first driving assistance mode. The switching controller continues the second driving assistance mode until it is detected that the operation element has been operated after the prescribed (Continued)

information is output and switches the driving mode to the first driving assistance mode by cancelling the second driving assistance mode when it is detected that the operation element has been operated.

6 Claims, 35 Drawing Sheets

(51) Int. Cl.
*B60W 30/12* (2020.01)
*B60W 30/14* (2006.01)
*B60W 50/14* (2020.01)

(52) U.S. Cl.
CPC .......... *B60W 30/143* (2013.01); *B60W 50/14* (2013.01); *B60W 60/001* (2020.02); *B60W 2050/146* (2013.01); *B60W 2420/42* (2013.01); *B60W 2420/52* (2013.01)

(58) Field of Classification Search
CPC ............. B60W 10/20; B60W 2420/42; B60W 2420/52; B60W 2050/146
See application file for complete search history.

(56) References Cited

U.S. PATENT DOCUMENTS

2018/0157256 A1\* 6/2018 Oniwa ................. G05D 1/0061
2020/0406922 A1\* 12/2020 Yamanouchi ....... B60W 60/005

FOREIGN PATENT DOCUMENTS

| JP | 2016-137819 | 8/2016 |
| WO | 2016/181725 | 11/2016 |

OTHER PUBLICATIONS

International Search Report and Written Opinion for International Application Serial No. PCT/JP2018/019840 dated Jul. 17, 2018, 7 pages.
Japanese Office Action for Japanese Patent Application No. 2019-522157 dated May 25, 2021.

\* cited by examiner

FIG. 15
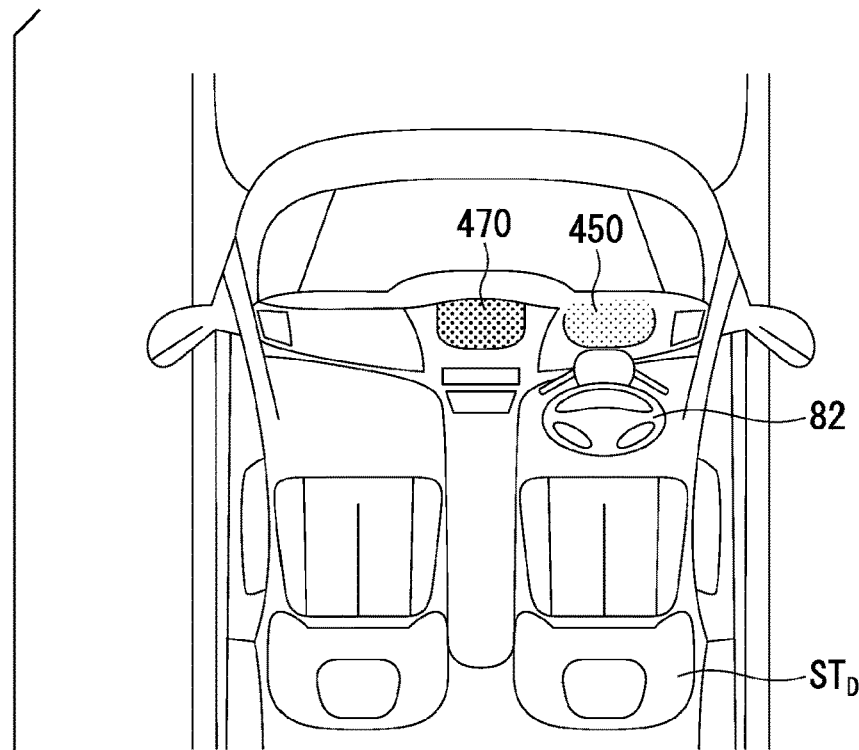
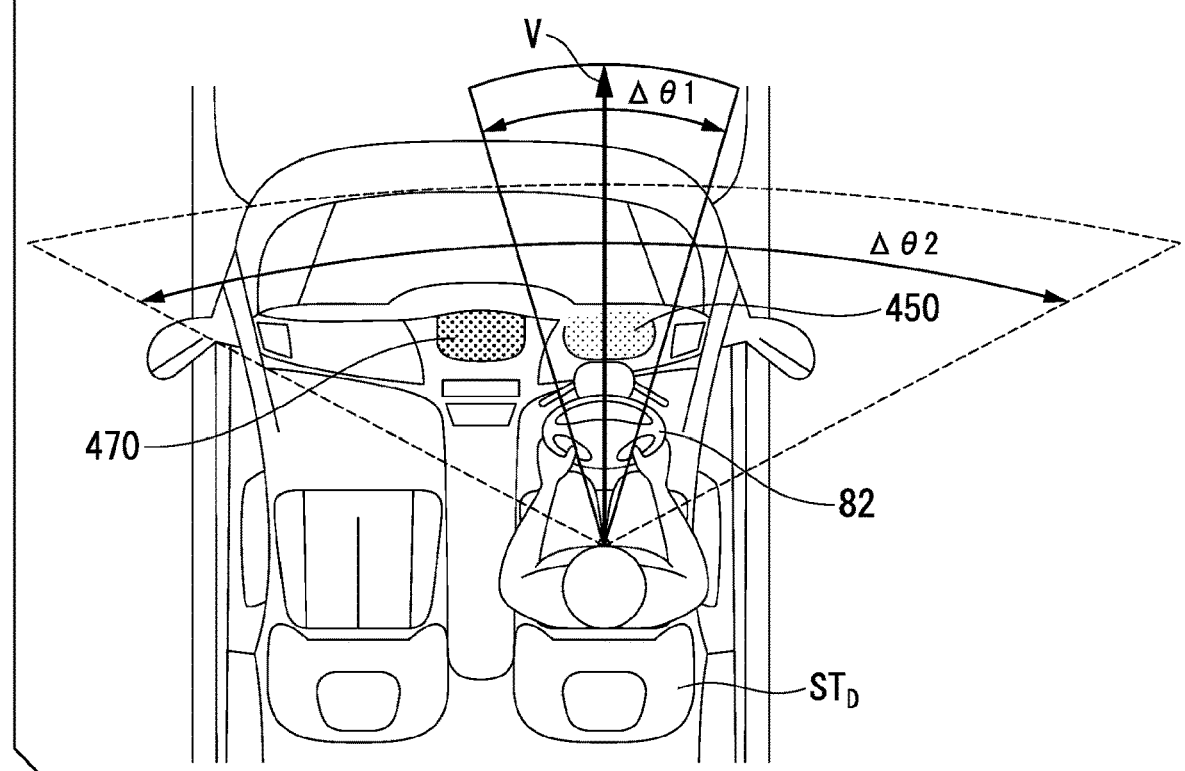

FIG. 18
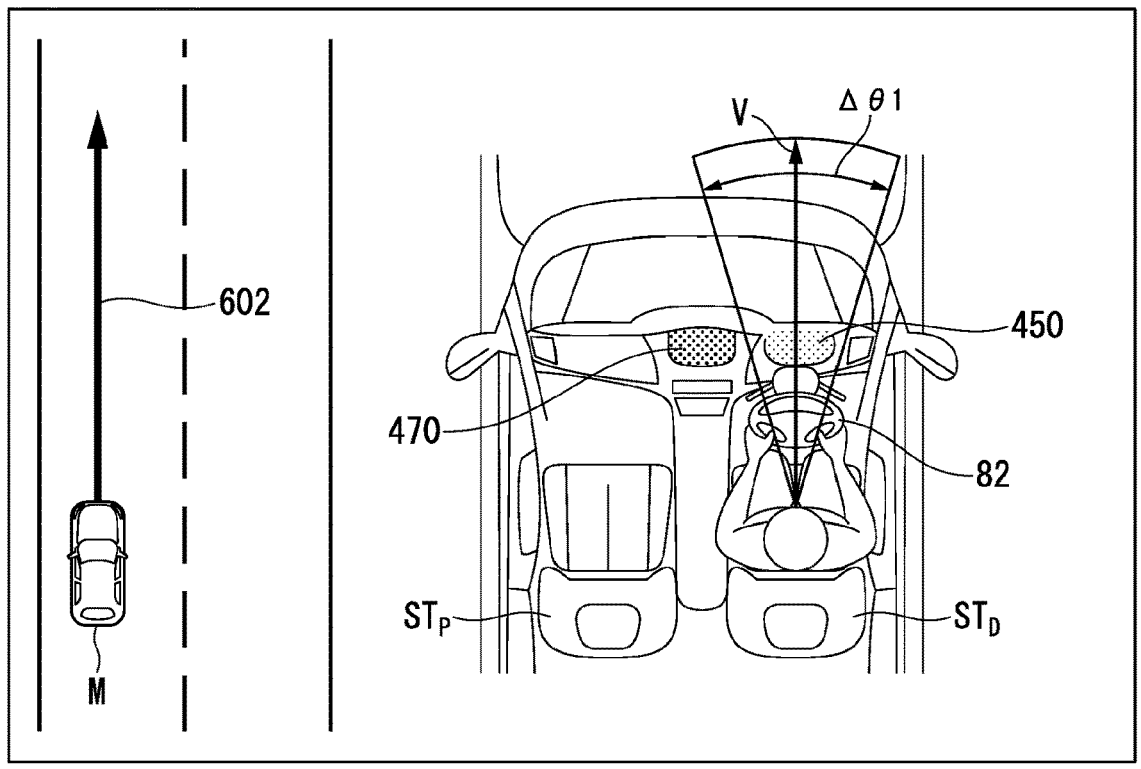
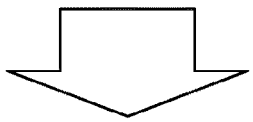
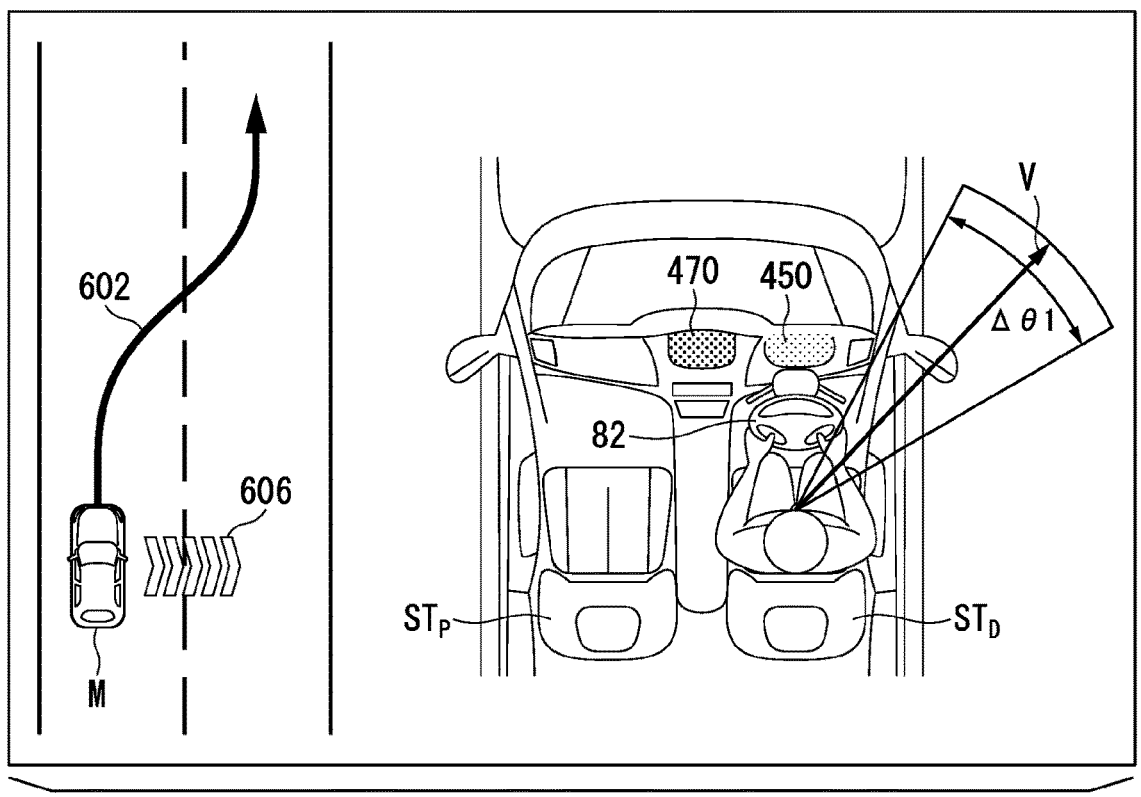

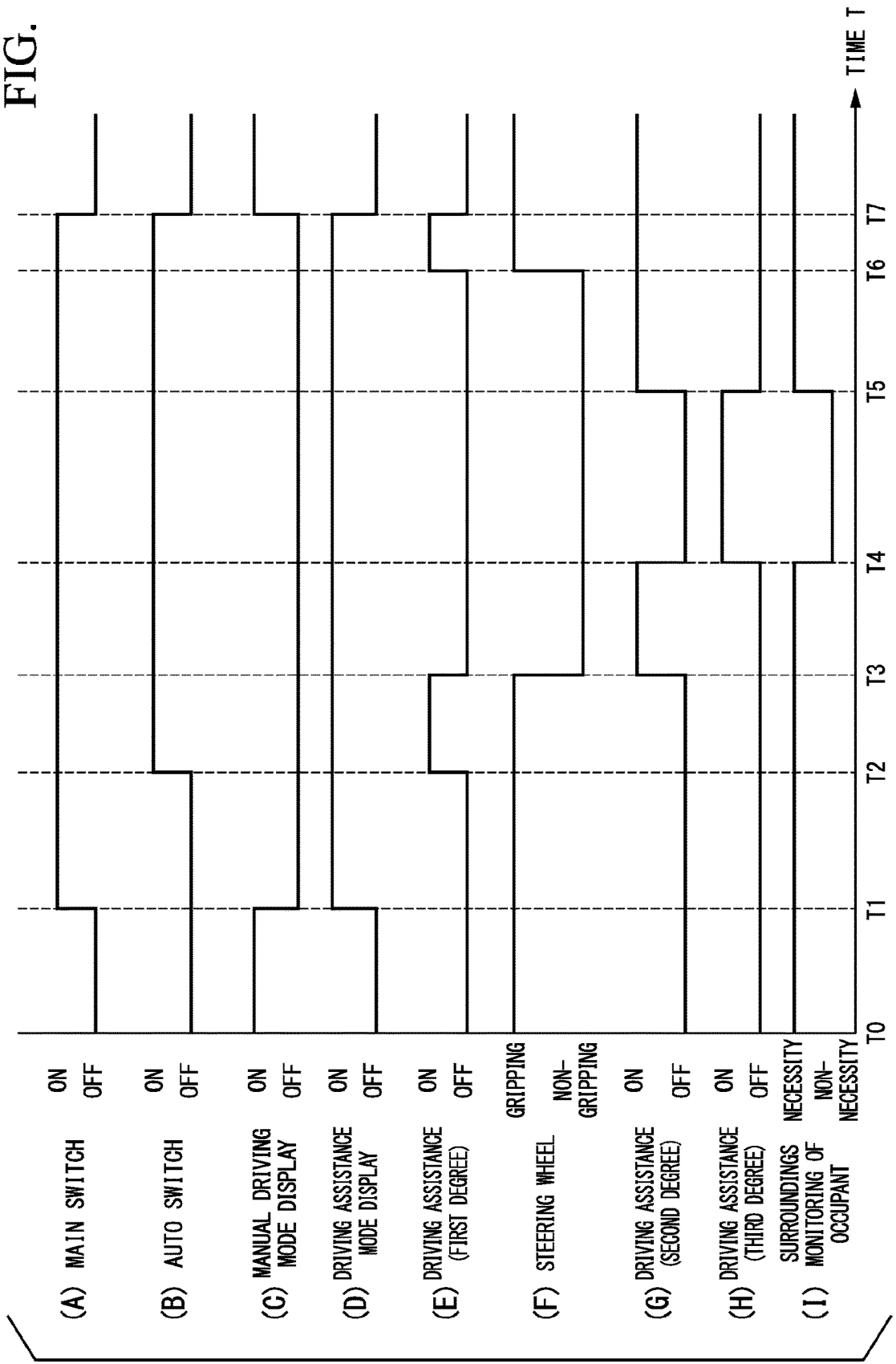

VEHICLE CONTROL SYSTEM, VEHICLE CONTROL METHOD, AND PROGRAM

TECHNICAL FIELD

The present invention relates to a vehicle control system, a vehicle control method, and a program.

Priority is claimed on Japanese Patent Application No. 2017-110185, filed Jun. 2, 2017, the content of which is incorporated herein by reference.

BACKGROUND ART

Conventionally, technology for notifying an occupant of prescribed information when automated driving can be started and starting automated driving when the occupant has received the prescribed information and removed his/her hands from the steering wheel has been disclosed (for example, see Patent Document 1).

PRIOR ART DOCUMENTS

Patent Documents

[Patent Document 1]
U.S. Pat. No. 8,352,110

SUMMARY OF INVENTION

Problems to be Solved by the Invention

However, how to terminate automated driving in accordance with an occupant's state has not been sufficiently taken into account in the conventional technology. As a result, the automated driving may be frequently terminated contrary to the intentions of the occupant.

The present invention has been made in view of such circumstances and an objective of the present invention is to provide a vehicle control system, a vehicle control method, and a program capable of eliminating complexity due to frequent termination of automated driving.

Solution to Problem

A vehicle control system, a vehicle control method, and a program according to the present invention adopt the following configurations.

(1) According to an aspect of the present invention, there is provided a vehicle control system including: an information outputter configured to output information; an operation element configured to receive an operation of issuing an instruction for steering of a host vehicle; an operation detector configured to detect that the operation element has been operated by an occupant; an automated driving controller configured to execute automated driving control for automatically controlling traveling of the host vehicle; a switching controller configured to switch a driving mode for causing the automated driving controller to execute the automated driving control to one of a plurality of driving modes including a first driving assistance mode in which the occupant is requested to operate the operation element and a second driving assistance mode having a lower degree to which the operation of the operation element is requested than the first driving assistance mode; and an output controller configured to cause the information outputter to output prescribed information when the driving mode for causing the automated driving controller to execute the automated driving control is switched from the second driving assistance mode to the first driving assistance mode by the switching controller, wherein the switching controller continues the second driving assistance mode until the operation detector detects that the operation element has been operated after the information outputter outputs the prescribed information and switches the driving mode to the first driving assistance mode by cancelling the second driving assistance mode when the operation detector detects that the operation element has been operated.

(2) In the vehicle control system according to the aspect (1), the first driving assistance mode and the second driving assistance mode are modes for executing speed control and steering control of the host vehicle as the automated driving control.

(3) The vehicle control system according to the aspect (1) or (2) further includes a display configured to display a first screen when the driving mode executed by the automated driving controller is neither the first driving assistance mode nor the second driving assistance mode and display a second screen different from the first screen when the driving mode executed by the automated driving controller is the first driving assistance mode or the second driving assistance mode.

(4) In the vehicle control system according to any one of the aspects (1) to (3), the automated driving controller executes at least steering control for keeping a travel lane as the automated driving control when the driving mode to be executed has been switched from the second driving assistance mode to the first driving assistance mode by the switching controller.

(5) The vehicle control system according to any one of the aspects (1) to (4) further includes a driving assistance controller configured to execute driving assistance control for controlling one or both of speed control and steering control of the host vehicle so that a driving operation on the operation element is assisted, wherein the switching controller switches the driving mode to a third driving assistance mode for causing the driving assistance controller to execute the driving assistance control when a prescribed condition is satisfied, and wherein maximum steering torque of the steering control in the third driving assistance mode is less than maximum steering torque of the steering control in the first driving assistance mode or the second driving assistance mode.

(6) According to an aspect of the present invention, there is provided a vehicle control method including causing an in-vehicle computer mounted in a vehicle including an information outputter configured to output information and an operation element configured to receive an operation of issuing an instruction for steering of a host vehicle to: detect that the operation element has been operated by an occupant; execute automated driving control for automatically controlling traveling of the host vehicle; switch a driving mode for executing the automated driving control to one of a plurality of driving modes including a first driving assistance mode in which the occupant is requested to operate the operation element and a second driving assistance mode having a lower degree to which the operation of the operation element is requested than the first driving assistance mode; cause the information outputter to output prescribed information when the driving mode is switched from the second driving assistance mode to the first driving assistance mode; and continue the second driving assistance mode until it is detected that the operation element has been operated after the information outputter outputs the prescribed information and switch the driving mode to the first driving assistance mode by cancelling the second driving assistance mode when it is detected that the operation element has been operated.

(7) According to an aspect of the present invention, there is provided a program for causing an in-vehicle computer mounted in a vehicle including an information outputter configured to output information and an operation element configured to receive an operation of issuing an instruction for steering of a host vehicle to execute: a process of detecting that the operation element has been operated by an occupant; a process of executing automated driving control for automatically controlling traveling of the host vehicle; a process of switching a driving mode for executing the automated driving control to one of a plurality of driving modes including a first driving assistance mode in which the occupant is requested to operate the operation element and a second driving assistance mode having a lower degree to which the operation of the operation element is requested than the first driving assistance mode; a process of causing the information outputter to output prescribed information when the driving mode is switched from the second driving assistance mode to the first driving assistance mode; and a process of continuing the second driving assistance mode until it is detected that the operation element has been operated after the information outputter outputs the prescribed information and switching the driving mode to the first driving assistance mode by cancelling the second driving assistance mode when it is detected that the operation element has been operated.

Advantageous Effects of Invention

According to the aspects (1) to (8), it is possible to eliminate complexity due to frequent termination of automated driving.

BRIEF DESCRIPTION OF THE DRAWINGS

FIG. 15 is a diagram schematically showing a structure of the interior of the host vehicle M when the host vehicle M is viewed from above.

FIG. 18 is a diagram schematically showing a state in which a direction, which is a reference of a first angle range Δθ1, is changed at the time of the start of the lane change.

FIG. 36 is an explanatory diagram showing switching timings of various types of equipment or control related to driving assistance.

DESCRIPTION OF EMBODIMENTS

Hereinafter, embodiments of a vehicle control system, a vehicle control method, and a program of the present invention will be described with reference to the drawings. In the embodiment, a vehicle control system is applied to an automated driving vehicle in which automated driving (autonomous driving) is possible. The automated driving means that the vehicle is driven in a state in which an operation of an occupant is not required in principle and is considered as a type of driving assistance. Also, the automated driving vehicle may also be driven according to manual driving. The manual driving means that the vehicle is driven in accordance with an operation of the occupant on a driving operation element. Although the "occupant" is assumed to be an occupant sitting in a seat of a driver, i.e., a seat where the driving operation element is provided, as an example in the following description, the present invention is not limited thereto. The occupant may be an occupant sitting in another seat such as a passenger seat.

In the present embodiment, degrees of driving assistance include, for example, a first degree, a second degree having a higher degree of control (an automation rate) than the first degree, and a third degree having a higher degree of control than the second degree. In the driving assistance of the first degree, for example, driving assistance control is executed by an operation of a driving assistance device such as an adaptive cruise control system (ACC) or a lane keeping assistance system (LKAS). In the driving assistance of the second degree and the third degree, for example, an operation of the occupant on the driving operation element is not required in principle and the automated driving for automatically controlling both acceleration/deceleration and steering of the vehicle is executed. In association with the execution of the driving assistance, a task (an obligation) according to a degree of driving assistance is imposed on the occupant. For example, an obligation to monitor surroundings is imposed on the occupant in the driving assistance of the first degree and the second degree, whereas no obligation to monitor surroundings is imposed on the occupant (or a degree of surroundings monitoring obligation is low) in the driving assistance of the third degree. When the occupant does not fulfill the obligation to monitor surroundings, for example, the degree of driving assistance is reduced.

[Overall Configuration]

Figure 1:
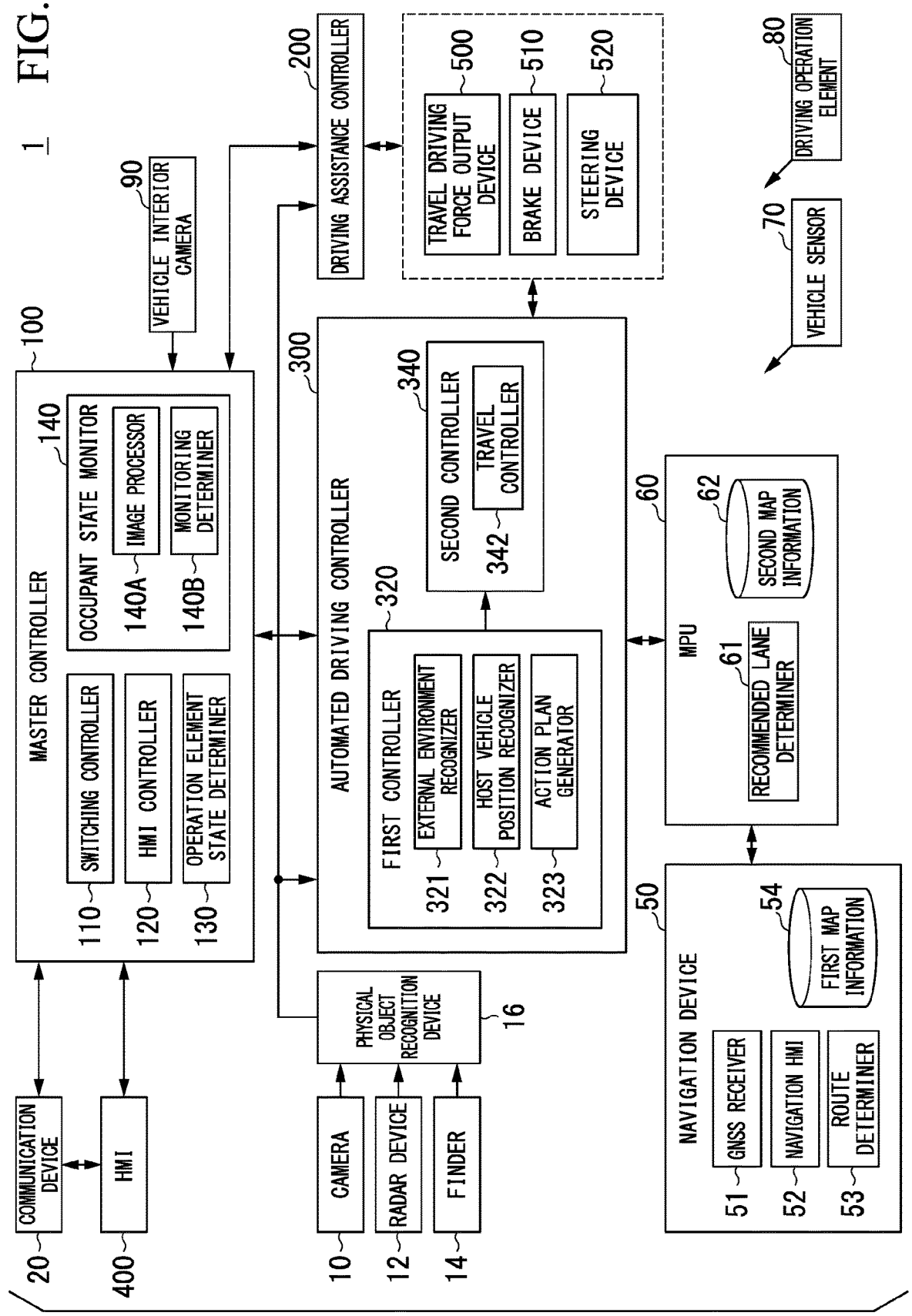
FIG. 1 is a configuration diagram of a vehicle system 1 including a vehicle control system according to a first embodiment.

FIG. 1 is a configuration diagram of a vehicle system 1 including a vehicle control system according to an embodiment. For example, a vehicle in which the vehicle system 1 is mounted (hereinafter referred to as a host vehicle M) is, for example, a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power from an electric power generator connected to the internal combustion engine or discharge electric power of a secondary battery or a fuel cell.

For example, the vehicle system 1 includes a camera 10, a radar device 12, a finder 14, a physical object recognition device 16, a communication device 20, a navigation device 50, a map positioning unit (MPU) 60, a vehicle sensor 70, a driving operation element 80, a vehicle interior camera 90, a master controller 100, a driving assistance controller 200, an automated driving controller 300, a human machine interface (HMI) 400, a travel driving force output device 500, a brake device 510, and a steering device 520. Such devices and equipment are connected to each other by a multiplex communication line such as a controller area network (CAN) communication line, a serial communication line, or a wireless communication network. The configuration shown in FIG. 1 is merely an example, a part of the configuration may be omitted, and another configuration may be further added.

For example, a combination of the vehicle interior camera 90, the master controller 100, and the automated driving controller 300 among a plurality of components included in the vehicle system 1 is an example of a "vehicle control system".

For example, the camera 10 is a digital camera using a solid imaging element such as a charge coupled device (CCD) or a complementary metal oxide semiconductor (CMOS). One or more cameras 10 are attached to any positions on the host vehicle M on which the vehicle system 1 is mounted. When the view in front of the host vehicle M is imaged, the camera 10 is attached to an upper part of a front windshield, a rear surface of a rearview mirror, or the like. When the view to the rear is imaged, the camera 10 is attached to an upper part of a rear windshield, a back door, or the like. When the view to the side is imaged, the camera 10 is attached to a door mirror or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. One or more radar devices 12 are attached to any positions on the host vehicle M. The radar device 12 may detect a position and speed of the physical object in a frequency modulated continuous wave (FM-CW) scheme.

The finder 14 is a light detection and ranging or laser imaging detection and ranging (LIDAR) finder in which scattered light from irradiation light is measured and a distance to an object is detected. One or more finders 14 are attached to any positions on the host vehicle M.

The physical object recognition device 16 performs a sensor fusion process on detection results from some or all of the camera 10, the radar device 12, and the finder 14 so that a position, a type, a speed, and the like of a physical object are recognized. The physical object recognition device 16 outputs recognition results to the automated driving controller 300.

For example, the communication device 20 communicates with another vehicle that is present in the surroundings of the host vehicle M using a cellular network, a Wi-Fi network, Bluetooth (registered trademark), a dedicated short range communication (DSRC), or the like, or communicates with various server devices via a wireless base station. Also, the communication device 20 communicates with a terminal possessed by a person outside the vehicle.

For example, the navigation device 50 includes a global navigation satellite system (GNSS) receiver 51, a navigation HMI 52, and a route determiner 53, and stores first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system using an output of the vehicle sensor 70. The navigation HMI 52 includes a display device, a speaker, a touch panel, a key, and the like. A part or all of the navigation HMI 52 may be shared with an HMI 400 that will be described below. For example, the route determiner 53 may determine a route from the position of the host vehicle M identified by the GNSS receiver 51 (or any input position) to a destination input by the occupant using the navigation HMI 52 (for example, including information about a via-point when the vehicle travels to the destination) by referring to the first map information 54. For example, the first map information 54 is information in which a road shape is expressed by a link indicating a road and nodes connected by the link. The first map information 54 may include a curvature of the road, point of interest (POI) information, or the like. The route determined by the route determiner 53 is output to the MPU 60. Also, the navigation device 50 may provide route guidance using the navigation HMI 52 on the basis of the route determined by the route determiner 53. Also, for example, the navigation device 50 may be implemented by a function of a terminal device such as a smartphone or a tablet terminal possessed by the user. Also, the navigation device 50 may transmit the current position and the destination to a navigation server via the communication device 20 and acquire the route returned from the navigation server.

For example, the MPU 60 functions as a recommended lane determiner 61 and holds second map information 62 in the storage device such as an HDD or a flash memory. The recommended lane determiner 61 divides the route provided from the navigation device 50 into a plurality of blocks (for example, divides the route into intervals of 100 [m] with respect to a vehicle progress direction), and determines a recommended lane for each block by referring to second map information 62. The recommended lane determiner 61 determines what number lane the vehicle travels on from the left. When a branching position, a merging position, or the like is present on the route, the recommended lane determiner 61 determines the recommended lane so that the host vehicle M may travel on a reasonable travel route for progressing to a branch destination.

The second map information 62 is map information with accuracy higher than that of the first map information 54. For example, the second map information 62 may include information about the center of a lane or information about a boundary of a lane. The second map information 62 may include road information, traffic regulations information, address information (an address and a postal code), facility information, telephone number information, and the like. The road information includes information indicating a type of a road such as an expressway, a toll road, a national highway, and a prefectural road, or information about the number of lanes on the road, the area of an emergency parking zone, the width of each lane, a gradient of the road, the position of the road (three-dimensional coordinates including the longitude, the latitude, and the height), the curvature of a curve of a lane, the positions of merging and branching points of a lane, a sign provided on the road, and the like. The second map information 62 may be updated at any time by accessing another device using the communication device 20.

The vehicle sensors 70 include a vehicle speed sensor that detects the speed of the host vehicle M, an acceleration sensor that detects the acceleration, a yaw rate sensor that detects the angular speed around a vertical axis, a direction sensor that detects the direction of the host vehicle M, and the like.

For example, the driving operation elements 80 may include an accelerator pedal, a brake pedal, a shift lever, a steering wheel, and other operation elements. An operation detection sensor that detects an amount of operation or the presence or absence of an operation is attached to the driving operation element 80. A detection result of the operation detection sensor is output to any one or more components of the master controller 100, the driving assistance controller 200, the automated driving controller 300, the travel driving force output device 500, the brake device 510, and the steering device 520.

For example, the vehicle interior camera 90 may mainly image a face of the occupant (in particular, the occupant sitting in the driver's seat) sitting in the seat installed in the interior of the vehicle. The vehicle interior camera 90 is a digital camera using a solid-state imaging element such as a CCD or a CMOS. For example, the vehicle interior camera 90 may periodically image the occupant. A captured image of the vehicle interior camera 90 is output to the master controller 100.

[Various Types of Control Devices]

For example, the vehicle system 1 includes the master controller 100, the driving assistance controller 200, and the automated driving controller 300 as a configuration of a control system. Also, the master controller 100 may be integrated into either one of the driving assistance controller 200 and the automated driving controller 300.

[Master Controller]

The master controller 100 switches the degree of driving assistance or controls the HMI 400. For example, the master controller 100 includes a switching controller 110, an HMI controller 120, an operation element state determiner 130, and an occupant state monitor 140. Each of the switching controller 110, the HMI controller 120, the operation element state determiner 130, and the occupant state monitor 140 is implemented by a processor such as a central processing unit (CPU) or a graphics processing unit (GPU) executing a program. Some or all of such functional parts may be implemented by hardware such as large scale integration (LSI), an application specific integrated circuit (ASIC), or a field-programmable gate array (FPGA), or may be implemented by cooperation between software and hardware. The program may be pre-stored in a storage device such as an HDD or a flash memory or pre-stored in a removable storage medium such as a DVD or a CD-ROM. The program may be installed in the storage device when the storage medium is mounted in a drive device.

For example, the switching controller 110 switches the degree of driving assistance from the state of the manual driving to the first or higher degree or from the first or higher degree to the state of the manual driving on the basis of an operation signal input from a prescribed switch (for example, a main switch and an auto switch that will be described below) included in the HMI 400. Also, for example, the switching controller 110 may switch the degree of driving assistance from the first or higher degree to the state of the manual driving on the basis of an acceleration, deceleration, or steering instruction operation on the driving operation element 80 such as the acceleration pedal, the brake pedal, or the steering wheel.

For example, in the driving assistance of the first degree (driving assistance control), a set speed (a lower limit speed and an upper limit speed) of the host vehicle M is set within a prescribed speed range (for example, about 50 to 100 [km/h]). This set speed may be appropriately changed by an operation of the occupant.

For example, in the driving assistance of the second degree (automated driving control), a set speed (a lower limit speed and an upper limit speed) of the host vehicle M is set as a reference speed such as a legal speed. For example, when the host vehicle M travels on an expressway, the upper limit speed is set to about 80 [km/h] or 100 [km/h] and the lower limit speed is set to about 50 [km/h] in accordance with the legal speed of the expressway.

Also, in the driving assistance of the third degree (automated driving control), a set vehicle speed similar to that of the driving assistance of the second degree is set. The driving assistance of the third degree is started, for example, when a speed of a preceding traveling vehicle is less than or equal to a prescribed speed under the driving assistance of the second degree. The preceding traveling vehicle is a vehicle present within a prescribed distance (for example, about 50 [m]) in front of the host vehicle M in a travel lane (a host vehicle lane) in which the host vehicle M travels. Also, the prescribed speed is, for example, 60 [km/h].

Also, the switching controller 110 may switch the degree of driving assistance on the basis of an action plan generated by an action plan generator 323. For example, the switching controller 110 may cause the driving assistance to be ended at a scheduled end point of the automated driving specified by the action plan.

Also, the switching controller 110 may switch the degree of driving assistance to the third degree when the position of the host vehicle M identified by the navigation device 50 is in an area where the host vehicle position recognizer 322 recognizes the travel lane of the host vehicle. In other words, the switching controller 110 may switch the degree of driving assistance to the third degree when the host vehicle M travels in a section on which information such as the number of lanes and a width of each lane is included in map information.

The HMI controller 120 causes the HMI 400 to output a notification or the like related to switching of the degree of driving assistance. Also, the HMI controller 120 may cause the HMI 400 to output information about determination results from one or both of the operation element state determiner 130 and the occupant state monitor 140. Also, the HMI controller 120 may output information received by the HMI 400 to one or both of the driving assistance controller 200 and the automated driving controller 300. Details of a function of the HMI controller 120 will be described below. The HMI 400 is an example of an "information outputter" and the HMI controller 120 is an example of an "output controller". Also, the HMI 400 is another example of a "receiver".

For example, the operation element state determiner 130 determines whether or not the steering wheel included in the driving operation elements 80 is being operated (specifically, a state is assumed to be an immediately operable state or a gripped state when the driver is actually performing an intentional operation). In the following description, a state in which the occupant operates (grips) the steering wheel is referred to as a "Hands On" state and a state in which the occupant does not operate (grip) the steering wheel is referred to as a "Hands Off" state. Details of the function of the operation element state determiner 130 will be described below.

The occupant state monitor 140 includes, for example, an image processor 140A and a monitoring determiner 140B. The image processor 140A may be provided in the vehicle interior camera 90 instead of the occupant state monitor 140. For example, the image processor 140A analyzes a captured image of the vehicle interior camera 90 and detects a direction of a line of sight and a direction of a face of an occupant in the driver's seat. The monitoring determiner 140B determines whether or not the occupant in the driver's seat is monitoring the surroundings of the host vehicle M on the basis of the direction of the line of sight or the face detected by the image processor 140A. In the following description, a state in which the occupant is monitoring the surroundings of the host vehicle M is referred to as an "Eyes On" state and a state in which the occupant is not monitoring the surroundings of the host vehicle M is referred to as an "Eyes Off" state. Details of the function of the occupant state monitor 140 will be described below.

[Driving Assistance Controller]

For example, when a degree of driving assistance of the host vehicle M is the first degree, the driving assistance controller 200 executes ACC, LKAS, or other driving assistance control as the driving assistance of the first degree. For example, when ACC is executed, the driving assistance controller 200 controls the travel driving force output device 500 and the brake device 510 so that the host vehicle M travels in a state in which an inter-vehicle distance is uniformly maintained between the host vehicle M and a preceding traveling vehicle on the basis of information input from the camera 10, the radar device 12, and the finder 14 via the physical object recognition device 16. In other words, the driving assistance controller 200 performs acceleration and deceleration control (speed control) based on the inter-vehicle distance from the preceding traveling vehicle. Also, when LKAS is executed, the driving assistance controller 200 controls the steering device 520 so that the host vehicle M travels while maintaining a travel lane in which the host vehicle M is currently traveling (lane keeping). That is, the driving assistance controller 200 performs steering control for the lane keeping. Maximum steering torque applied to the shaft of the steering wheel 82 at the time of the steering control (driving assistance control) by the driving assistance controller 200 is assumed to be smaller than maximum steering torque applied to the shaft of the steering wheel 82 at the time of the steering control (automated driving control) by the automated driving controller 300. That is, a degree of freedom of an operation of the occupant on the steering wheel 82 is relatively high under the driving assistance control and a degree of freedom of an operation of the occupant on the steering wheel 82 is lower under the automated driving control than under the driving assistance control. The driving assistance of the first degree may include various types of control other than the automated driving (the driving assistance of the second degree and the third degree) that do not request the occupant to operate the driving operation element 80.

[Automated Driving Controller]

The automated driving controller 300 executes the automated driving control when the degree of driving assistance of the host vehicle M is the second degree or the third degree. For example, the automated driving controller 300 includes a first controller 320 and a second controller 340. Each of the first controller 320 and the second controller 340 is implemented by a processor such as a CPU or a GPU executing a program. Also, some or all of such functional parts may be implemented by hardware such as LSI, an ASIC, or an FPGA, or may be implemented by cooperation between software and hardware. The automated driving controller 300 is an example of an "automated driving controller".

For example, the first controller 320 includes an external environment recognizer 321, a host vehicle position recognizer 322, and the action plan generator 323.

The external environment recognizer 321 recognizes a state such as the position, the speed, or the acceleration of a nearby vehicle on the basis of information input from the camera 10, the radar device 12, and the finder 14 via the physical object recognition device 16. The position of a nearby vehicle may be indicated by a representative point such as a center of gravity or a corner of the nearby vehicle or may be indicated by a region expressed by an outline of the nearby vehicle. The "state" of the nearby vehicle may include acceleration or jerk of the nearby vehicle, or an "action state" (for example, whether or not a lane change is being made or intended).

Also, the external environment recognizer 321 may recognize a position of at least one of the above-described nearby vehicle, an obstacle (for example, a guardrail, a utility pole, a parked vehicle, or a person such as a pedestrian), a road shape, and other physical objects.

For example, the host vehicle position recognizer 322 recognizes a lane (a travel lane) in which the host vehicle M is traveling and a relative position and an orientation of the host vehicle M related to the travel lane. For example, the host vehicle position recognizer 322 may recognize the travel lane by comparing a pattern of a road dividing line (for example, an arrangement of solid lines and broken lines) obtained from the second map information 62 with a pattern of a road dividing line in the vicinity of the host vehicle M recognized from an image captured by the camera 10. For the recognition, a position of the host vehicle M acquired from the navigation device 50 and a processing result from the INS may be added.

Figure 2:
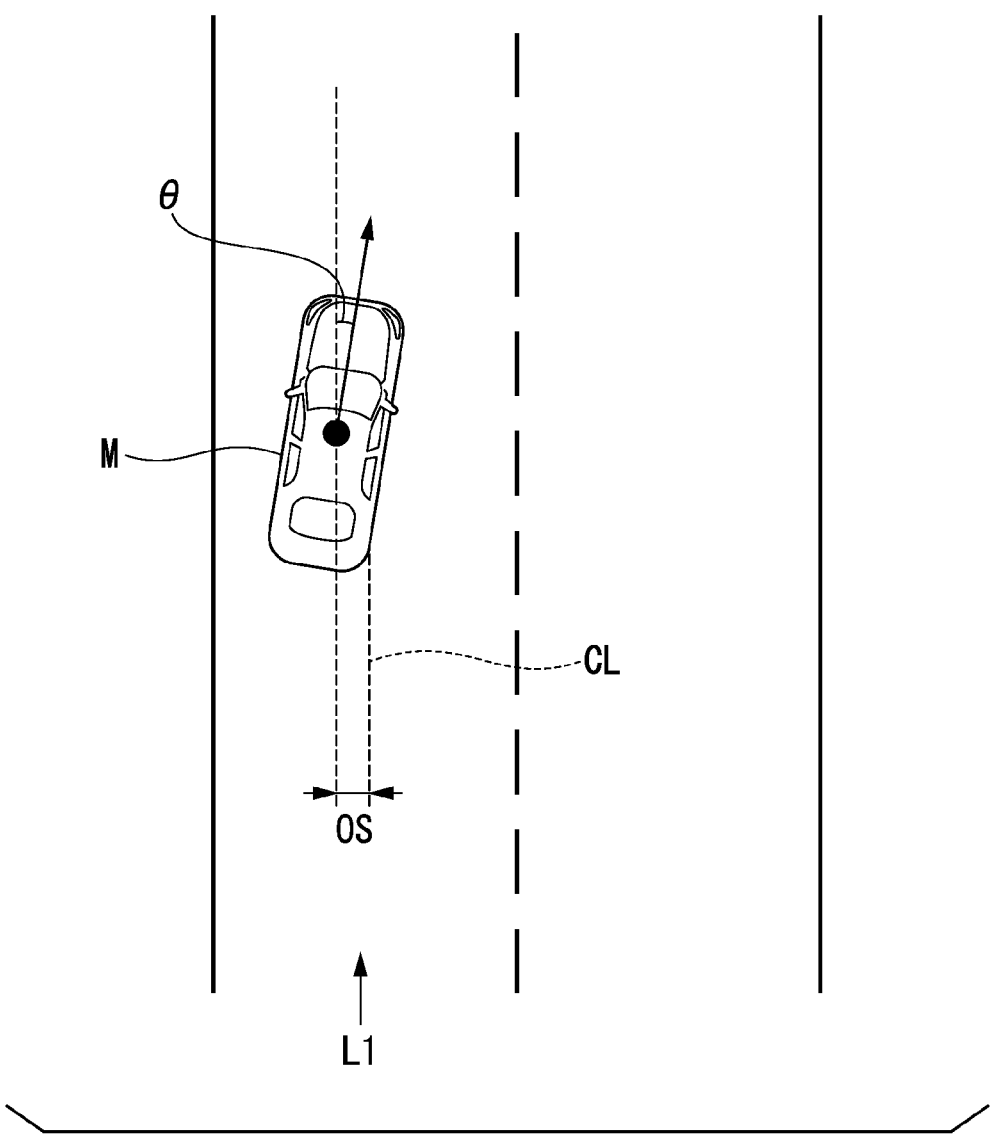
FIG. 2 is a diagram showing a state in which a host vehicle position recognizer 322 recognizes a relative position and an orientation of a host vehicle M with respect to a travel lane L1.

For example, the host vehicle position recognizer 322 recognizes the position and the orientation of the host vehicle M with respect to the travel lane. FIG. 2 is a diagram showing a state in which a relative position and an orientation of the host vehicle M with respect to a travel lane L1 are recognized by the host vehicle position recognizer 322. For example, the host vehicle position recognizer 322 recognizes a deviation OS from a travel lane center CL of a reference point (for example, a center of gravity) of the host vehicle M and an angle θ formed with respect to a line connecting the travel lane center CL to a traveling direction of the host vehicle M as the relative position and the orientation of the host vehicle M with respect to the travel lane L1. Also, alternatively, the host vehicle position recognizer 322 may recognize the position or the like of the reference point of the host vehicle M with respect to a side end of the travel lane L1 as the relative position of the host vehicle M with respect to the travel lane. The relative position of the host vehicle M recognized by the host vehicle position recognizer 322 is provided to the recommended lane determiner 61 and the action plan generator 323.

The action plan generator 323 generates an action plan for the host vehicle M to perform automated driving to a destination, or the like. For example, the action plan generator 323 may determine events to be sequentially executed in automated driving control so that the host vehicle M can travel in a recommended lane determined by the recommended lane determiner 61 and adapt to a surrounding situation with respect to the host vehicle M. The event is information in which a travel form of the host vehicle M is specified. For example, in the automated driving of the embodiment, the event includes a constant-speed travel event for traveling in the same travel lane at a constant speed, a low-speed following event for following the preceding traveling vehicle in the condition of a low speed (for example, 60 [km/h] or less), a lane change event for changing the travel lane of the host vehicle M, an overtaking event for overtaking the preceding traveling vehicle, a merging event for merging a vehicle at a merging point, a branching event for causing the host vehicle M to travel in a target direction at a branch point of the road, an emergency stop event for performing emergency stopping of the host vehicle M, and the like. In some cases, during the execution of such events, an action for avoidance may be planned on the basis of the surrounding situation (the presence of a nearby vehicle or a pedestrian, lane narrowing due to a roadwork, or the like) of the host vehicle M.

The action plan generator 323 generates a target trajectory along which the host vehicle M will travel in the future. The target trajectory is expressed by sequentially arranging points (trajectory points) which the host vehicle M will reach. A trajectory point is a point which the host vehicle M is required to reach at each prescribed travel distance. Alternatively, a target speed and target acceleration for each of prescribed sampling times (for example, about every one tenth of a second [sec]) may be generated as a part of the target trajectory. Also, the trajectory point may be a position which the host vehicle M is required to reach at a sampling time of each prescribed sampling period of time. In this case, information about the target speed and the target acceleration is expressed by an interval between the trajectory points.

For example, the action plan generator 323 determines the target speed of the host vehicle M in a range of a set speed corresponding to the degree of driving assistance. For example, when the degree of driving assistance is the first degree, the action plan generator 323 determines the target speed in a range of 50 to 100 [km/h]. Also, when the degree of driving assistance is the second degree, the action plan generator 323 determines the target speed in a range of 50 to 80 [km/h] or 50 to 100 [km/h]. Also, the action plan generator 323 determines the target speed in a range of 50 to 80 [km/h] or 50 to 100 [km/h] when the degree of driving assistance is the third degree and there is no preceding traveling vehicle like when the degree of driving assistance is the second degree, and determines the target speed as at least a speed less than or equal to that of the preceding traveling vehicle when there is a preceding traveling vehicle.

Figure 3:
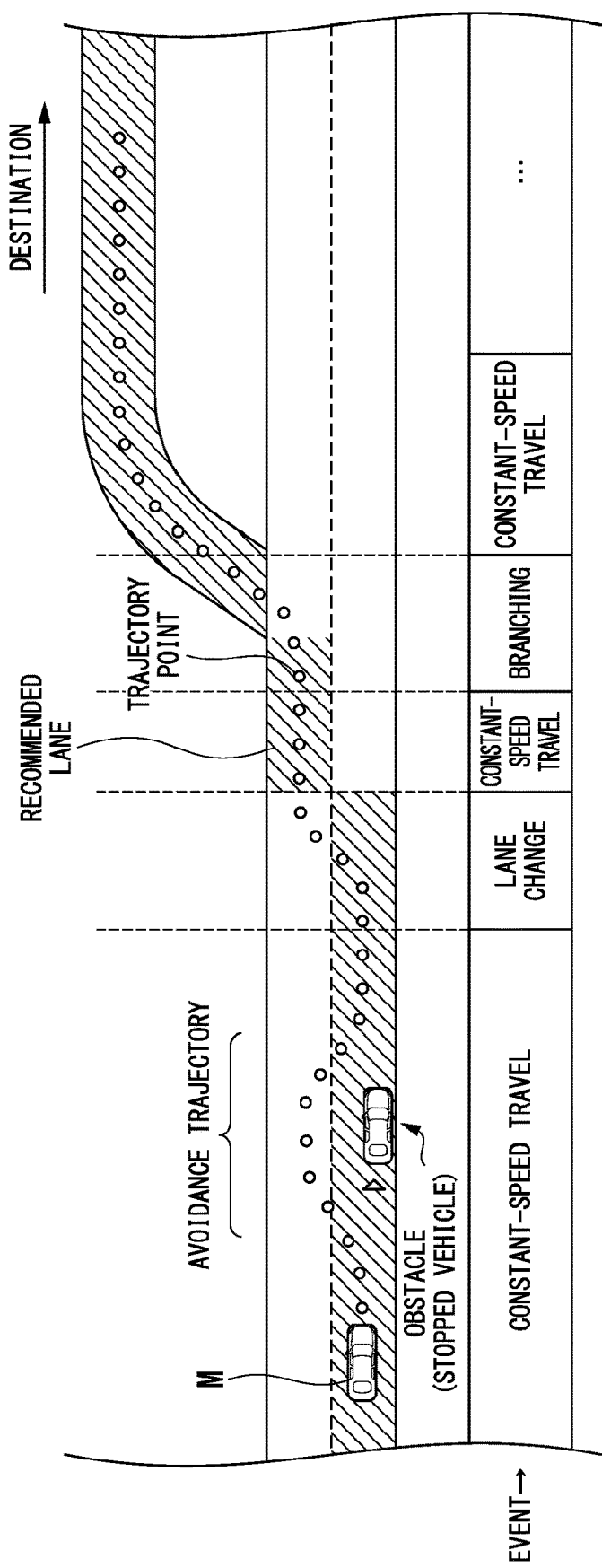
FIG. 3 is a diagram showing a state in which a target trajectory is generated on the basis of a recommended lane.

FIG. 3 is a diagram showing a state in which the target trajectory is generated on the basis of the recommended lane. As shown in FIG. 3, the recommended lane is set so that traveling to the destination along the route is convenient. When the vehicle reaches a position at a prescribed distance before a point of switching to the recommended lane (the position may be determined in accordance with the type of event), the action plan generator 323 may start a lane change event, a branching event, a merging event, or the like. During the execution of each event, when it is necessary to avoid an obstacle, a target trajectory for avoiding the obstacle is generated as shown in FIG. 3.

Figure 4:
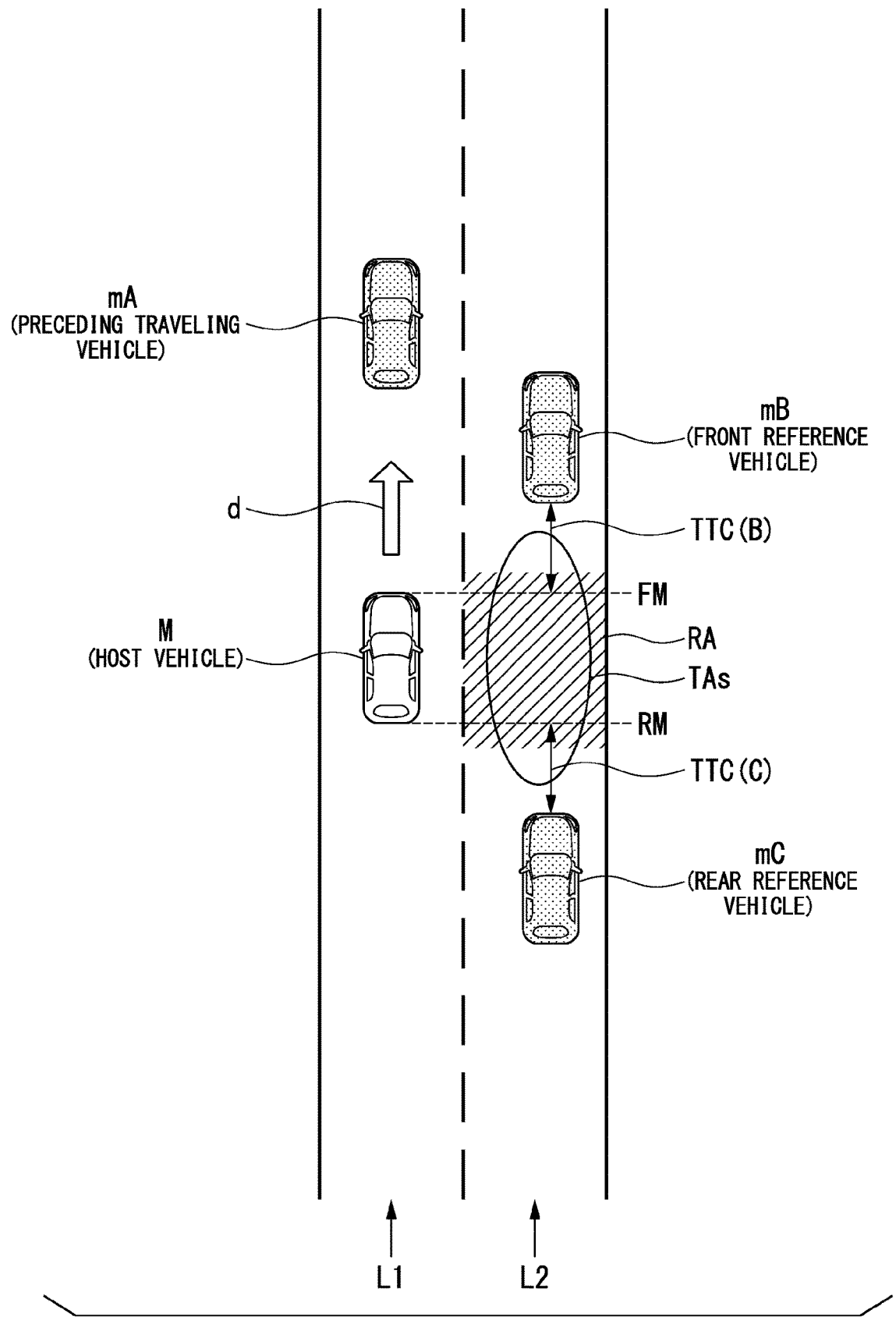
FIG. 4 is an explanatory diagram showing a process at the time of a lane change.
Figure 5:
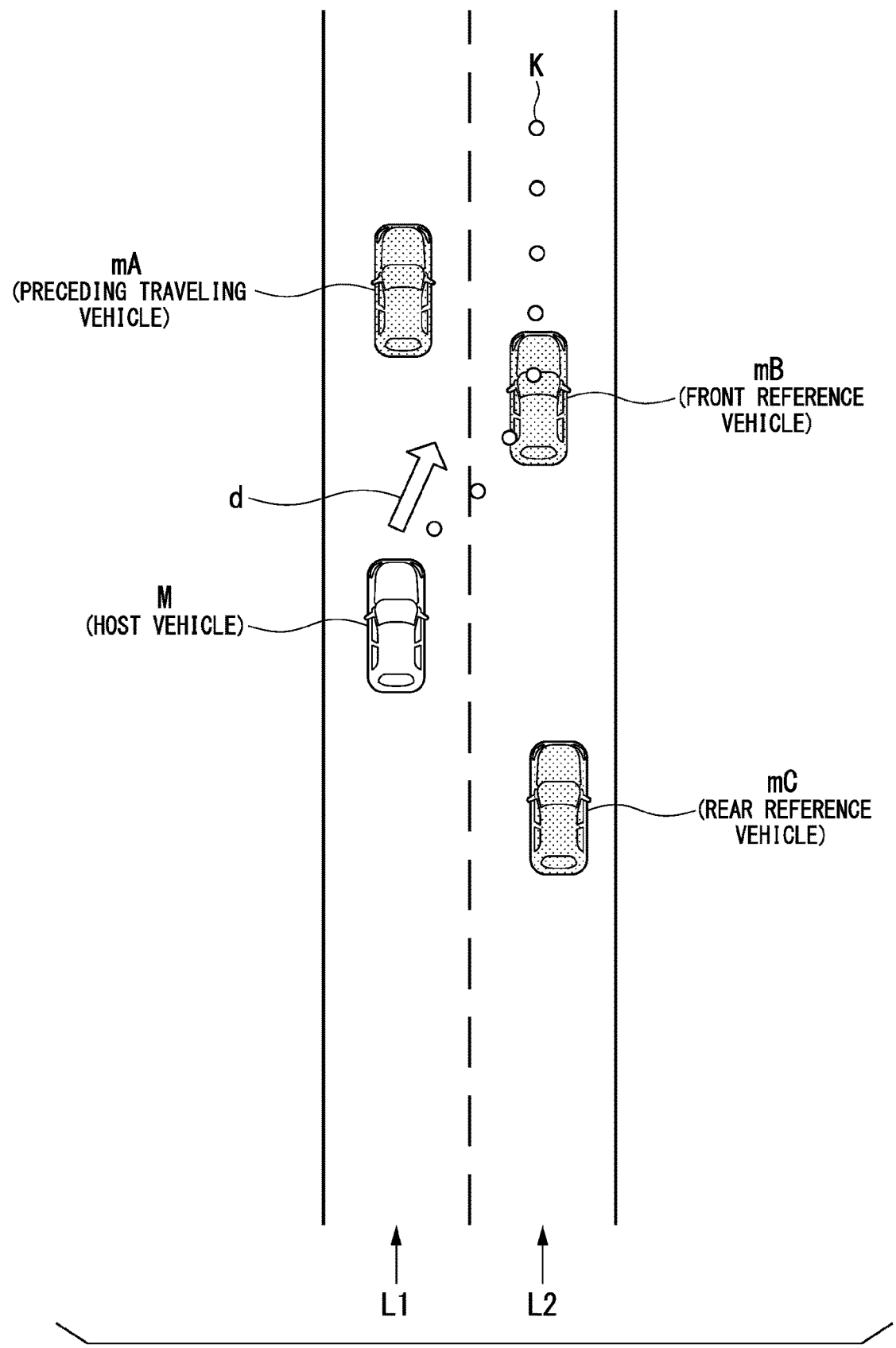
FIG. 5 is an explanatory diagram showing a process at the time of a lane change.

Also, when a lane change event is started, the action plan generator 323 generates the target trajectory for the lane change. FIGS. 4 and 5 are explanatory diagrams showing a process when the lane is changed. First, the action plan generator 323 selects two nearby vehicles from nearby vehicles which are traveling in an adjacent lane L2 which is an adjacent lane adjacent to the lane (host vehicle lane) L1 in which the host vehicle M travels and which is a lane change destination, and sets a lane change target position TAs between these two nearby vehicles. In the following description, a nearby vehicle that travels immediately before the lane change target position TAs in the adjacent lane will be referred to as a front reference vehicle mB, and a nearby vehicle that travels immediately after the lane change target position TAs in the adjacent lane will be referred to as a rear reference vehicle mC. The lane change target position TAs is a relative position based on a positional relationship between the host vehicle M, the front reference vehicle mB, and the rear reference vehicle mC.

In the example of FIG. 4, a state in which the action plan generator 323 sets the lane change target position TAs is shown. In FIG. 4, a reference sign mA denotes the preceding traveling vehicle, a reference sign mB denotes the front reference vehicle, and a reference sign mC denotes the rear reference vehicle. Also, an arrow d denotes a progress (traveling) direction of the host vehicle M. In the case of the example of FIG. 4, the action plan generator 323 sets the lane change target position TAs between the front reference vehicle mB and the rear reference vehicle mC in the adjacent lane L2.

Next, the action plan generator 323 determines whether or not a primary condition for determining whether or not the lane change is possible has been satisfied at the lane change target position TAs (i.e., the position between the front reference vehicle mB and the rear reference vehicle mC).

For example, the primary condition may be a condition in which there is no part of the nearby vehicle in a prohibition area RA provided in the adjacent lane and time to collision (TTC) values between the host vehicle M and the front reference vehicle mB and between the host vehicle M and the rear reference vehicle mC are larger than a threshold value. Also, this determination condition is an example of a case in which the lane change target position TAs is set to the side of the host vehicle M. When the primary condition has not been satisfied, the action plan generator 323 resets the lane change target position TAs. At this time, the host vehicle M may wait until a timing at which the lane change target position TAs satisfying the primary condition can be set or perform speed control for moving to the side of the lane change target position TAs by changing the lane change target position TAs.

As shown in FIG. 4, for example, the action plan generator 323 projects the host vehicle M onto the lane L2 of the lane change destination of the host vehicle M and sets the prohibition area RA having a slight margin distance in front of and behind the prohibition area RA. The prohibition area RA is set as an area extending from one end to the other end in a lateral direction of the lane L2.

When there is no nearby vehicle in the prohibition area RA, for example, the action plan generator 323 assumes an extension line FM and an extension line RM that respectively extend virtually from the front end and the rear end of the host vehicle M to the side of the lane L2 which is the lane change destination. The action plan generator 323 calculates collision margin time TTC(B) between the extension line FM and the front reference vehicle mB and collision margin time TTC(C) between the extension line RM and the rear reference vehicle mC. The collision margin time TTC(B) is time derived by dividing the distance between the extension line FM and the front reference vehicle mB by a relative speed of the host vehicle M and the front reference vehicle mB. The collision margin time TTC(C) is time derived by dividing the distance between the extension line RM and the rear reference vehicle mC by a relative speed of the host vehicle M and the rear reference vehicle mC. When the collision margin time TTC(B) is larger than a threshold value Th(B) and the collision margin time TTC(C) is larger than a threshold value Th(C), the action plan generator 323 determines that the primary condition is satisfied. The threshold values Th(B) and Th(C) may be the same value or different values.

When the primary condition is satisfied, the action plan generator 323 generates a trajectory candidate for the lane change. In the example of FIG. 5, the action plan generator 323 assumes that the preceding traveling vehicle mA, the front reference vehicle mB, and the rear reference vehicle mC travel in a prescribed speed model, and generates trajectory candidates so that the host vehicle M does not interfere with the preceding traveling vehicle mA and is positioned between the front reference vehicle mB and the rear reference vehicle mC at a certain future time on the basis of the speed model for these three vehicles and the speed of the host vehicle M. For example, the action plan generator 323 may smoothly connect the current position of the host vehicle M, the position of the front reference vehicle mB at any future time, the center of the lane of the lane change destination, and an end point of the lane change to each other, using a polynomial curve such as a spline curve, and dispose a prescribed number of trajectory points K on the curve at equal intervals or unequal intervals. At this time, the action plan generator 323 generates a trajectory so that at least one of the trajectory points K is disposed at the lane change target position TAs.

In various types of scenes, the action plan generator 323 generates a plurality of target trajectory candidates and selects an optimum target trajectory appropriate for the route to the destination at that time point.

For example, the second controller 340 may include a travel controller 342. The travel controller 342 controls the travel driving force output device 500, the brake device 510, and the steering device 520 so that the host vehicle M passes through the target trajectory generated by the action plan generator 323 according to a scheduled time.

For example, the travel controller 342 determines an amount of control of the travel driving force output device 500 and the brake device 510 in accordance with the target speed included in the target trajectory and performs speed control of the host vehicle M by controlling the travel driving force output device 500 and the brake device 510 according to the amount of control.

Also, for example, the travel controller 342 determines a target steering angle of the host vehicle M at a trajectory point ki on the basis of an angle formed by a line connecting any trajectory point ki and a trajectory point ki−1 at which the host vehicle M is required to arrive before the trajectory point ki included in a target trajectory and a line connecting the trajectory point ki and a trajectory point ki+1 at which the host vehicle M is required to arrive after the trajectory point ki and determines an amount of control of the electric motor in the steering device 520 so that displacement for the target steering angle is applied to the wheel. Then, the travel controller 342 performs steering control of the host vehicle M by controlling the steering device 520 according to the determined amount of control.

The HMI 400 presents various types of information to the occupant in the vehicle and receives an input operation from the occupant. For example, the HMI 400 may include some or all of various types of display devices, a light emitter, a speaker, a buzzer, a touch panel, various types of operation switches, a key, and the like. Also, the HMI 400 may include a part of a seat belt device that holds the occupant by means of a seat belt in a state in which the occupant sits in the seat. Details of a function of the HMI 400 will be described below.

The travel driving force output device 500 outputs a travel driving force (torque) for enabling the vehicle to travel to driving wheels. For example, the travel driving force output device 500 may include a combination of an internal combustion engine, an electric motor, a transmission, and the like, and a power electronic control unit (ECU) that controls them. The power ECU controls the above-described components in accordance with information input from the travel controller 342 or information input from the driving operation element 80.

For example, the brake device 510 includes a brake caliper, a cylinder that transfers oil pressure to the brake caliper, an electric motor that generates the oil pressure in the cylinder, and a brake ECU. The brake ECU controls the electric motor in accordance with information input from the travel controller 342 or information input from the driving operation element 80, so that the brake torque according to the control operation is output to each wheel. The brake device 510 may include a mechanism for transferring the oil pressure generated by the operation of the brake pedal included in the driving operation element 80 to the cylinder via a master cylinder as a backup. Also, the brake device 510 is not limited to the configuration described above and may be an electronically controlled hydraulic brake device that controls an actuator in accordance with the information input from the travel controller 342 or the information input from the driving operation element 80 to transfer the oil pressure of the master cylinder to the cylinder. Also, the brake device 510 includes a plurality of types of brake devices using oil pressure, electric power, and the like.

For example, the steering device 520 includes a steering ECU and an electric motor. For example, the electric motor changes the direction of steerable wheels by applying a force to a rack and pinion mechanism. The steering ECU changes the direction of the steerable wheels by driving the electric motor in accordance with the information input from the travel controller 342 or the information input from the driving operation element 80.

Also, at the time of the manual driving, the information input from the driving operation element 80 is directly output to the travel driving force output device 500, the brake device 510, and the steering device 520. Also, the information input from the driving operation element 80 may be output to the travel driving force output device 500, the brake device 510, and the steering device 520 via the automated driving controller 300. Each ECU of the travel driving force output device 500, the brake device 510, and the steering device 520 performs each of operations on the basis of the information input from the driving operation element 80 and the like.

[Configuration of HMI 400]

Figure 6:
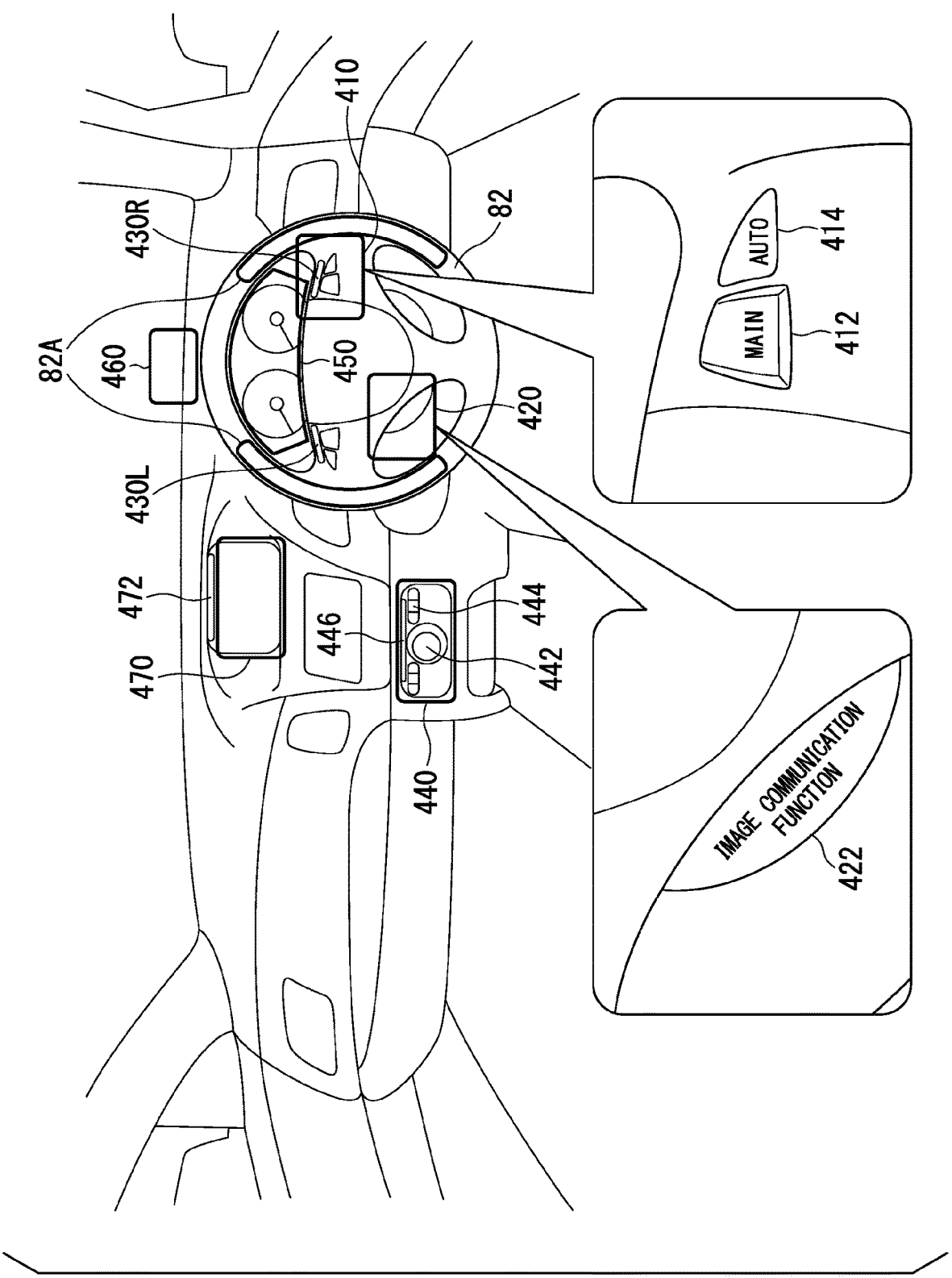
FIG. 6 is an explanatory diagram showing an example of an HMI 400 in a host vehicle M.

Hereinafter, a configuration example of the HMI 400 according to an embodiment will be described. FIG. 6 is a diagram showing an example of the HMI 400 in the host vehicle M. For example, the HMI 400 includes a first operator 410, a second operator 420, light emitters 430R and 430L, a third operator 440, a first display 450, a head-up display (HUD) (a second display) 460, and a third display 470.

The first operator 410, the second operator 420, and the light emitters 430R and 430L are provided in a steering wheel 82 that is one of the driving operation elements 80. Also, the steering wheel 82 is provided with a grip sensor 82A. For example, the grip sensor 82A may be an electrostatic capacitance sensor provided in a circumferential direction of the steering wheel 82. The grip sensor 82A detects a physical object approaching or coming into contact with an area of a detection target as a change in electrostatic capacitance. When the electrostatic capacitance is greater than or equal to a threshold value, the grip sensor 82A outputs a prescribed detection signal to the operation element state determiner 130 of the master controller 100. For example, the threshold value may be set to a value less than electrostatic capacitance generated when the occupant grips the steering wheel 82. Also, the grip sensor 82A may output the detection signal indicating the electrostatic capacitance to the operation element state determiner 130 regardless of whether or not the electrostatic capacitance is greater than or equal to the threshold value. The grip sensor 82A is an example of an "operation detector".

Also, the steering wheel 82 may be provided with a steering torque sensor 82B instead of or in addition to the grip sensor 82A. For example, the steering torque sensor 82B detects steering torque applied to the shaft of the steering wheel 82 and outputs a prescribed detection signal to the operation element state determiner 130 when the detected steering torque is greater than or equal to a threshold value. For example, this threshold value is set to a value less than the steering torque applied to the shaft when the occupant is gripping the steering wheel 82. Also, the steering torque sensor 82B may output a detection signal indicating the steering torque to the operation element state determiner 130 regardless of whether or not the detected steering torque is greater than or equal to the threshold value. The steering torque sensor 82B is another example of the "operation detector".

For example, the first operator 410 includes a main switch 412 and an auto switch 414. The main switch 412 is a switch for setting the driving assistance in a state in which the driving assistance can be started (a standby state). In other words, the main switch 412 is a switch for starting a process (an internal process) in a preparation step before the driving assistance is executed to be described below or a switch for determining whether or not it is possible to start the driving assistance.

When the main switch 412 has been operated, the driving assistance is not started immediately, but pre-processing for executing driving assistance under the manual driving is performed. The pre-processing is, for example, a process of causing the physical object recognition device 16 to continue a physical object recognition process (specifically, a sequential recognition process of a target using a Kalman filter, etc.) for a prescribed period of time in advance. When the auto switch 414 is further operated after the main switch 412 is operated and a standby state is reached (i.e., when a certain period of time has elapsed after the operation), the driving assistance of the first degree which is the lowest degree is started. That is, the auto switch 414 is a switch for switching from manual driving to driving assistance control.

The second operator 420 includes an operation switch 422 for starting provision of an image communication function (also referred to as a video phone function hereinafter). For example, the light emitters 430R and 430L are disposed on a spoke portion extending from a center boss portion of the steering wheel 82 toward an annular rim portion. A lighting state of the light emitter 430R is controlled according to control of the HMI controller 120.

For example, the third operator 440 includes a rotation operator 442 and a switch operator 444 that protrude to a front side from a viewpoint of the occupant. The rotation operator 442 is formed in a substantially cylindrical shape and may be rotated around an axis line. The switch operator 444 is provided near the rotation operator 442 or on a top surface of the rotation operator 442. The third operator 440 includes a rotation sensor (not shown) such as an encoder that detects a rotation angle and a rotation speed of the rotation operator 442, and a displacement sensor (not shown) that detects the displacement of the switch operator 444. The third operator 440 outputs detection values output from the sensors to the master controller 100. The detection values output to the master controller 100 are used in operations of an arrow or a selection button, a confirmation button, and the like output to a screen of the third display 470, or selection or confirmation of an input character, and the like.

Also, the third operator 440 may be a so-called touch panel type operator that performs selection, confirmation operation, or the like by touching a display screen with a fingertip. A light emitter 446 capable of emitting light of a prescribed wavelength is provided in the vicinity of the third operator 440.

For example, the first display 450 is a display device that is provided in the vicinity of the front of the driver's seat in an instrument panel and can be visually recognized by the occupant through a gap of the steering wheel 82 or through the steering wheel 82. For example, the first display 450 is a liquid crystal display (LCD), an organic electroluminescence (EL) display device, or the like. Information necessary for the travel at the time of the manual driving or at the time of the automated driving of the host vehicle M or information about an instruction to the occupant is displayed on the first display 450. For example, the information necessary for the travel at the time of the manual driving of the host vehicle M is a speed, an engine speed, the remaining amount of fuel, a radiator water temperature, a travel distance, and other information of the host vehicle M. On the other hand, for example, the information necessary for the travel of the host vehicle M at the time of the automated driving is information about a future trajectory of the host vehicle M, a degree of driving assistance, an instruction to the occupant, and the like.

For example, the HUD 460 is disposed at a position higher than that of the first display 450. The HUD 460 projects an image on a prescribed image forming portion. For example, the HUD 460 causes a virtual image to be visually recognized from the viewpoint of an occupant sitting in the driver's seat by projecting an image on a portion of a front windshield in front of the driver's seat. A display area of the image projected by the HUD 460 is smaller than a display area of the image on the first display 450. This is for preventing the occupant from missing a real physical object located in front of the image due to the image projected by the HUD 460. Also, in the embodiment, an image may be displayed on the front windshield of the host vehicle M instead of the HUD 460. In this case, for example, a light emitting diode (LED) incorporated in the instrument panel may emit light and the light emission of the LED may be reflected on the front windshield.

For example, the third display 470 is attached to the central portion of the instrument panel. For example, the third display 470 is an LCD, an organic EL display device, or the like. For example, the third display 470 displays an image corresponding to a navigation process executed by the navigation device 50, a video showing a communication partner in a video phone, or the like. Also, the third display 470 may display a television program, play a DVD, or display content of a downloaded movie or the like.

Figure 7:
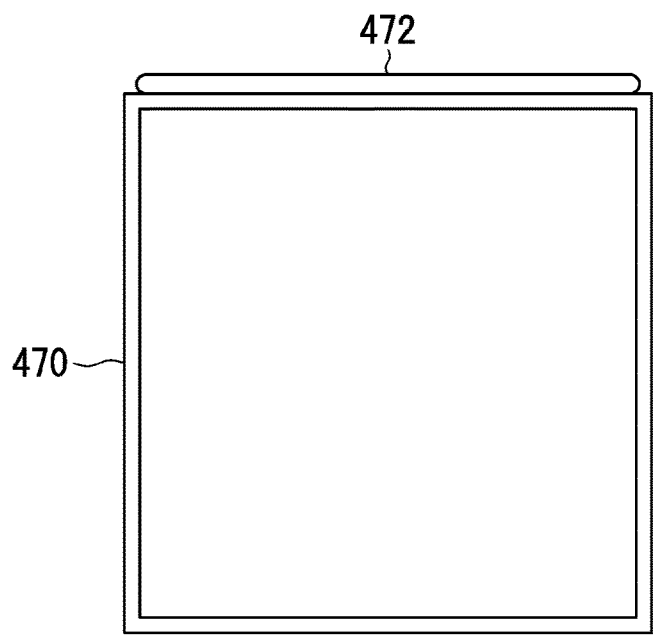
FIG. 7 is a diagram showing an example of one aspect of a positional relationship between a third display 470 and a light emitter 472.

Also, the third display 470 may be provided with a light emitter 472. FIG. 7 is an illustrative diagram showing one aspect of a first positional relationship between the third display 470 and the light emitter 472. For example, the light emitter 472 is provided in a part of the third display 470 or in the vicinity thereof. For example, the "vicinity" is a near range in which the shortest distance between the light emitter 472 and the third display 470 is less than or equal to several centimeters [cm] (more specifically, about 3 [cm]). In the example of FIG. 7, for example, the light emitter 472 is attached so that it is extended along at least one side forming a screen shape of the third display 470.

Figure 8:
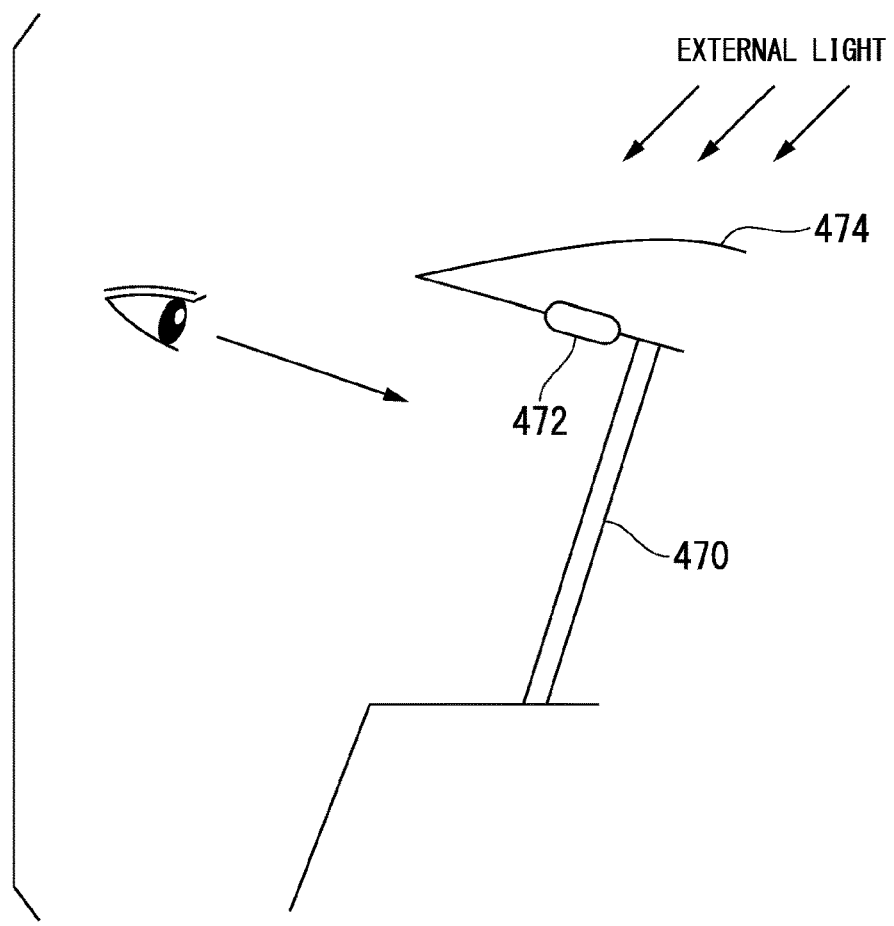
FIG. 8 is a diagram showing an example of another aspect of the positional relationship between the third display 470 and the light emitter 472.

FIG. 8 is a diagram showing an example of another aspect of the positional relationship between the third display 470 and the light emitter 472. In the example of FIG. 8, the third display 470 is provided at a portion below a visor portion 474 of the instrument panel portion at the upper portion in front of the third display 470. Also, the light emitted by the light emitter 472 is not blocked by the visor portion 474 and can be visually recognized by the occupant. By adopting this form, because the visor portion 474 shields external light such as sunlight entering the light emitter 472, visibility of light emission for the occupant can be improved.

The light emitter 472 is controlled by the HMI controller 120 so that the light emitter 472 emits light when the third display 470 is usable. For example, the term "usable" means that a screen related to the image communication function can be displayed on the third display 470 by operating the second operator 420 or an image related to a movie or a television program can be displayed on the third display 470 according to an operation on the third operator 440.

Figure 9:
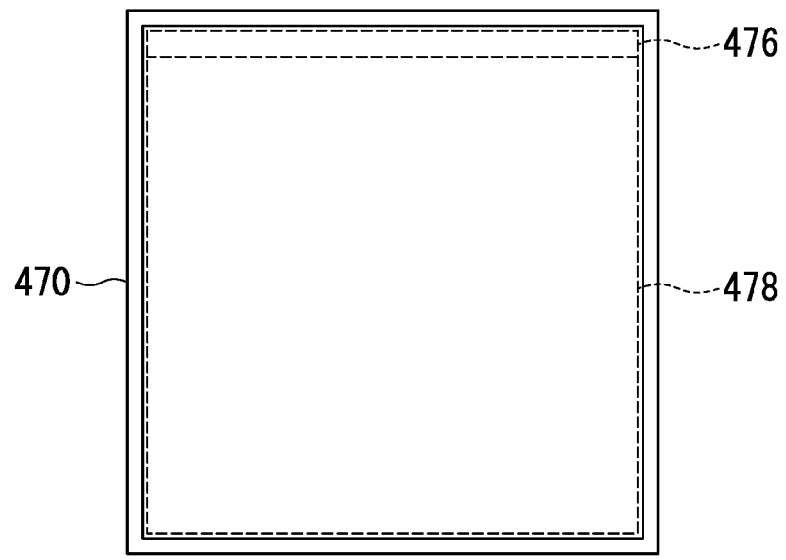
FIG. 9 is an explanatory diagram showing a notification indicating that the third display 470 is usable using an area of a part of a screen of the third display 470.

FIG. 9 is an explanatory diagram showing a notification indicating that the third display 470 is usable using an area of a part of a screen of the third display 470. The HMI controller 120 allocates a first display area 476 and a second display area 478 to the entire screen area of the third display 470. The first display area 476 is a pixel area of an area extending along any one side of the entire screen of the third display 470. When the third display 470 is usable, the HMI controller 120 causes the first display area 476 to be turned on or blink in light of a prescribed wavelength or a prescribed shape. Thereby, it is possible to notify the occupant that the third display 470 is in a usable state without providing the light emitter 472.

Also, the HMI controller 120 displays details of an operation of the second operator 420 or the third operator 440 or details of execution according to an operation on the second display area 478.

[Display Control of HMI 400 Related to Automated Driving]

Next, the display control of the HMI 400 related to the automated driving will be described. Also, a layout on a display screen to be described below is merely an example and may be arbitrarily changed. The layout refers to a disposition, a color, a size, and the like.

Figure 10:
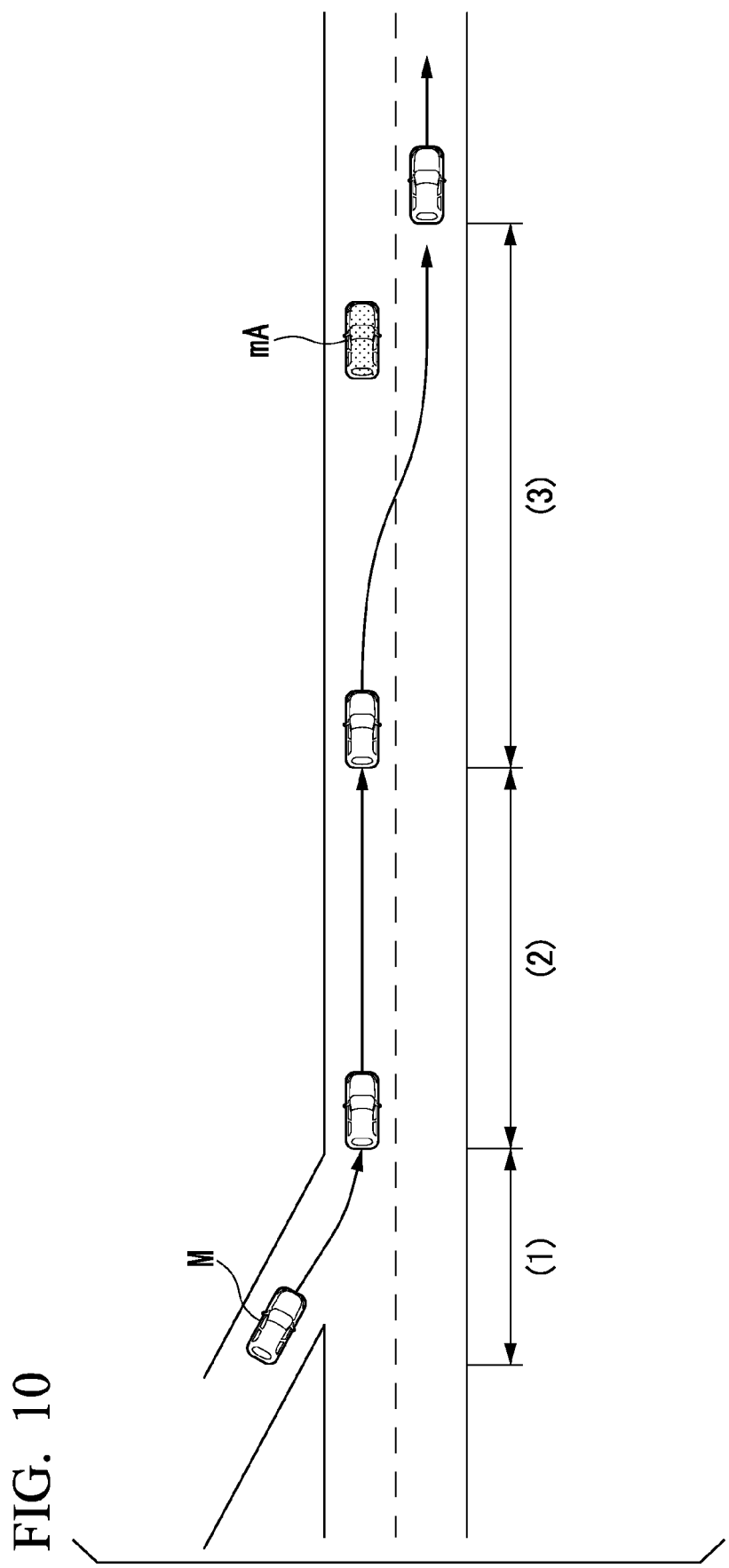
FIG. 10 is a diagram showing various types of scenes until a lane change is executed by driving assistance after switching from manual driving to the driving assistance.

FIG. 10 is a diagram showing various types of scenes until a lane change is executed by driving assistance after switching from manual driving to the driving assistance. In an example of FIG. 10, a scene (1) is a scene in which the host vehicle M enters an expressway from a general road according to manual driving. A scene (2) is a scene in which the host vehicle M performs switching from the manual driving to the driving assistance of the first degree. A scene (3) is a scene in which the host vehicle M executes the lane change according to the automated driving. Hereinafter, display control corresponding to each of the scenes (1) to (3) will be described.

<Scene (1)>

For example, the scene (1) is a scene before entry into an expressway. In this scene, because the main switch 412 and the auto switch 414 of the first operator 410 have not been operated, the driving assistance is not executed and the manual driving is performed. When the manual driving is performed, the HMI controller 120 causes the first display 450 to display the information necessary for the occupant of the driver's seat to manually drive the host vehicle M using the driving operation element 80 as an image. The HMI controller 120 causes the HUD 460 to display a part of the information displayed on the first display 450 as an image. A screen of this case is shown in FIG. 11.

Figure 11:
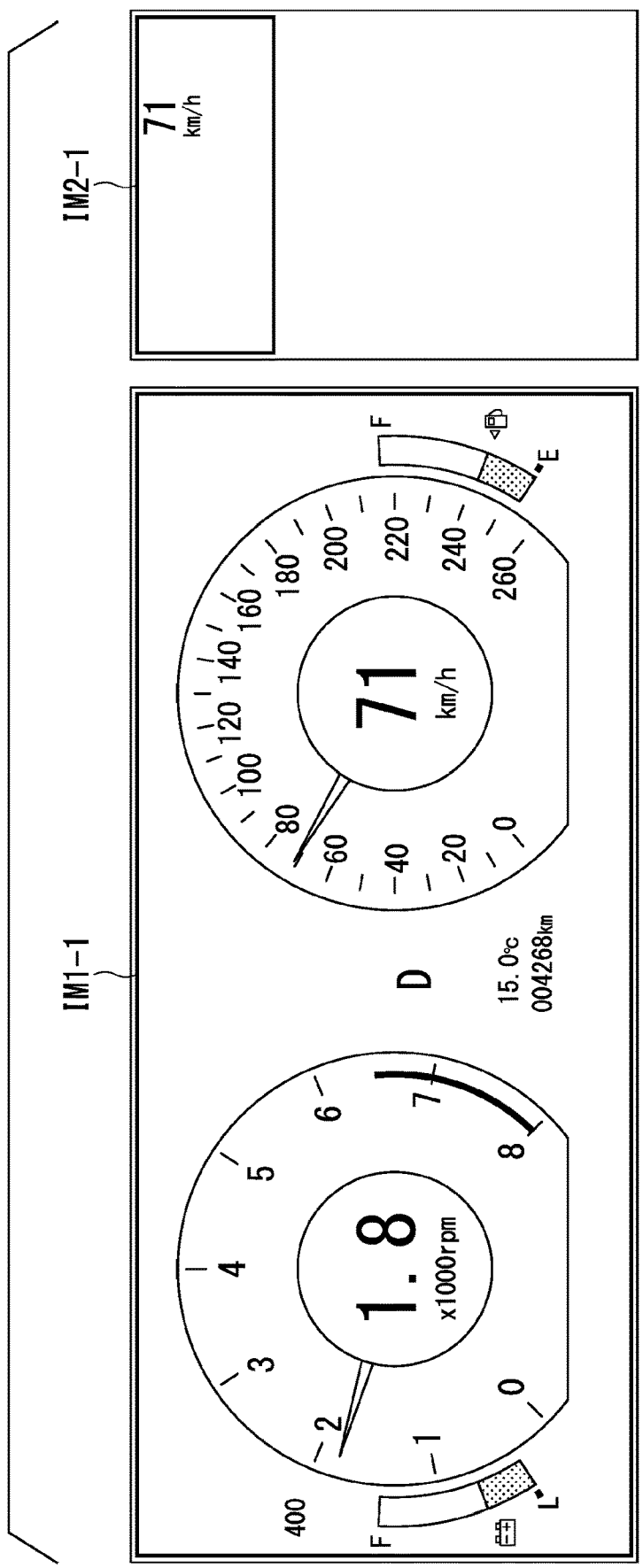
FIG. 11 is a diagram showing an example of a first screen IM1-1 and a second screen IM2-1 displayed at the time of the manual driving.

FIG. 11 is a diagram showing an example of a first screen IM1-1 and a second screen IM2-1 displayed at the time of the manual driving. The first screen IM1-1 is a screen displayed by the first display 450 and the second screen IM2-1 is a screen viewed by the eyes of the occupant due to the projection by the HUD 460. For example, the HMI controller 120 causes information about the remaining amount of battery power, a rotation speed, a shift position, an interior temperature, a travel distance, a travel speed, the remaining amount of fuel, and the like of the host vehicle M as the information necessary for traveling of the host vehicle M at the time of the manual driving to be displayed on the first screen IM1-1. Also, the HMI controller 120 causes the second screen IM2-1 to display information about a speed within an image displayed on the first screen IM1-1 so that a display size of the second screen IM2-1 is smaller than that of the first screen IM1-1. As described above, because the necessary information is projected by the HUD 460, a recognition area of the image viewed by the eyes of the occupant is smaller than a display area of the image displayed by the first display 450. Thus, the HMI controller 120 causes the first display 450 to display relatively detailed information (first information) related to the driving assistance of the host vehicle M and causes the HUD 460 to display simple information (second information) related to the driving assistance. For example, the simple information is information having an amount of information smaller than that of the detailed information. Also, the simple information may be information in which the number of types of items to be displayed or the number of items to be displayed is smaller than the number of types of items to be displayed or the number of items to be displayed as the detailed information. Also, the simple information may be an image with low resolution, a simplified image, or a deformed image with respect to an image displayed as the detailed information. Also, the simple information may be information with high importance or information with high urgency within the detailed information. The first screen IM1-1 and the second screen IM2-1 displayed at the time of the manual driving are examples of a "first screen" in the claims.

For example, the HMI controller 120 may cause the HUD 460 to display information obtained by extracting a part of the detailed information as the simple information. For example, in FIG. 11, the HMI controller 120 extracts information indicating the speed of the host vehicle M from the detailed information displayed on the first screen IM1-1 and causes the second screen IM2-1 to display the extracted information. As described above, the detailed information is displayed on the first display 450 and the simple information is displayed on the HUD 460, so that it is possible to appropriately provide the information about the driving assistance and prevent the eyes of the occupant from becoming tired.

<Scene (2)>

In the scene (2), the host vehicle M enters the expressway. When the HMI controller 120 receives an operation on the main switch 412 performed by the occupant, the HMI controller 120 changes screens to be displayed on the first display 450 and the HUD 460. Display details of the screen after the change are shown in FIG. 12.

Figure 12:
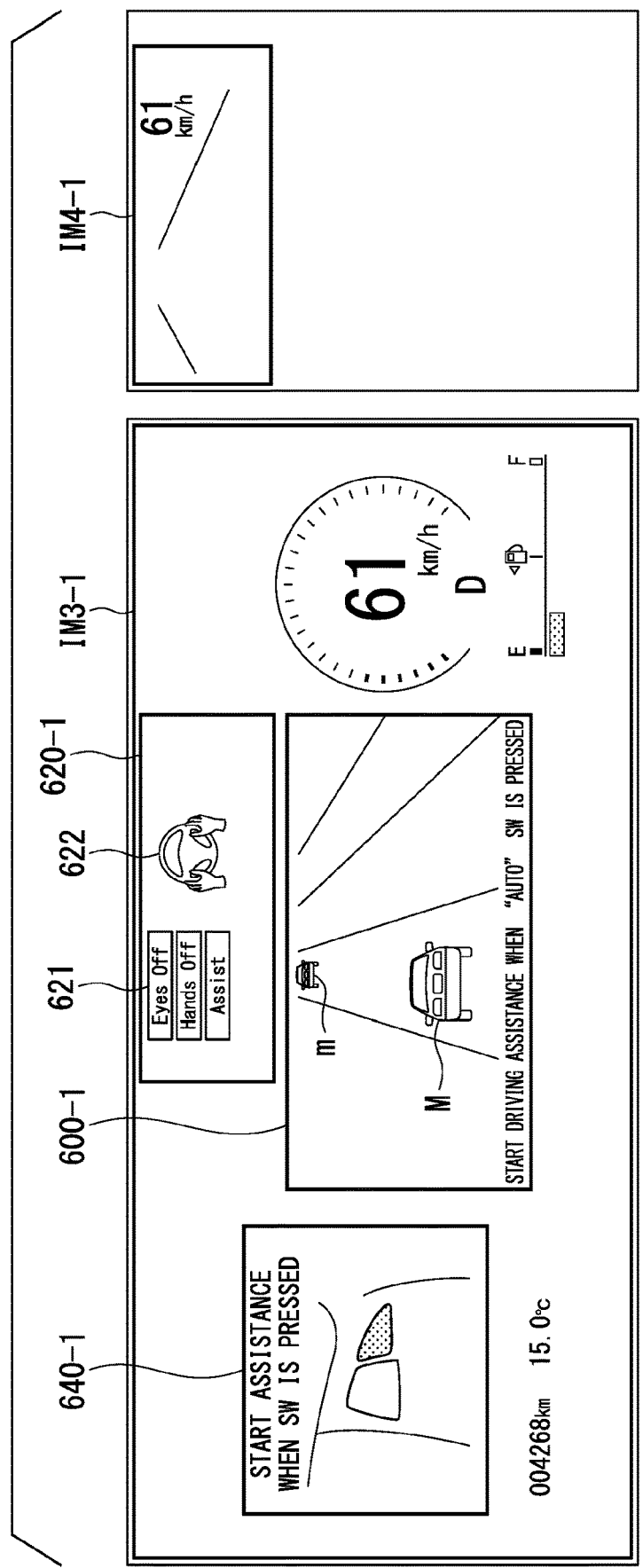
FIG. 12 is a diagram showing an example of a third screen IM3-1 and a fourth screen IM4-1 displayed when a main switch 412 has been operated.

FIG. 12 is a diagram showing an example of a third screen IM3-1 and a fourth screen IM4-1 displayed when the main switch 412 has been operated. The third screen IM3-1 is a screen displayed by the first display 450, and the fourth screen IM4-1 is a screen viewed by the eyes of the occupant by the projection from the HUD 460. The same applies to a third screen IM3-X (X is any natural number) and a fourth screen IM4-X shown in the following drawings. The third screen IM3-X and the fourth screen IM4-X are continuously displayed in a state in which the driving assistance is executable and in a state in which the driving assistance is being executed.

The third screen IM3-X and the fourth screen IM4-X are examples of a "second screen" in the claims.

The third screen IM3-1 includes a surroundings detection information display area 600-1, a driving assistance state display area 620-1, and a driving assistance start operation guide area 640-1 as areas where a state in which the driving assistance can be started (a standby state) is displayed. Hereinafter, areas in the third screen IM3-X are referred to as a surroundings detection information display area 600-X, a driving assistance state display area 620-X, and a driving assistance start operation guide area 640-X.

For example, the HMI controller 120 causes an image showing a shape of a road on which the host vehicle M is traveling acquired from the second map information 62, an image showing the host vehicle M recognized by the host vehicle position recognizer 322, and an image showing a nearby vehicle m recognized by the external environment recognizer 321 to be displayed in the surroundings detection information display area 600-1. Also, the HMI controller 120 causes the first display 450 to display an image showing all nearby vehicles m recognized by the external environment recognizer 321. Also, the HMI controller 120 may cause the first display 450 to display only nearby vehicles m that affect a future trajectory of the host vehicle M among all nearby vehicles m recognized by the external environment recognizer 321. Thereby, it is possible to reduce the number of vehicles to be monitored by the occupant and it is possible to reduce a burden of monitoring.

Also, the HMI controller 120 causes information indicating a degree of driving assistance (including the automated driving) executable by the host vehicle M to be displayed in the driving assistance state display area 620-1. In the example of FIG. 12, an image 621 indicating three indicators "Assist", "Hands Off", and "Eyes Off" is shown as the information indicating the degree of driving assistance. For example, the degree of driving assistance is expressed by each indicator alone or a combination of a plurality of indicators.

The indicator "Assist" is an indicator for indicating a state (an on state) in which the driving assistance of the first degree is being executed or a state (an off state) in which the transition to the driving assistance of the first degree is possible.

The indicator "Hands Off" is an indicator for indicating a state (an on state) in which the driving assistance of the second degree is being executed or a state (an off state) in which the transition to the driving assistance of the second degree is possible.

The indicator "Eyes Off" is an indicator for indicating a state (an on state) in which the driving assistance of the third degree is being executed or a state (an off state) in which the transition to the driving assistance of the third degree is possible.

These indicators may include indicators corresponding to a state in which driving assistance is being executed and a state in which the transition to driving assistance is possible. It is possible to ascertain whether or not the driving assistance of each degree is being executed or whether or not the transition to the driving assistance of each degree is possible by means of a requested action notification image 622 to be described below. For example, each indicator is highlighted and displayed when the driving assistance of a corresponding degree is being executed and is displayed as being grayed out when the transition to the driving assistance of the corresponding degree is possible. In the example of FIG. 12, because all indicators are grayed out and displayed, it is indicated that the driving assistance of any degree is not being executed, i.e., that the driving mode is the manual driving.

Also, the HMI controller 120 displays the requested action notification image 622 at a display position corresponding to the image 621 showing the three indicators "Assist", "Hands Off", and "Eyes Off" in the driving assistance state display area 620-1. The term "corresponding" refers to a form in which a corresponding relationship such as the presence of a guideline indicating horizontal alignment, vertical alignment, or association can be recognized by a person. As an example, the "display position corresponding to the image 621 of the indicator" is a display position adjacent to the image 621 and is a display position several centimeters [cm] or less (for example, 3 [cm] or less) away from the display position of the image 621 which is a reference in at least one of upward, downward, right, and left directions. For example, the requested action notification image 622 is an image showing a prescribed action performed on the driving operation element 80 by the occupant. For example, the requested action notification image 622 includes an image showing the driving operation element 80 and an image showing a prescribed portion of the occupant. For example, the requested action notification image 622 is an image schematically showing a positional relationship between the steering wheel 82 and hands of the occupant.

The HMI controller 120 causes information for guiding the occupant with respect to his/her operation of starting the driving assistance to be displayed in the driving assistance start operation guide area 640-1. In an example of FIG. 12, the occupant is guided in the driving assistance start operation guide area 640-1 so that the driving assistance is started by the occupant operating the auto switch 414.

In addition to or instead of displaying that the driving assistance is started by the occupant operating the auto switch 414 in the driving assistance start operation guide area 640-1, the HMI controller 120 may cause a sound indicating that the driving assistance is started by the occupant operating the auto switch 414 to be output from the speaker included in the HMI 400.

At least a part of the information displayed in the surroundings detection information display area 600-1, the driving assistance state display area 620-1, and the driving assistance start operation guide area 640-1 may be displayed in another display area. Also, information about a travel distance, a temperature inside the vehicle, fuel, a speed, and a shift position of the host vehicle M may be displayed on the third screen IM3-1.

The HMI controller 120 causes simple information obtained by extracting a part of the detailed information to be displayed on the fourth screen IM4-1 of the HUD 460 with respect to the detailed information displayed on the third screen IM3-1. Information about a road shape in front of the host vehicle M and information indicating a speed of the host vehicle M within information about the driving assistance displayed on the third screen IM3-1 of the first display 450 are displayed on the fourth screen M4-1 of the HUD 460.

In a state shown in FIG. 12, when it is detected that the auto switch 414 has been operated by the occupant as a prescribed event, the master controller 100 causes the driving assistance controller 200 to execute the driving assistance of the first degree. Also, for example, the HMI controller 120 changes the screens to be displayed on the first display 450 and the HUD 460 to screens shown in FIG. 13.

Figure 13:
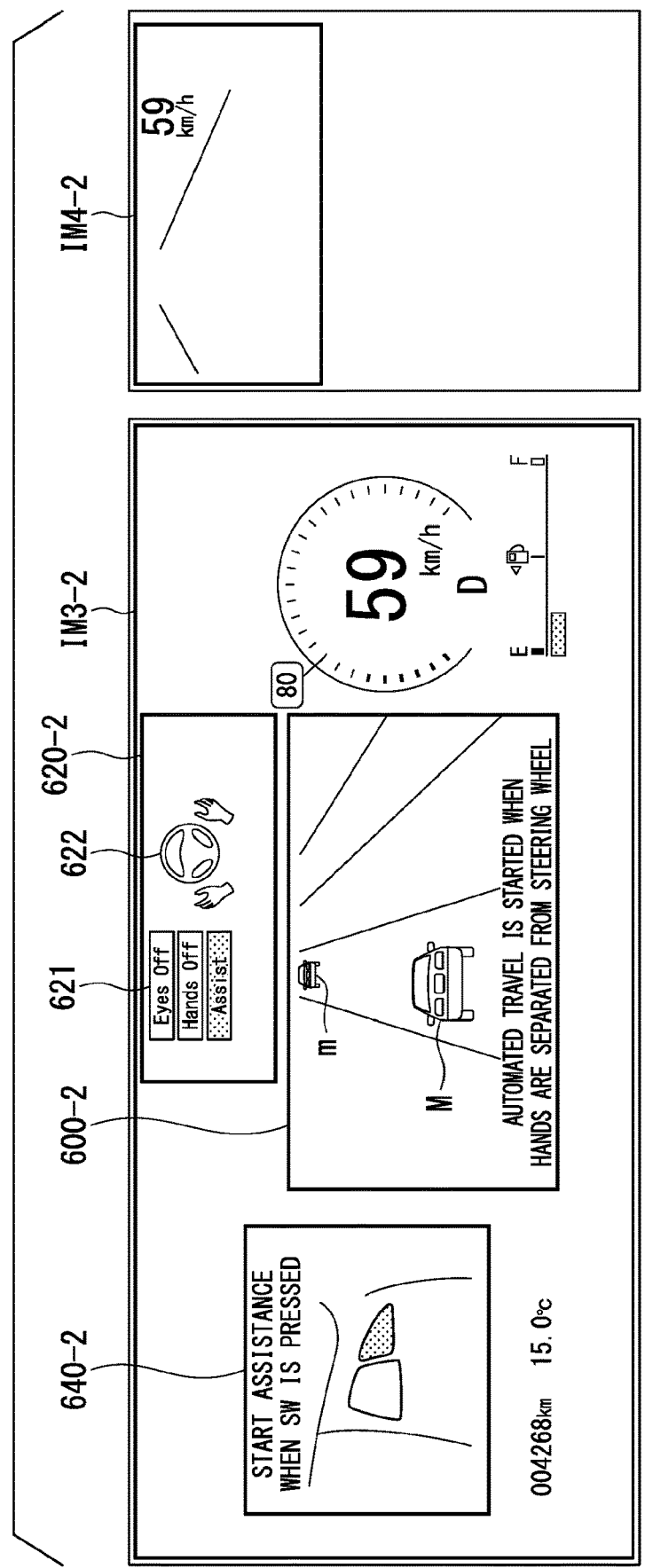
FIG. 13 is a diagram showing an example of a third screen IM3-2 and a fourth screen IM4-2 displayed on a first display 450 and an HUD 460 when an auto switch 414 has been operated.

FIG. 13 is a diagram showing an example of a third screen IM3-2 and a fourth screen IM4-2 displayed when the auto switch 414 has been operated. The HMI controller 120 causes the image showing the degree of driving assistance that is being executed to be displayed so that the image showing the degree of driving assistance that is being executed is distinguishable from an image showing a degree of other driving assistance (for example, highlighted display and grayed out display). For example, the HMI controller 120 causes the image of the indicator "Assist" corresponding to the driving assistance of the first degree to be highlighted and displayed in a driving assistance state display area 620-2 of the third screen IM3-2. Thereby, the occupant can ascertain that the driving assistance of the first degree is being performed.

Here, as the requested action notification image 622, the HMI controller 120 causes a moving image for requesting the occupant to perform an operation necessary for the transition to the degree of driving assistance corresponding to "Hands Off" (automated driving) to be displayed as the requested action notification image 622. For example, the moving image is an image including a dynamic object in which a prescribed physical object dynamically moves according to a passage of time. Also, the moving image may include an animation.

For example, when the driving assistance of the first degree is being executed and the driving assistance of the second degree is executable, the HMI controller 120 causes the requested action notification image 622 schematically showing operation details of the occupant for a state in which the hands of the occupant are separated from the steering wheel 82 to be displayed in the driving assistance state display area 620-2 of the third screen IM3-2 as information about an operation method of the occupant for switching the driving assistance to the driving assistance of the second degree. The requested action notification image 622 is an image including the information about the operation method of the occupant for switching the driving assistance to the driving assistance of the second degree.

For example, when the driving assistance of the first degree is being executed and the driving assistance of the second degree is executable, the HMI controller 120 causes the requested action notification image 622 schematically showing operation details of the occupant for a state in which the hands of the occupant are separated from the steering wheel 82 to be displayed in the driving assistance state display area 620-2 of the third screen IM3-2 as information about an operation method of the occupant for switching the driving assistance to the driving assistance of the second degree.

Also, the HMI controller 120 may cause an image schematically showing a positional relationship between the accelerator pedal and a foot of the occupant or an image schematically showing a positional relationship between the brake pedal and the foot of the occupant to be displayed as the requested action notification image 623 in the driving assistance state display area 620-2 of the third screen IM3-2.

Also, the HMI controller 120 may cause information indicating that driving assistance is started by the occupant executing the action corresponding to the requested action notification image 622 to be displayed in a surroundings detection information display area 600-2. In an example of FIG. 13, information indicating that the driving assistance ("automated travel" in FIG. 13") is started when the hands of the occupant are separated from the steering wheel 82 (the "steering wheel" in FIG. 13) is displayed in the surroundings detection information display area 600-2.

Also, when the occupant is requested to perform an action of separating his/her hands from the steering wheel 82, the HMI controller 120 may cause the light emitters 430R and 430L provided on the steering wheel 82 to be turned on or blink.

Also, when the occupant is requested to perform the action of separating his/her hands from the steering wheel 82, the HMI controller 120 may cause a sound indicating the request to be output from the speaker included in the HMI 400. The HMI controller 120 may combine a plurality of forms among displaying of the requested action notification image 622, turning on or blinking of the light emitters 430R and 430L, and outputting of the sound corresponding to the action of separating the hands of the occupant from the steering wheel 82 and cause a combination of the plurality of forms to be output from various types of equipment.

The HMI controller 120 causes information similar to that of the fourth screen IM4-1 to be displayed on a fourth screen IM4-2 of the HUD 460.

Here, the operation element state determiner 130 determines whether or not the occupant is in the "Hands On" state or the "Hands Off" state on the basis of the presence or absence of a detection signal input from the grip sensor 82A. For example, the operation element state determiner 130 determines that the occupant is in the "Hands On" state when a detection signal is input from the grip sensor 82A and determines that the occupant is in the "Hands Off" state when no detection signal is input. Also, the operation element state determiner 130 may determine, for example, whether or not the electrostatic capacitance has been changed by a threshold value or more on the basis of a signal intensity of the detection signal input from the grip sensor 82A or the like and determine that the occupant is in the "Hands On" state when the electrostatic capacitance has been changed by the threshold value or more.

Also, the operation element state determiner 130 may determine that the occupant is in the "Hands On" state when the detection signal has been input from the steering torque sensor 82B and determine that the occupant is in the "Hands Off" state when no detection signal has been input. Also, the operation element state determiner 130 may determine whether or not the steering torque is greater than or equal to a threshold value on the basis of a signal intensity of the detection signal input from the steering torque sensor 82B and determine that the occupant is in the "Hands On" state when the steering torque is greater than or equal to the threshold value.

Also, the operation element state determiner 130 may determine whether the occupant is in the "Hands On" state or the "Hands Off" state on the basis of grip strength of the occupant when the steering wheel 82 is gripped (pressure applied to the wheel) and an amount of control of the electric motor (an amount of steering) in the steering device 520 instead of or in addition to the electrostatic capacitance or the steering torque.

In response to the operation of the auto switch 414, the switching controller 110 of the master controller 100 maintains the first degree as the degree of driving assistance until the operation element state determiner 130 determines that the occupant is in the "Hands Off" state after the degree of driving assistance is switched to the first degree. On the other hand, the switching controller 110 switches the degree of driving assistance from the first degree to the second degree when various conditions for the transition to the driving assistance of the second degree are satisfied and the operation element state determiner 130 determines that the occupant is in the "Hands Off" state. According to such control, the driving assistance controller 200 performs driving assistance control until the occupant is in the "Hands Off" state, the right to control transitions from the driving assistance controller 200 to the automated driving controller 300 when the occupant is in the "Hands Off" state, and the automated driving controller 300 starts automated driving control.

Figure 14:
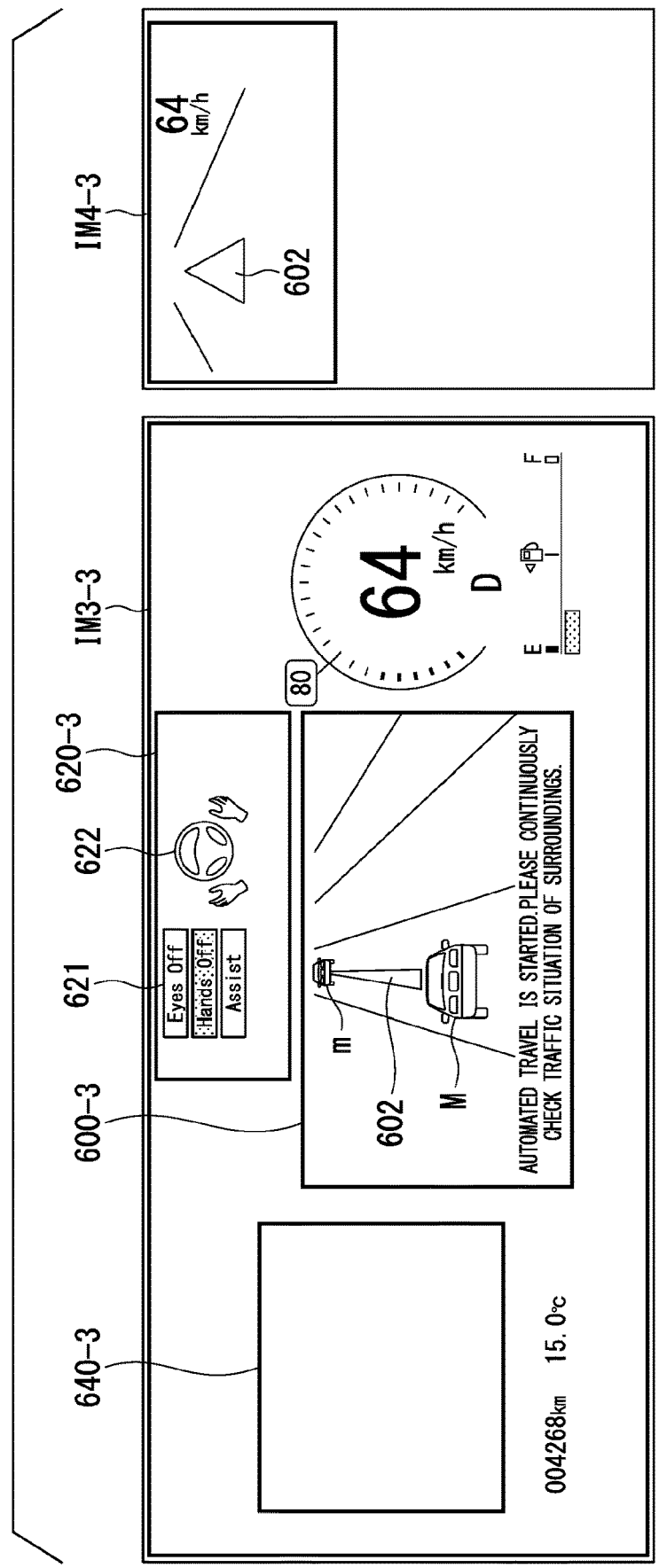
FIG. 14 is a diagram showing an example of screens displayed on the first display 450 and the HUD 460 in driving assistance of a second degree.

If the automated driving controller 300 executes the automated driving control when the degree of driving assistance is the second degree, the HMI controller 120 changes screens displayed on the first display 450 and the HUD 460 to, for example, screens shown in FIG. 14.

FIG. 14 is a diagram showing an example of screens displayed on the first display 450 and the HUD 460 in the driving assistance of the second degree. The HMI controller 120 causes the indicator "Hands Off" corresponding to the second degree of driving assistance to be highlighted and displayed in a driving assistance state display area 620-3 of the third screen IM3-3. Thereby, the occupant can ascertain that the driving assistance of the second degree is being performed.

Also, for example, the HMI controller 120 causes an image showing a road shape in front of the host vehicle M acquired from the second map information 62, an image showing the host vehicle M recognized by the host vehicle position recognizer 322, an image showing a nearby vehicle m acquired by the external environment recognizer 321, and a future trajectory image 602 showing a future trajectory of the host vehicle M generated by the action plan generator 323 to be displayed in a surroundings detection information display area 600-3. Also, the HMI controller 120 causes information indicating that the driving assistance in the second degree ("automated travel" in FIG. 14) is started, but the occupant is allowed to continuously monitor a traffic situation of surroundings to be displayed in the surroundings detection information display area 600-3.

When the degree of driving assistance is the second degree, the occupant state monitor 140 of the master controller 100 determines whether the occupant is in an "Eyes On" state or an "Eyes Off" state on the basis of a captured image of the vehicle interior camera 90 in order to check whether or not the occupant is fulfilling an obligation to monitor surroundings. For example, the image processor 140A of the occupant state monitor 140 extracts an image area including the occupant's face from the captured image of the vehicle interior camera 90 and detects a direction of a line of sight of the occupant or a direction of a face of the occupant on the basis of positions of pupils, irises, eyes, inner canthi, and the like of the occupant in the extracted image area. At this time, the image processor 140A may detect the direction of the line of sight and the direction of the face of the occupant of the host vehicle M using a neural network or the like learned in advance to detect directions of a line of sight and a face from a human face image.

For example, when the degree of driving assistance is the second degree, the monitoring determiner 140B of the occupant state monitor 140 determines whether or not a direction of the face or the line of sight detected by the image processor 140A is within a first angle range $\Delta\theta 1$ based on a certain direction, determines that the occupant is in the "Eyes On" state if the direction of the line of sight or the face of the occupant is within the first angle range $\Delta\theta 1$, and determines that the occupant is in the "Eyes Off" state if the direction of the line of sight or the face of the occupant is not within the first angle range $\Delta\theta 1$. The "certain direction" which is a reference of the first angle range $\Delta\theta 1$ is, for example, the direction of the face or the line of sight when the occupant sits in the driver's seat and the occupant is facing the front (a front window shield side). For example, the first angle range $\Delta\theta 1$ is determined to be an angle range when a prescribed angle is taken with respect to the vehicle width direction (a left/right direction when viewed from the occupant) on the basis of the direction.

When the monitoring determiner 140B determines that the occupant is in the "Eyes On" state, i.e., when the occupant is fulfilling an obligation to monitor surroundings, the switching controller 110 maintains the second degree as the degree of driving assistance. At this time, as shown in FIG. 14, nothing is displayed in the driving assistance start operation guide area 640-3 of the third screen IM3-1 of the first display 450 and information about a future trajectory image 602 of the host vehicle M is newly displayed in the fourth screen IM4-3 of the HUD 460 in addition to information similar to that of the fourth screen IM4-2 of FIG. 13.

On the other hand, when the monitoring determiner 140B determines that the occupant is in the "Eyes Off" state, i.e., when the occupant is not fulfilling the obligation to monitor surroundings, the HMI controller 120 issues a warning so that the occupant monitors surroundings by causing the first display 450 and the third display 470 of the HMI 400 to display images and causing the speaker to output a sound. When the "Eyes Off" state continues for a prescribed period of time or more, the switching controller 110 may cause the driving assistance controller 200 to perform driving assistance control by switching the degree of driving assistance from the second degree to the first degree.

Also, when the "Eyes Off" state continues for a prescribed period of time or more after the monitoring determiner 140B determines that the occupant is in the "Eyes Off" state, the switching controller 110 may cause alternative control to be performed without causing the automated driving controller 300 to perform automated driving control according to the second degree. The alternative control is, for example, automated driving control that stops the host vehicle M in an area where the host vehicle M can stop such as a road shoulder while causing the host vehicle M to gradually decelerate. Thereby, for example, when the occupant has lost consciousness and cannot monitor surroundings, the host vehicle M can be stopped without the occupant's operation.

Also, although the occupant is not obligated to monitor surroundings when the degree of driving assistance is the third degree, the monitoring determiner 140B continuously monitors how much the occupant is awake because it is necessary for the occupant to quickly monitor surroundings when the driving assistance has been switched from the driving assistance of the third degree to driving assistance in which the occupant is obligated to monitor surroundings. For example, because there is a possibility of the transition to driving assistance with a lower degree such as the driving assistance of the second degree in accordance with a change in a surrounding environment when the degree of driving assistance is the third degree, the occupant is required to take a posture for quick movement to surroundings monitoring for a case in which there is a surroundings monitoring request from a system side. Therefore, the monitoring determiner 140B continuously monitors the occupant even when the occupant is not obligated to monitor surroundings and determines whether or not the occupant can quickly monitor surroundings.

For example, the monitoring determiner 140B determines whether or not the direction of the face or the line of sight detected by the image processor 140A is within a second angle range $\Delta\theta 2$ that is wider than the first angle range $\Delta\theta 1$ and determines that the occupant can quickly monitor surroundings if the direction of the face or the line of sight of the occupant is within the second angle range $\Delta\theta 2$.

FIG. 15 is a diagram schematically showing a structure of the interior of the host vehicle M when the host vehicle M is viewed from above. In FIG. 15, STD denotes a seat which is the driver's seat, and an arrow V indicates a direction which is a reference of the first angle range $\Delta\theta 1$. For example, the first angle range $\Delta\theta 1$ is determined so that the first display 450 is included in the angle range when the host vehicle M is viewed from above. Also, the second angle range $\Delta\theta 2$ is determined so that the angle range includes at least both the first display 450 and the third display 470 when the host vehicle M is viewed from above. Also, as shown in FIG. 15, the first angle range $\Delta\theta 1$ and the second angle range $\Delta\theta 2$ do not need to be bilaterally symmetric with respect to the direction V and the angle range may be biased to one side.

When the monitoring determiner 140B determines that the occupant can quickly monitor surroundings, the switching controller 110 maintains the third degree as the degree of driving assistance. On the other hand, when the monitoring determiner 140B determines that the occupant cannot quickly monitor surroundings, the HMI controller 120 warns the occupant to take a posture so that at least the first display 450 and the third display 470 enter his/her field of view by causing the first display 450 and the third display 470 of the HMI 400 to display images or causing the speaker to output a sound. When a state in which surroundings cannot be monitored has continued for a prescribed period of time or more, the switching controller 110 may switch the degree of driving assistance from the third degree to the second degree.

Also, the occupant state monitor 140 may determine how much the occupant is awake when the degree of driving assistance is the second degree. For example, the monitoring determiner 140B measures a period of time during which the image processor 140A cannot detect the occupant's pupils or irises from a captured image of the vehicle interior camera 90, i.e., a period of time during which the occupant closes his/her eyes, and determines that a wakefulness level of the occupant is lower when the period of time is longer. Also, the monitoring determiner 140B may determine whether or not the occupant is awake on the basis of a detection result from a pressure sensor (not shown) provided in the seat STD which is the driver's seat. For example, when a change in pressure detected by the pressure sensor is less than or equal to a threshold value, the monitoring determiner 140B determines that the occupant is not awake.

The switching controller 110 determines to continue the driving assistance of the second degree or to perform switching to the driving assistance of another degree or the manual driving in accordance with the wakefulness level of the occupant obtained in the course of the determination process of the occupant state monitor 140. For example, in a case in which the wakefulness level when the occupant is awake is 1 and the wakefulness level when the occupant is not awake is 0, the switching controller 110 determines that the occupant is awake if a numerical value of the wakefulness level is greater than or equal to a certain threshold value (for example, about 0.5) and continues the degree of driving assistance as the second degree.

<Scene (3)>

In a scene (3), a state in which the automated driving controller 300 causes the host vehicle M to make a lane change according to automated driving control at the time of the driving assistance of the second degree is shown. In this case, the HMI controller 120 causes the first display 450 and the HUD 460 to display screens corresponding to the automated driving control of the lane change.

For example, the HMI controller 120 causes the image showing the occurrence of the lane change event of the host vehicle M executed by the automated driving controller 300 to be displayed in a first form at a first timing before behavior of the host vehicle M changes (for example, five seconds before the behavior changes).

Figure 16:
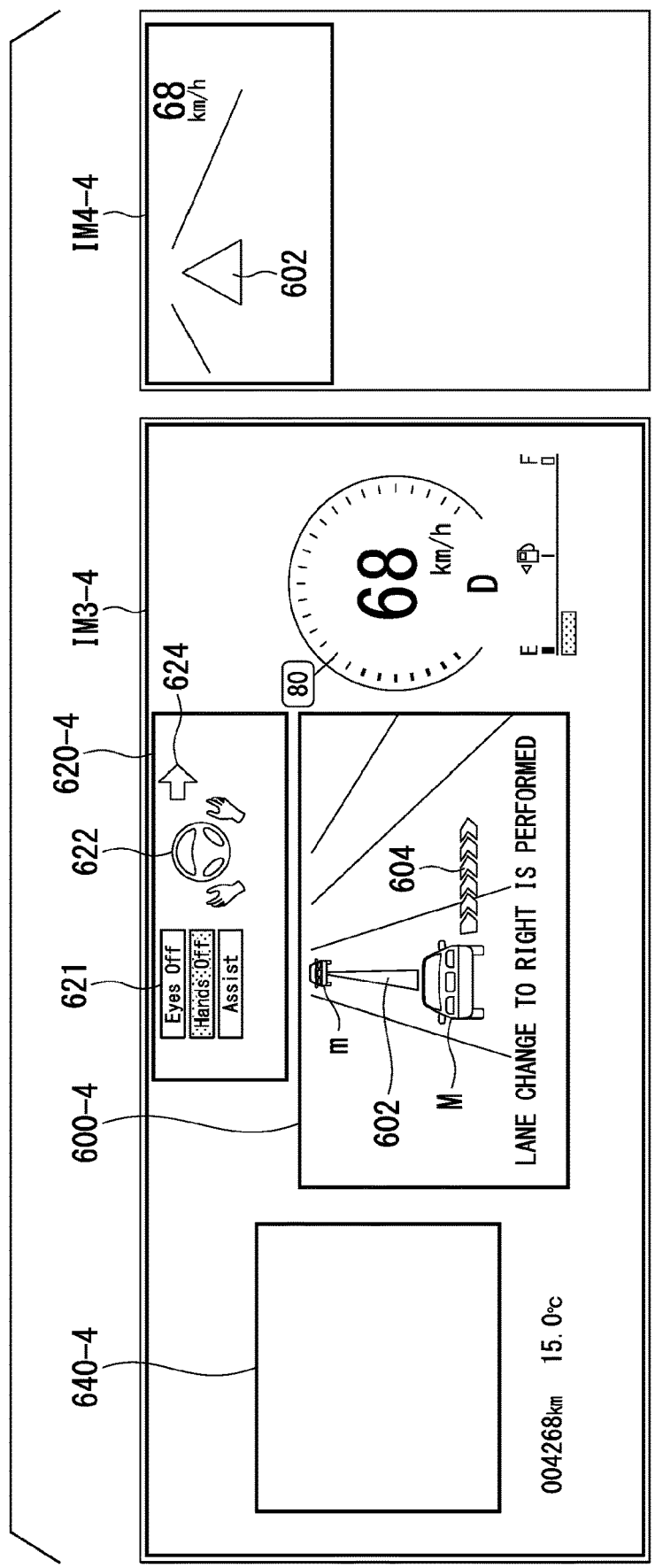
FIG. 16 is a diagram showing an example of a third screen IM3-4 and a fourth screen IM4-4 displayed at a first timing before the behavior of the host vehicle M changes.

FIG. 16 is a diagram showing an example of a third screen IM3-4 and a fourth screen IM4-4 displayed at the first timing before the behavior of the host vehicle M changes. In addition to details displayed in the surroundings detection information display area 600-3, for example, the HMI controller 120 causes an image 604 showing a direction in which the host vehicle M performs the lane change to be displayed in a surroundings detection information display area 600-4 of the third screen IM3-4. In an example of FIG. 16, the image 604 in which the host vehicle M performs a lane change to a right lane adjacent to the travel lane is displayed.

For example, the image 604 is an image that does not include text. In an example of FIG. 16, the image 604 is a figure showing a course change direction of the host vehicle M in a road width direction. For example, the HMI controller 120 gives an outer frame to the figure showing the course change direction of the host vehicle M and causes the first display 450 to display an image to which the outer frame has been given. Also, the HMI controller 120 divides the image 604 into a plurality of areas, gives outer frames to the plurality of divided areas, and causes the outer frames of the plurality of divided areas to be displayed. Also, the HMI controller 120 may cause the outer frames of the plurality of divided areas to be displayed in an animation in which the outer frames of the plurality of divided areas are sequentially displayed in the course change direction of the host vehicle M.

Also, the HMI controller 120 causes a direction indicator 624 indicating the course change of the host vehicle M to be displayed in a driving assistance state display area 620-4. For example, the direction indicator 624 is a figure such as an arrow indicating the course change direction. The HMI controller 120 causes the direction indicator 624 to be displayed on the first display 450 at a timing synchronized with the first timing at which the image 604 is displayed.

The HMI controller 120 causes information similar to that of the fourth screen IM4-3 to be displayed on the fourth screen IM4-4 of the HUD 460.

Also, the HMI controller 120 causes an image in which the image 604 is emphasized and displayed to be displayed in the surroundings detection information display area 600-4 at a second timing which is a timing after the first timing and before the behavior of the host vehicle M changes (for example, two seconds before the behavior changes).

Figure 17:
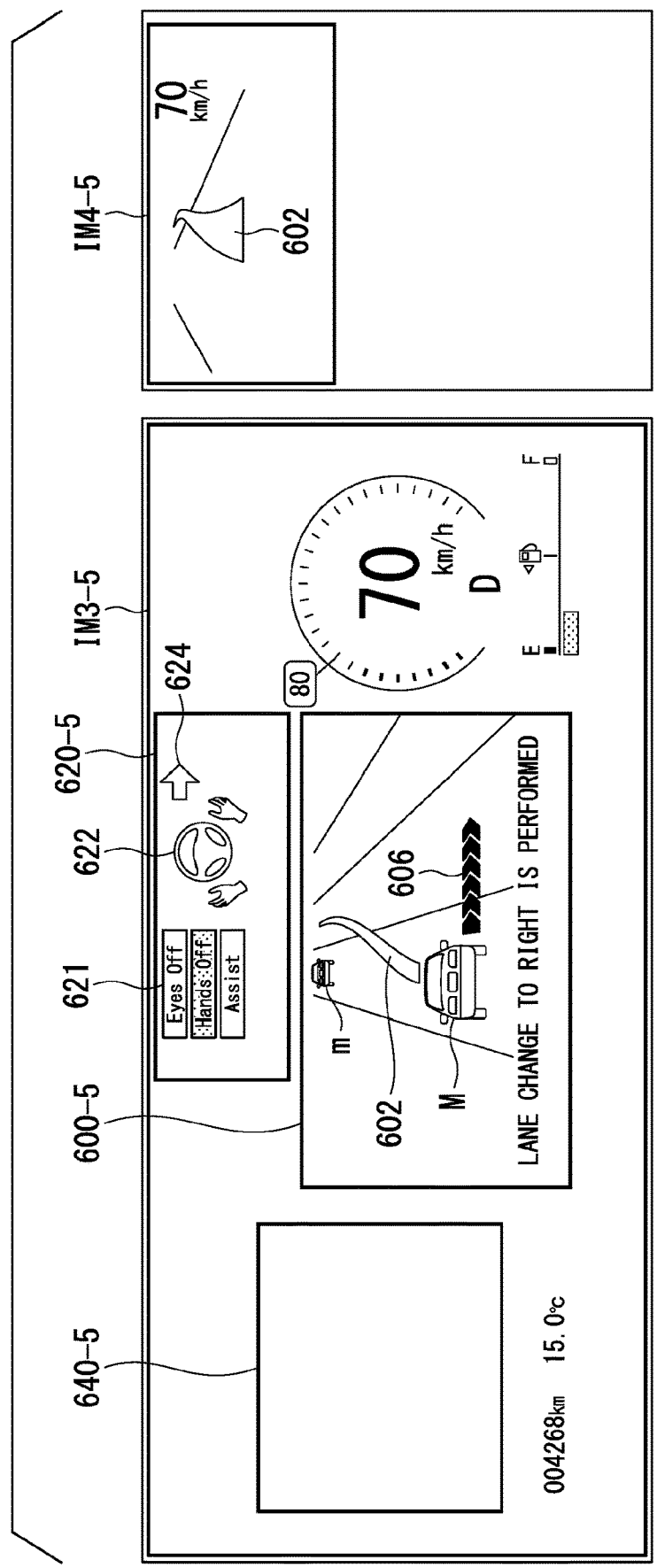
FIG. 17 is a diagram showing an example of a third screen IM3-5 and a fourth screen IM4-5 displayed at a second timing before the behavior of the host vehicle M changes.

FIG. 17 is a diagram showing an example of a third screen IM3-5 and a fourth screen IM4-5 displayed at the second timing before the behavior of the host vehicle M changes. The HMI controller 120 causes an image 606 in which the image 604 is highlighted and displayed to be displayed in a surroundings detection information display area 600-5 of the third screen IM3-5. For example, the HMI controller 120 causes a display form in which the inside of the outer frame of the image 604 is colored to be displayed in the surroundings detection information display area 600-5. Also, the HMI controller 120 may cause the outer frames of the plurality of areas divided in the image 604 to be displayed in an animation so that the outer frames are sequentially highlighted and displayed in the course change direction of the host vehicle M. Also, the HMI controller 120 may cause the image 606 to be displayed at the first timing and may cause the image 606 to be blinked and displayed at the second timing. Also, the HMI controller 120 may cause the image 606 to be displayed at the first timing and cause the image 606 at the second timing to be displayed in a color that is more conspicuous than a color displayed at the first timing. Thereby, the occupant can intuitively ascertain the course change direction.

Also, the HMI controller 120 causes the future trajectory image 602 displayed in the surroundings detection information display area 600-5 to be changed to a direction corresponding to the course change direction at a timing synchronized with the second timing. Thereby, the occupant may intuitively ascertain that the change in the behavior is started in the lane change of the host vehicle M.

The HMI controller 120 causes information similar to that of the fourth screen IM4-4 to be displayed on the fourth screen IM4-5 of the HUD 460. Also, the HMI controller 120 causes the future trajectory image 602 displayed on the fourth screen IM4-5 of the HUD 460 to be displayed by making a change to a direction corresponding to the course change at a timing synchronized with the second timing.

As described above, when the lane change is started according to the automated driving control at the time of the driving assistance of the second degree, i.e., when a course direction of the host vehicle M is changed, the occupant state monitor 140 may change one or both of a direction, which is a reference of the first angle range $\Delta\theta 1$, and the first angle range $\Delta\theta 1$ in accordance with a future traveling direction of the host vehicle M.

FIG. 18 is a diagram schematically showing a state in which a direction, which is a reference of the first angle range $\Delta\theta 1$, is changed at the time of the start of the lane change. For example, when the lane change to an adjacent lane on the right side is scheduled as shown in FIG. 18, the occupant is assumed to stop front monitoring and perform monitoring in a course direction because a trajectory indicating the course direction of the host vehicle M is displayed on the first display 450 as shown in FIG. 18. Accordingly, the occupant state monitor 140 causes the first angle range Δθ1 to be moved in a direction in which the occupant is assumed to perform monitoring by inclining the direction V, which is the reference of the first angle range Δθ1, to a course direction side (a right-hand side) of the host vehicle M. Thereby, it is determined that surroundings are continuously monitored even when the occupant removes his/her line of sight from the front. Also, the occupant state monitor 140 may cope with the occupant removing his/her line of sight from the front at the time of the lane change by expanding the first angle range Δθ1 in the course direction of the host vehicle M.

<Process Flow Corresponding to Scenes (1) to (3)>

Figure 19:
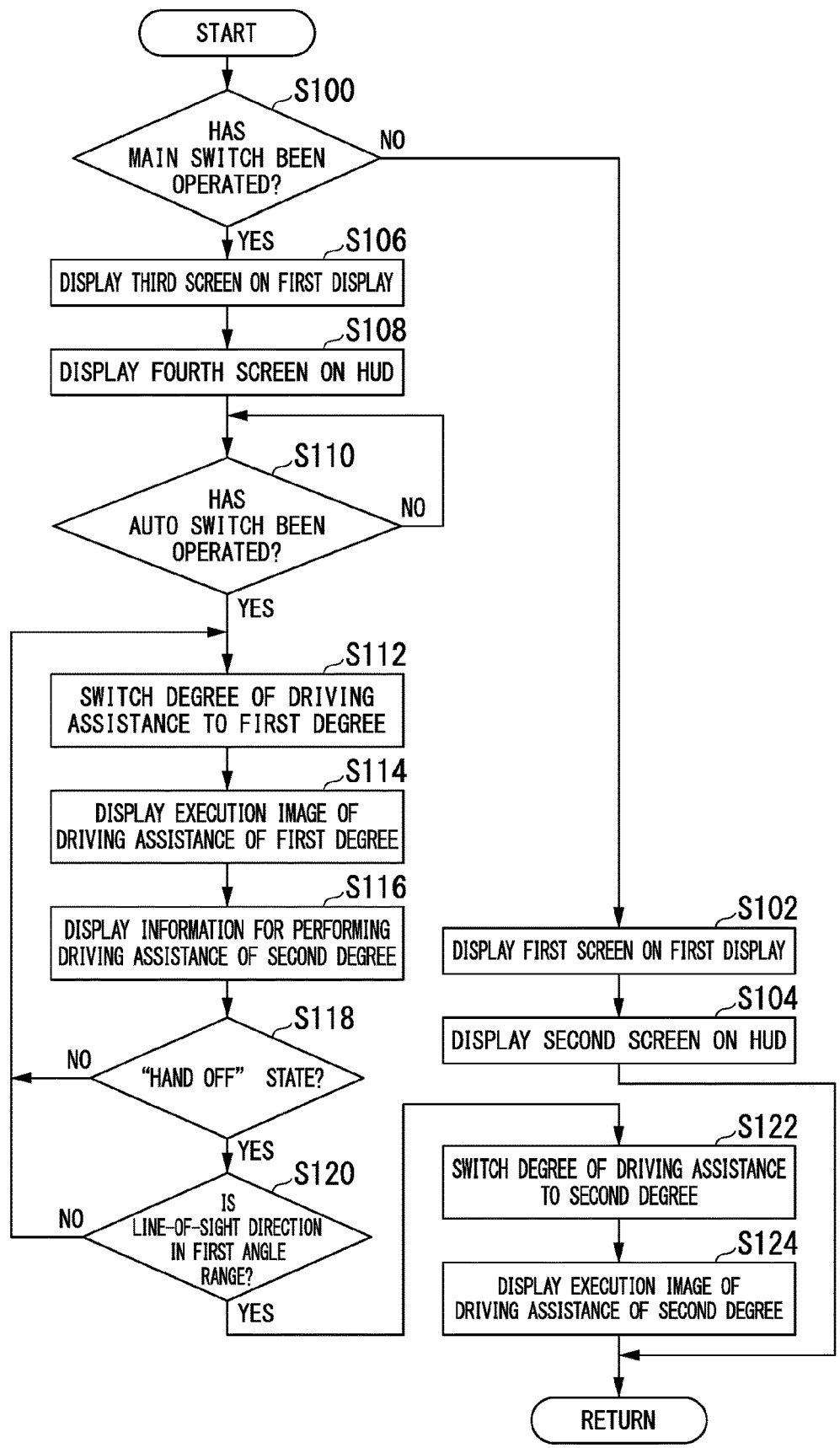
FIG. 19 is a flowchart showing an example of a flow of a process to be executed by a master controller 100 in scenes (1) to (3).

FIG. 19 is a flowchart showing an example of a flow of a process to be executed by the master controller 100 in scenes (1) to (3). The process of the present flowchart is executed at the time of the manual driving.

First, the HMI controller 120 determines whether or not the main switch 412 has been operated (step S100). When it is determined that the main switch 412 has not been operated, the HMI controller 120 causes the first display 450 to display the first screen IM1-1 (step S102) and causes the HUD 460 to display the second screen IM2-1 (step S104).

On the other hand, when it is determined that the main switch 412 has been operated, the HMI controller 120 causes the first display 450 to display the third screen IM3-1 (step S106) and causes the HUD 460 to display the fourth screen IM4-1 (step S108).

Next, the switching controller 110 determines whether or not the auto switch 414 has been operated (step S110). When it is determined that the auto switch 414 has been operated, the switching controller 110 causes the driving assistance controller 200 to start driving assistance control by performing switching from the manual driving to the first degree (step S112).

Next, the HMI controller 120 displays an image showing that the driving assistance of the first degree is being executed on the third screen IM3-1 and the fourth screen IM4-1 (step S114). Next, the HMI controller 120 displays information for making the transition to the driving assistance of the second degree on the third screen IM3-2 (step S116).

Next, the operation element state determiner 130 determines whether or not the occupant is in the "Hands Off" state (step S118). When the operation element state determiner 130 determines that the occupant is in the "Hands On" state, the switching controller 110 returns to the processing of S112 and maintains the first degree as the degree of driving assistance.

On the other hand, when the operation element state determiner 130 determines that the occupant is in the "Hands Off" state, the monitoring determiner 140B determines whether or not a direction of the face or the line of sight of the occupant is within the first angle range Δθ1 (step S120).

When the monitoring determiner 140B determines that the direction of the face or the line of sight of the occupant is not within the first angle range Δθ1, i.e., when the occupant is in the "Eyes Off" state, the switching controller 110 returns to the processing of S112 and maintains the first degree as the degree of driving assistance.

Also, the monitoring determiner 140B may determine that the occupant is in the "Eyes Off" state when the image processor 140A does not detect the direction of the face or the line of sight of the occupant for a prescribed period of time or more.

On the other hand, when the monitoring determiner 140B determines that the direction of the face or the line of sight of the occupant is within the first angle range Δθ1, i.e., when the occupant is in the "Eyes On" state, the switching controller 110 switches the degree of driving assistance from the first degree to the second degree (step S122).

Next, the HMI controller 120 causes the third screen IM3-3 of the first display 450 to display an image showing that the driving assistance of the second degree is being executed (step S124). Thereby, the process of the present flowchart ends.

Figure 20:
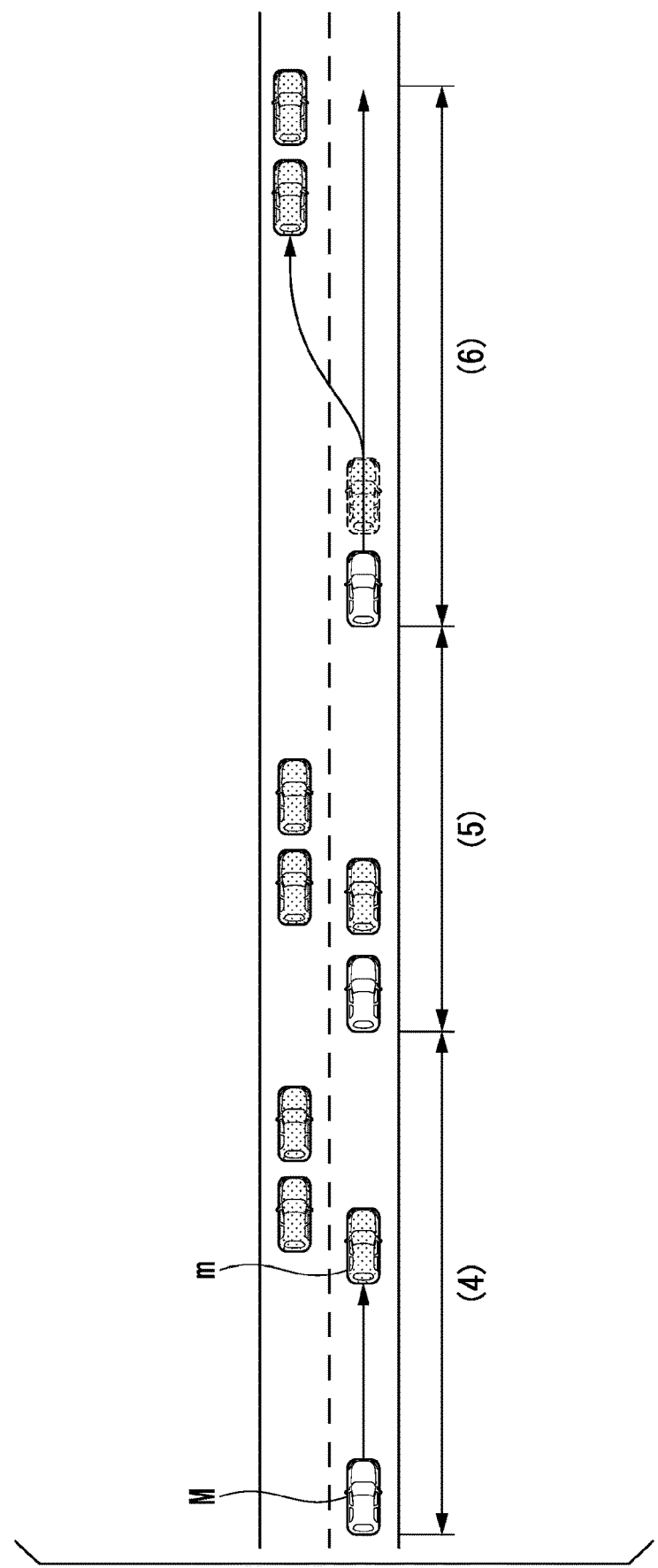
FIG. 20 is a diagram showing various types of scenes including switching from driving assistance of a second degree to driving assistance of a third degree and subsequent switching from the driving assistance of the third degree to the driving assistance of the second degree.

Next, scenes (4) to (6) after the transition to the driving assistance of the second degree will be described. FIG. 20 is a diagram showing various types of scenes including switching from the driving assistance of the second degree to the driving assistance of the third degree and subsequent switching from the driving assistance of the third degree to the driving assistance of the second degree. In the example of FIG. 20, a scene (4) is a scene in which the driving assistance is switched from the driving assistance of the second degree to the driving assistance of the third degree when the host vehicle M follows the nearby vehicle m in a traffic jam. The term "follow" indicates, for example, a travel form in which the host vehicle M travels while uniformly maintaining a relative distance (an inter-vehicle distance) between the host vehicle M and a preceding traveling vehicle.

A scene (5) is a scene in which low-speed following travel (traffic jam pilot (TJP)), which is an example of the driving assistance of the third degree, is being executed. The low-speed following travel is a control form in which the host vehicle M follows the preceding traveling vehicle at a prescribed speed or less. The low-speed following travel is executed on a condition that the speed of the preceding traveling vehicle m is lower than or equal to a prescribed speed and the inter-vehicle distance between the host vehicle M and the preceding traveling vehicle m is within a prescribed distance (for example, about 50 [m]). In the low-speed following travel, it is possible to implement automated driving in which the occupant is not obligated to monitor surroundings or automated driving in which a degree of surroundings monitoring imposed on the occupant as an obligation is reduced by continuing relatively easy automated driving control for following the preceding traveling vehicle on a congested road. The term "degree of surroundings monitoring is reduced" indicates that the surroundings monitoring obligation is more easily continued by expanding the first angle range Δθ1 to the second angle range Δθ2 and increasing a space allowed as the direction of the face or the line of sight of the occupant as described above. Also, for example, in the low-speed following travel, the degree of surroundings monitoring may be reduced by making the surroundings monitoring unnecessary until a prescribed period of time (for example, 5 seconds) has elapsed from the start of control. Also, one of a prescribed speed or less or following the preceding traveling vehicle may be designated as an activation condition of the low-speed following travel.

A scene (6) is a scene in which the driving assistance is switched from the driving assistance of the third degree to the driving assistance of the second degree. Hereinafter, display control corresponding to each of the scenes (4) to (6) will be described.

<Scene (4)>

In the scene (4), the automated driving controller 300 performs acceleration control of the host vehicle M in a state in which the host vehicle M has not yet reached low-speed following travel. In this case, the HMI controller 120 causes one or both of the first display 450 and the HUD 460 to display screens corresponding to the driving assistance.

Figure 21:
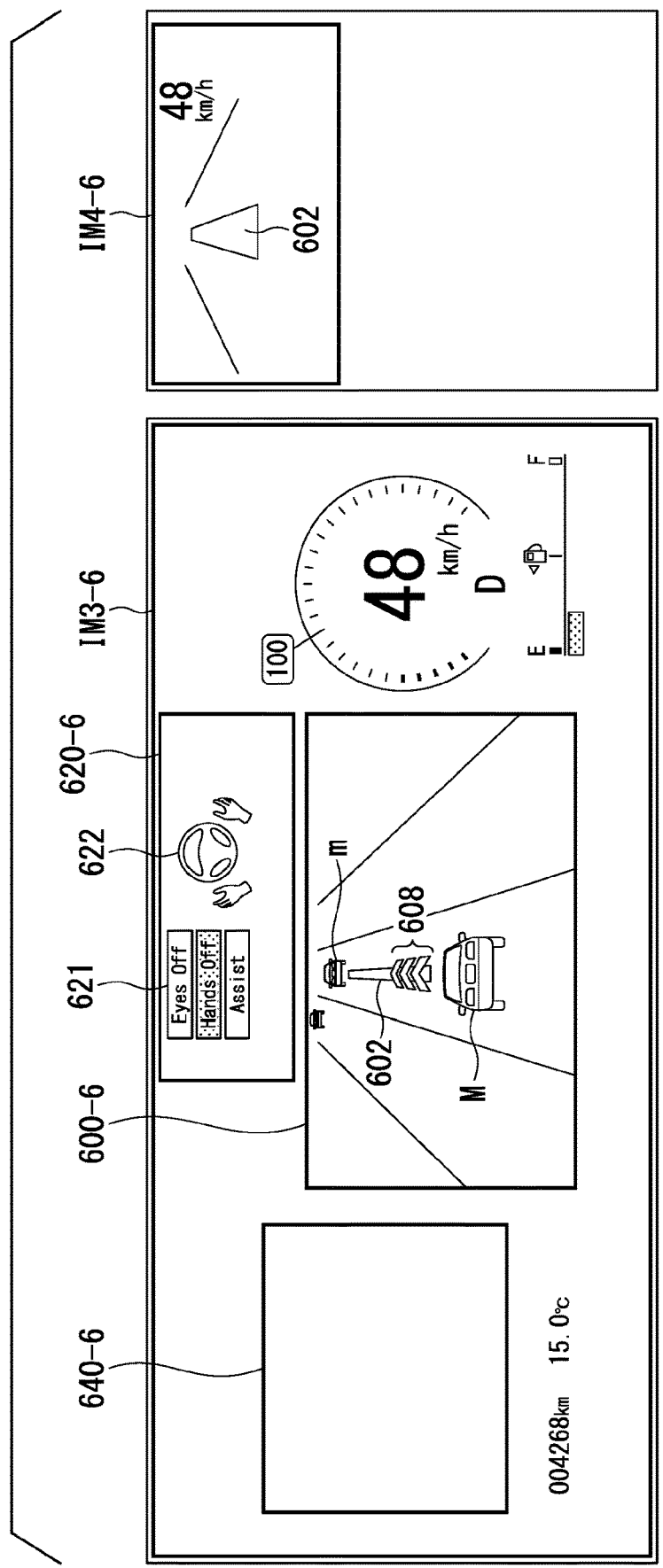
FIG. 21 is a diagram showing an example of a third screen IM3-6 and a fourth screen IM4-6 displayed at the time of acceleration control of the host vehicle M.

FIG. 21 is a diagram showing an example of a third screen IM3-6 and a fourth screen IM4-6 displayed at the time of the acceleration control of the host vehicle M. In the screen shown in FIG. 21, the activation condition of the low-speed following travel has not yet been satisfied. The HMI controller 120 causes an image 608 showing that the acceleration control is being executed to be displayed in a surroundings detection information display area 600-6 of the third screen IM3-6. The image 608 is a figure indicating the acceleration of the host vehicle M. The image 608 is displayed in front of the image showing the host vehicle M. In this case, the HMI controller 120 may cause the image 608 to be displayed in a first display form in which an outer frame is given to the image 608 at a first timing before the host vehicle M accelerates and cause the image 608 to be displayed in a second display form in which the inside of the outer frame of the image is colored at a second timing before the host vehicle M accelerates. Also, at the time of acceleration, the HMI controller 120 may cause an animation in which the image 608 moves to be displayed in the progress direction of the host vehicle. In contrast, at the time of deceleration, the HMI controller 120 may cause an animation in which the image 608 moves toward the host vehicle to be displayed. Thereby, the occupant can intuitively ascertain that the acceleration control of the host vehicle M is being executed.

<Scene (5)>

In the scene (5), the switching controller 110 switches the degree of driving assistance from the second degree to the third degree and the automated driving controller 300 is further executing the low-speed following travel. In this case, the HMI controller 120 causes the first display 450 and the HUD 460 to display screens corresponding to the third degree of driving assistance (the low-speed following travel).

Figure 22:
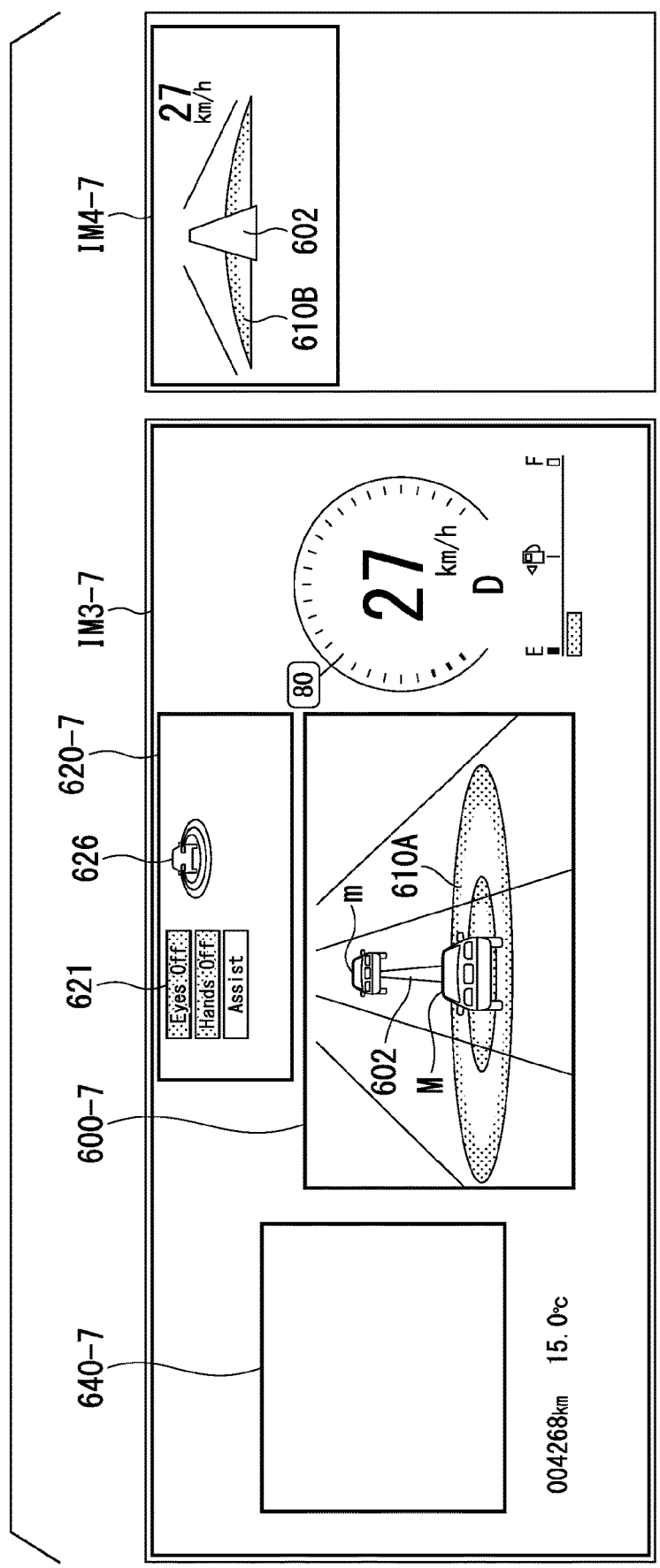
FIG. 22 is a diagram showing an example of a third screen IM3-7 and a fourth screen IM4-7 displayed at the time of low-speed following travel.

FIG. 22 is a diagram showing an example of a third screen IM3-7 and a fourth screen IM4-7 displayed at the time of the low-speed following travel. The HMI controller 120 causes a surroundings detection image 610A indicating that the driving assistance of the third degree is being executed to be displayed in a surroundings detection information display area 600-7. The surroundings detection image 610A is an image showing that the monitoring of the surroundings of the host vehicle M is being performed by the camera 10, the radar device 12, the finder 14, the physical object recognition device 16, and the external environment recognizer 321. For example, the surroundings detection image 610A is an animation (a moving image) in which ripples spread outward from the center of the host vehicle M.

Also, the HMI controller 120 causes the images of the indicator "Eyes Off" indicating that no surroundings monitoring obligation is imposed on the occupant of the host vehicle M and the indicator "Hands Off" indicating that the operation on the driving operation element 80 is not requested to be highlighted and displayed in a driving assistance state display area 620-7 of the third screen IM3-7. Also, the HMI controller 120 causes an image 626 showing that the surroundings of the host vehicle M are being monitored by the camera 10, the radar device 12, the finder 14, the physical object recognition device 16, and the external environment recognizer 321 to be displayed in the driving assistance state display area 620-7.

Also, in addition to information similar to that of the fourth screen IM4-6, the HMI controller 120 causes a surroundings detection image 610B showing that the driving assistance of the third degree is being executed to be displayed on the fourth screen IM4-7 of the HUD 460.

Because the occupant is not obligated to monitor surroundings when the third degree of driving assistance is performed, the occupant can newly use equipment installed outside the first angle range Δθ1 such as the third display 470 during automated driving. Thus, the HMI controller 120 performs control for notifying the occupant of equipment that is newly usable due to an increase in the degree of driving assistance.

For example, when the switching controller 110 has switched the degree of driving assistance from the second degree to the third degree, the HMI controller 120 notifies the occupant that the third display 470 is newly usable by performing control so that the light emitter 472 provided in the third display 470 emits light of a prescribed wavelength. Thereby, the occupant can enjoy content of a videophone, a TV program, and the like by using the third display 470.

Also, when it is necessary to operate the third operator 440 in order to perform selection of the content displayed on the third display 470 and the like, the HMI controller 120 causes the light emitter 446 provided in the third operator 440 to emit light with a prescribed wavelength. For example, the HMI controller 120 causes the light emitter 472 and the light emitter 446 to emit light in the same color. Thereby, the occupant can intuitively ascertain usable equipment and an operator of the equipment.

For example, the HMI controller 120 displays a screen corresponding to operation details on the third display 470 when the third operator 440 has been operated in a state in which the third display 470 is usable. Also, the HMI controller 120 displays an image of a communication partner having a phone conversation on the third display 470 when the operation switch 422 of the second operator 420 has been operated in a state in which the third display 470 is usable. Thereby, the occupant can enjoy a phone conversation while viewing the communication partner displayed on the third display 470.

<Scene (6)>

In the scene (6), because there is no preceding traveling vehicle that the host vehicle M follows at a low speed, the switching controller 110 switches the degree of driving assistance from the third degree to the second degree. In this case, as shown in FIG. 23, the HMI controller 120 causes information indicating a target to be monitored or operated by the occupant requested from the occupant to be displayed as an image on one or both of the first display 450 and the HUD 460 on the basis of the change in the degree of driving assistance.

Figure 23:
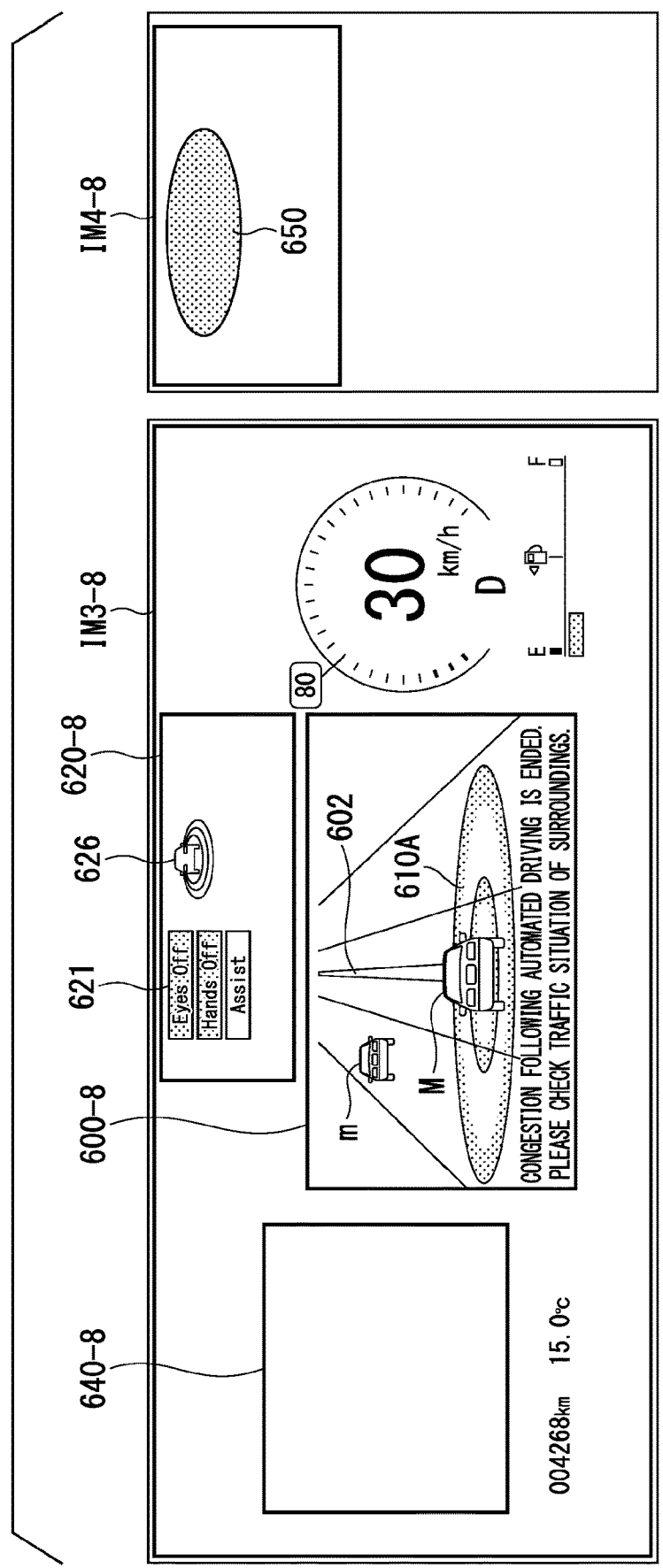
FIG. 23 is a diagram showing an example of a third screen IM3-8 and a fourth screen IM4-8 displayed to allow an occupant to monitor surroundings.

FIG. 23 is a diagram showing an example of a third screen IM3-8 and a fourth screen IM4-8 displayed for requesting the occupant to perform the surroundings monitoring. The HMI controller 120 causes information indicating that the low-speed following travel ("congestion following automated driving" in FIG. 23) is ended and information for allowing the occupant to check the traffic situation of the surroundings to be displayed in a surroundings detection information display area 600-8.

Also, the HMI controller 120 causes a forward line-of-sight request image 650 for requesting the line of sight of the occupant to be in front of the host vehicle M to be displayed on the fourth screen IM4-8. For example, the forward line-of-sight request image 650 is an image including an elliptical area showing a prescribed area in front of the vehicle M. Also, the forward line-of-sight request image 650 may be a prescribed shape such as a circle or a quadrangle or may be information such as a mark or a symbol character for prompting the occupant to pay attention. Also, the HMI controller 120 causes the forward line-of-sight request image 650 to be turned on or blink with light of a prescribed wavelength. Also, the HMI controller 120 may prompt the occupant to look forward by causing an LED incorporated in the instrument panel to be turned on and causing light emitted from the LED to be reflected on the front windshield.

When the switching controller 110 switches the degree of driving assistance from the third degree to the second degree, the HMI controller 120 causes the first display 450 and the HUD 460 to display screens corresponding to the driving assistance of the second degree.

Figure 24:
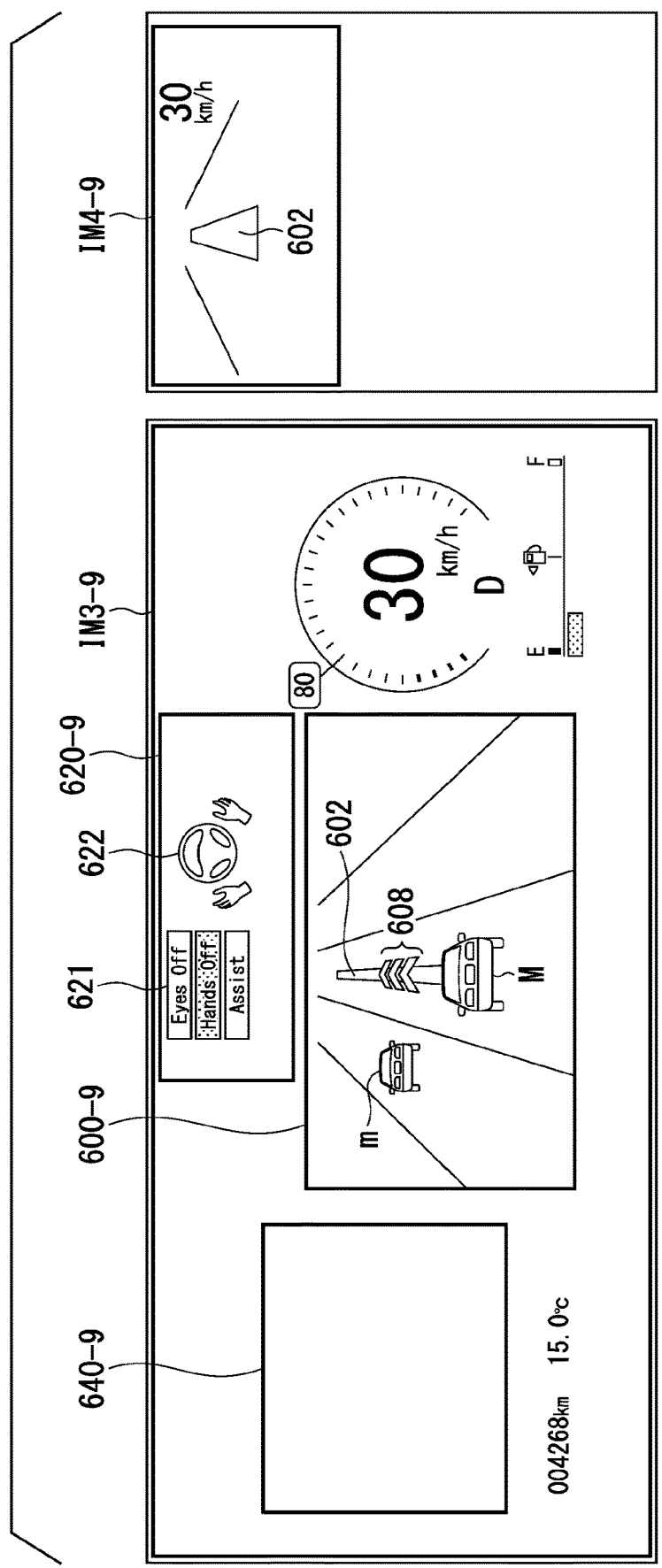
FIG. 24 is a diagram showing an example of a third screen IM3-9 and a fourth screen IM4-9 when the driving assistance is switched from the driving assistance of the third degree to the driving assistance of the second degree.

FIG. 24 is a diagram showing an example of a third screen IM3-9 and a fourth screen IM4-9 when the driving assistance is switched from the driving assistance of the third degree to the driving assistance of the second degree. In the example of FIG. 24, an example in which the host vehicle M accelerates to a target speed (for example, 80 [km/h]) set by the action plan generator 323 according to the driving assistance of the second degree is shown. For example, the HMI controller 120 causes an image 608 showing that the acceleration control is being executed to be displayed in a surroundings detection information display area 600-9 of the third screen IM3-9.

Also, the HMI controller 120 causes the indicator "Hands Off" corresponding to the driving assistance of the second degree of the host vehicle M to be highlighted and displayed in a driving assistance state display area 620-9 of the third screen IM3-9. Also, the HMI controller 120 causes the requested action notification image 622 showing operation details of the occupant corresponding to the driving assistance of the second degree to be displayed in the driving assistance state display area 620-9. Thereby, the occupant may intuitively ascertain that the driving assistance of the host vehicle M is switched from the driving assistance of the third degree to the driving assistance of the second degree.

<Process Flow Corresponding to Scenes (4) to (6)>

Figure 25:
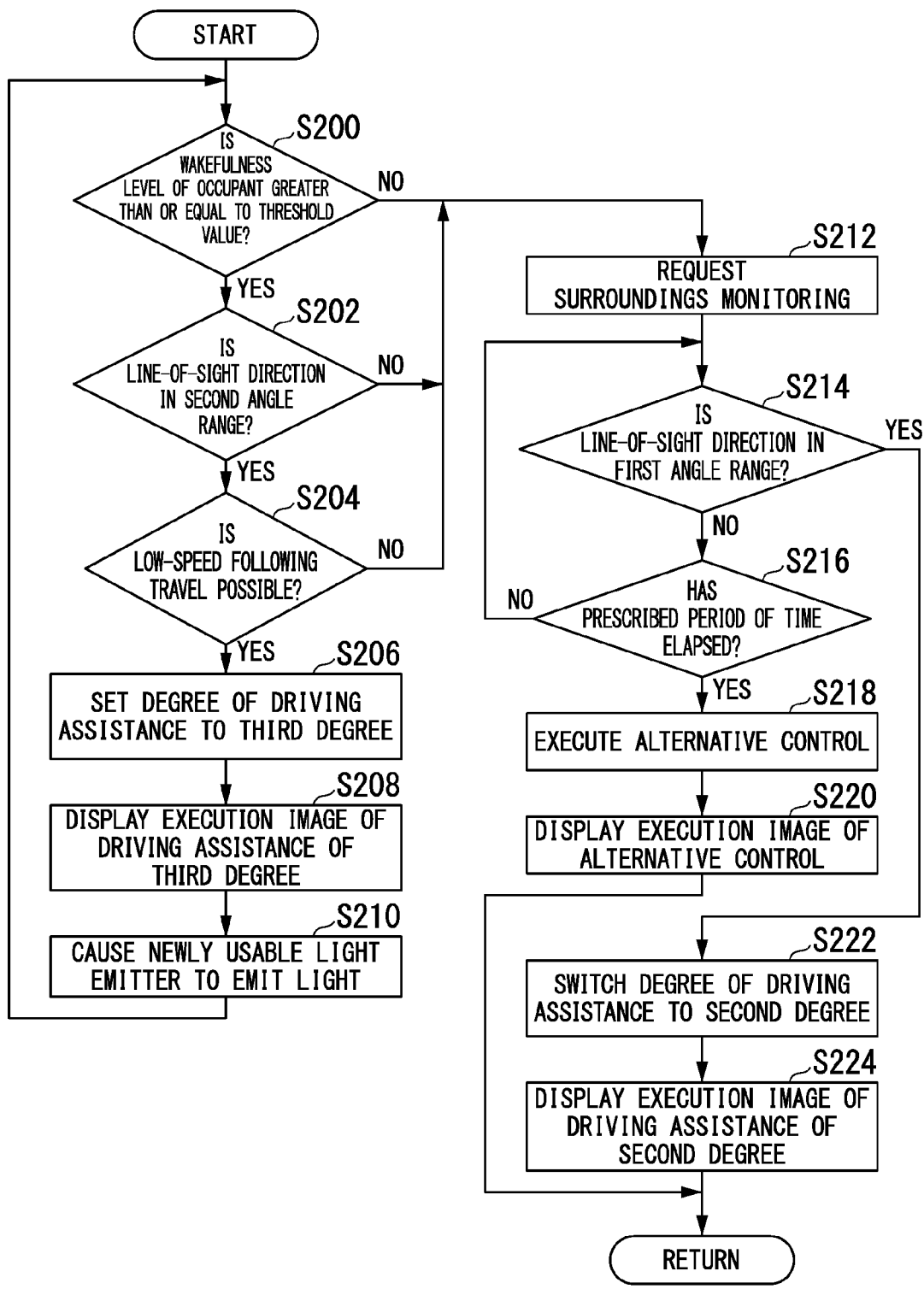
FIG. 25 is a flowchart showing an example of a flow of a process to be executed by the master controller 100 and an automated driving controller 300 in scenes (4) to (6).

FIG. 25 is a flowchart showing an example of a flow of a process to be executed by the master controller 100 in scenes (4) to (6). The process of the present flowchart is executed when the degree of driving assistance is switched to the second degree.

First, the occupant state monitor 140 determines whether or not a wakefulness level of the occupant who is not obligated to monitor surroundings is greater than or equal to a threshold value (step S200). When it is determined that the wakefulness level of the occupant is greater than or equal to the threshold value, the occupant state monitor 140 further determines whether or not a direction of the face or the line of sight of the occupant is within the second angle range Δθ2 (step S202).

When the monitoring determiner 140B determines that the direction of the face or the line of sight of the occupant is within the second angle range Δθ2, i.e., when the occupant is in the "Eyes On" state, the switching controller 110 determines whether or not the low-speed following travel is possible (step S204).

For example, when a condition that the preceding traveling vehicle is present, a condition that an inter-vehicle distance from the preceding traveling vehicle is less than or equal to a prescribed distance, and a condition that the speed of the preceding traveling vehicle is less than or equal to a threshold value are all satisfied, the switching controller 110 determines that the low-speed following travel is possible and sets the degree of driving assistance to the third degree (step S206).

Next, the HMI controller 120 displays an image showing that the driving assistance of the third degree is being executed on the third screen IM3 and the fourth screen IM4 (step S208). Next, the HMI controller 120 causes the light emitter corresponding to equipment that can be newly used because the degree of driving assistance has reached the third degree to emit light (step S210).

On the other hand, when the wakefulness level of the occupant is not greater than or equal to a threshold value, when the direction of the face or the line of sight of the occupant is not within the second angle range Δθ2, or when the low-speed following travel is not possible, the HMI controller 120 requests the occupant to monitor surroundings (the "Eyes On" state) by using the HMI 400 (step S212).

The occupant state monitor 140 determines whether or not the direction of the face or the line of sight of the occupant is within the first angle range Δθ1 as a result of the surroundings monitoring request (step S214). The occupant state monitor 140 determines whether or not a prescribed period of time has elapsed when the direction of the face or the line of sight of the occupant is not within the first angle range Δθ1 (step S216).

When the direction of the face or the line of sight of the occupant is not within the first angle range Δθ1 by the end of the prescribed period of time, the switching controller 110 causes the automated driving controller 300 to perform alternative control (step S218). At this time, the HMI controller 120 displays an image showing that alternative control is being executed on the third screen IM3 and the fourth screen IM4 (step S220).

Also, when the direction of the face or the line of sight of the occupant is not within the first angle range Δθ1 by the end of the prescribed period of time, the automated driving controller 300 may continue the driving assistance of the third degree without performing the alternative control. In this case, the action plan generator 323 of the automated driving controller 300 sets a target speed when the driving assistance of the third degree is continued to a speed less than or equal to a reference speed (i.e., a speed less than or equal to 80 [km/h] or 100 [km/h]) or a speed less than or equal to the current speed of the host vehicle M (i.e., a speed less than or equal to 60 [km/h]). Thereby, when the occupant is not in the "Eyes On" state, the host vehicle M can be accelerated relatively slowly, or can be driven so that the current speed of the host vehicle M is maintained, without accelerating the host vehicle M to the original speed determined to be an upper limit speed of the driving assistance of the third degree.

When the direction of the face or the line of sight of the occupant is within the first angle range Δθ1 by the end of the prescribed period of time, the switching controller 110 switches the degree of driving assistance from the third degree to the second degree (step S222). Accordingly, the HMI controller 120 displays an image showing that the driving assistance of the second degree is being executed on the third screen IM3 and the fourth screen IM4 (step S224). Thereby, the process of the present flowchart ends.

Figure 26:
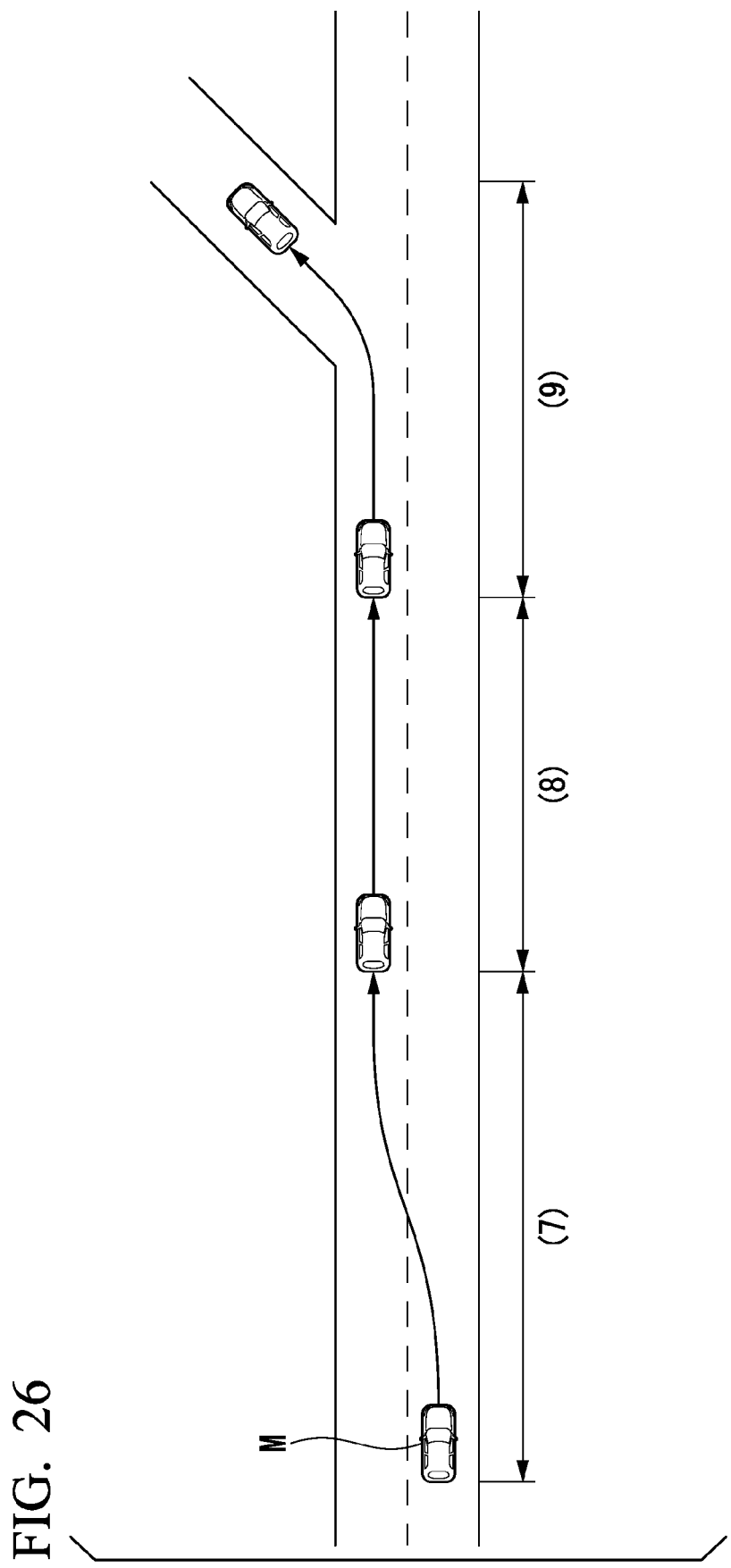
FIG. 26 is a diagram showing various types of scenes until switching from the driving assistance of the second degree to traveling by the manual driving is performed.

Next, scenes (7) to (9) will be described. FIG. 26 is a diagram showing various types of scenes until switching from the driving assistance of the second degree to traveling by manual driving is performed. In the example of FIG. 26, a scene (7) is a scene in which the host vehicle M makes a lane change for exiting an expressway on the basis of an action plan. A scene (8) is a scene in which the host vehicle M is switched from the automated driving to the manual driving. A scene (9) is a scene in which the host vehicle M moves from an expressway to a general road according to the manual driving. Hereinafter, display control corresponding to each of the scenes (7) to (9) will be described.

<Scene (7)>

In the scene (7), the automated driving controller 300 executes driving assistance for allowing the host vehicle M to change the lane to the left side. In this case, the HMI controller 120 displays a screen corresponding to the driving assistance on one or both of the first display 450 and the HUD 460. As for the display examples at the time of the start and execution of the lane change, a similar display process is performed by replacing details of the lane change of the host vehicle M to the right lane shown in FIGS. 16 and 17 with those of the lane change to the left lane and specific description here will be omitted.

<Scene (8)>

In the scene (8), the automated driving controller 300 performs control for switching the host vehicle M to the manual driving. In this case, the HMI controller 120 displays an image for allowing the occupant to execute the manual driving on one or both of the first display 450 and the HUD 460.

Figure 27:
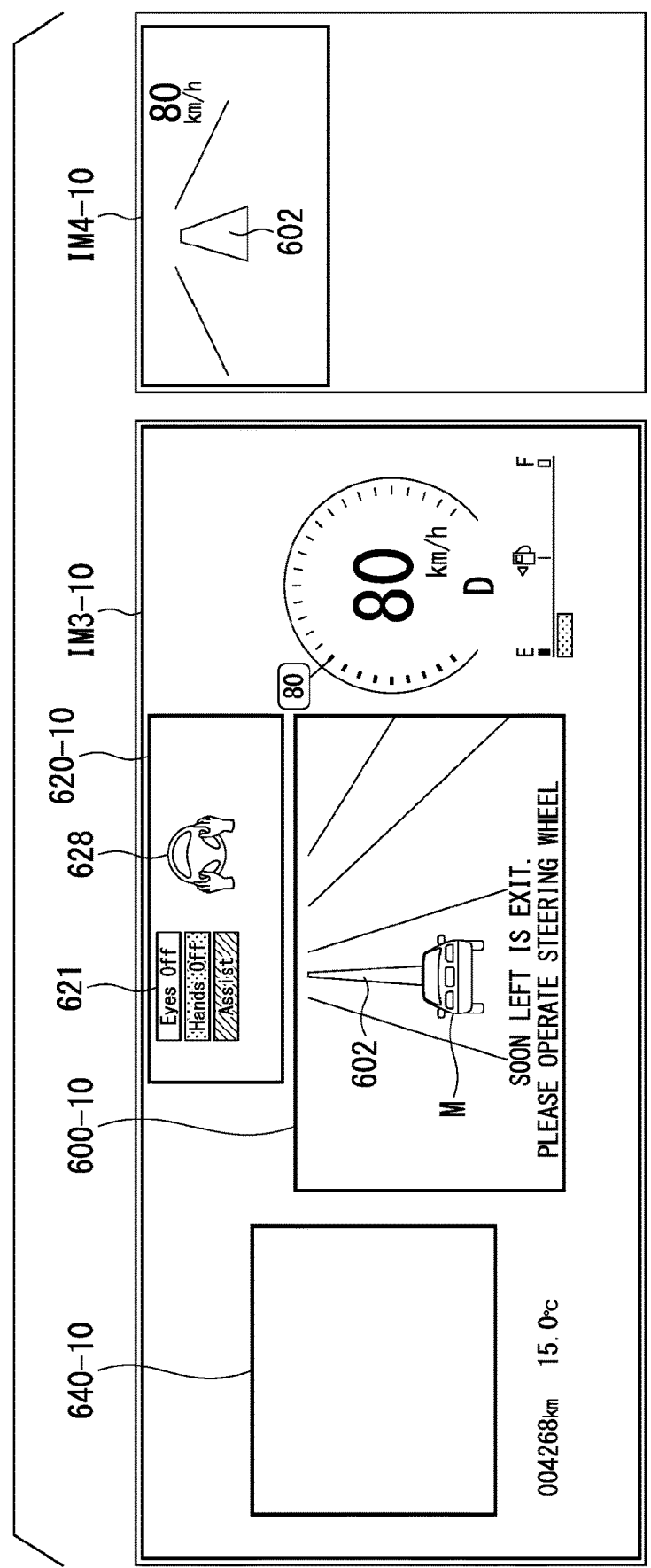
FIG. 27 is a diagram showing an example of a third screen IM3-10 and a fourth screen IM4-10 displayed at the time of a request for switching to manual driving.

FIG. 27 is a diagram showing an example of a third screen IM3-10 and a fourth screen IM4-10 displayed at the time of a request for switching to manual driving. Because the host vehicle M is approaching an exit of the expressway, the HMI controller 120 causes a requested action notification image 628 for requesting the occupant to be in the "Hands On" state (to operate the steering wheel 82) to be displayed in a surroundings detection information display area 600-10 of the third screen IM3-10. Also, the HMI controller 120 may cause an animation in which an image showing the hands of the occupant is approaching from an image showing the steering wheel 82 to be displayed as the requested action notification image 628. A process of displaying the requested action notification image 628 for requesting the occupant to be in the "Hands On" state is an example of a process of outputting "prescribed information".

Also, the HMI controller 120 causes an image of "Hands Off" corresponding to the driving assistance of the second degree and an image of "Assist" corresponding to the driving assistance of the first degree to be highlighted and displayed in a driving assistance state display area 620-10 of the third screen IM3-10.

Here, the operation element state determiner 130 determines whether or not the occupant is in the "Hands On" state. When the operation element state determiner 130 determines that the occupant is not in the "Hands On" state even when a prescribed period of time has elapsed, the HMI controller 120 causes one or both of the first display 450 and the HUD 460 to display images for allowing the occupant to execute the manual driving by strengthening a warning step by step, for example, as shown in FIG. 28.

Figure 28:
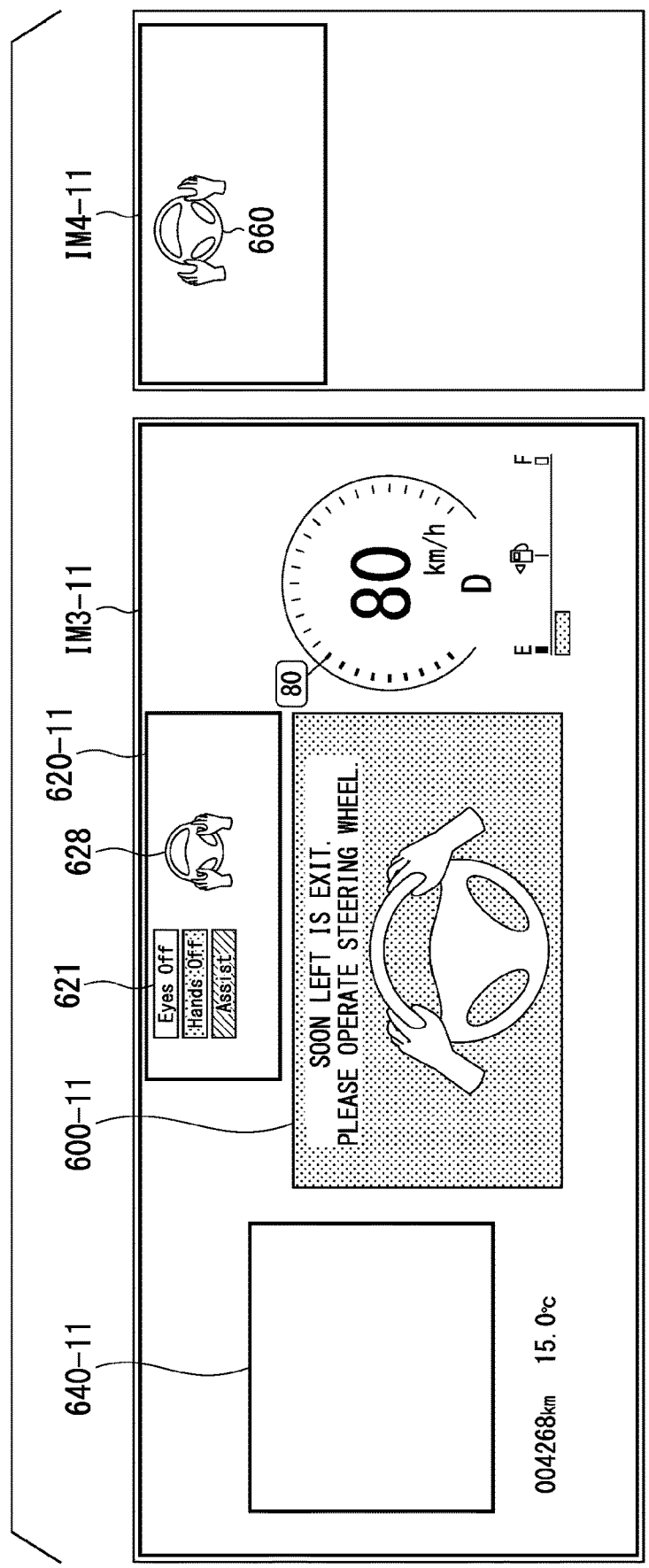
FIG. 28 is a diagram showing an example of a third screen IM3-11 and a fourth screen IM4-11 in which a warning for instructing the occupant to execute the manual driving is strengthened.

FIG. 28 is a diagram showing an example of a third screen IM3-11 and a fourth screen IM4-11 for strengthening the warning for allowing the occupant to execute the manual driving. For example, the HMI controller 120 causes information indicating a target to be monitored or operated by the occupant to be displayed in a driving assistance state display area 600-11 of the third screen IM3-11 so that the information is more emphasized than the display of the surroundings situation of the host vehicle M. Specifically, instead of an image showing a road shape in front of the host vehicle M, an image showing the host vehicle M, and an image showing a future trajectory of the host vehicle M, the HMI controller 120 causes information indicating that the occupant operates the steering wheel 82 to be superimposed and displayed in the driving assistance state display area 600-11 of the third screen IM3-11.

Also, the HMI controller 120 causes a requested action notification image 660 schematically showing a positional relationship between the steering wheel 82 and the hands of the occupant to be displayed on the fourth screen IM4-11. The HMI controller 120 may cause an animation in which an image showing the hands of the occupant approaches an image showing the steering wheel 82 so that the hands of the occupant operate the steering wheel 82 to be displayed as the requested action notification image 660. Also, the HMI controller 120 may issue a warning by sound or the like to allow the occupant to operate the steering wheel 82.

Also, the HMI controller 120 causes the light emitters 430R and 430L provided in the steering wheel 82 to emit light, blink, or stop the light emission so as to allow the occupant to operate the steering wheel 82. Thereby, the occupant may easily recognize details required for the occupant according to a change in the degree of driving assistance.

Also, for example, when the occupant is requested to be in the "Hands On" state in a state in which the light emitters 430R and 430L emit light and blink in accordance with the degree of driving assistance of the host vehicle M, the HMI controller 120 makes the light emission state of the light emitters 430R and 430L different from the current light emission state. For example, the HMI controller 120 makes at least one of light emission, blinking, a light emission color, and light emission luminance of the light emitters 430R and 430L different from the current light emission state.

Also, when the degree of driving assistance changes to a degree lower than the degree of current driving assistance, the HMI controller 120 causes the light emitters 430R and 430L to emit light, blink, or stop the light emission. Thereby, it is possible to notify the occupant that the driving assistance is driving assistance in which it is highly necessary to operate the steering wheel 82.

Also, the HMI controller 120 may cause the speaker to output a sound by strengthening a warning step by step when the operation element state determiner 130 determines that the occupant is not in the "Hands On" state by the end of a prescribed period of time after the occupant is requested to be in the "Hands On" state. The HMI controller 120 may warn the occupant by operating an actuator that vibrates a seat in which the occupant sits or a seat belt and vibrating the seat or the seat belt with stepwise strength.

Figure 29:
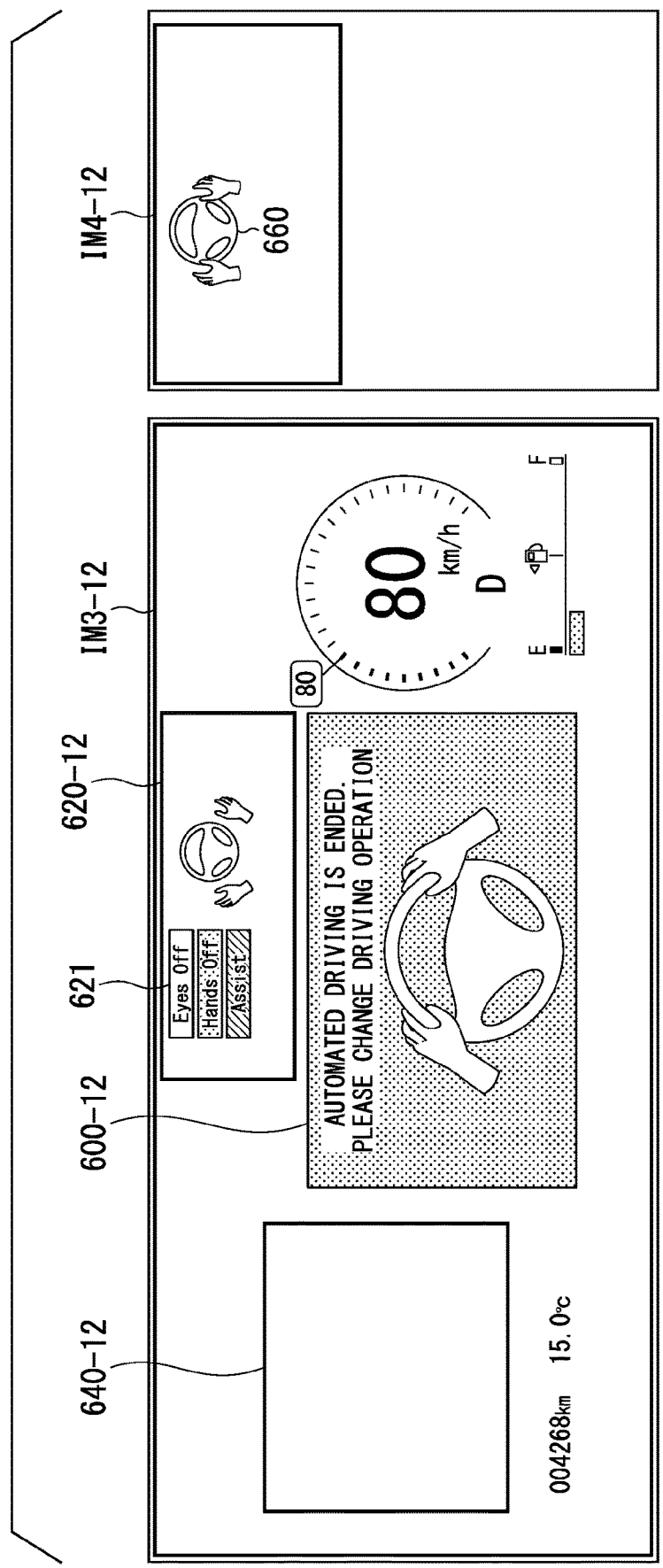
FIG. 29 is a diagram showing an example of a third screen IM3-12 and a fourth screen IM4-12 that display information indicating that automated driving is ended.

Also, when the operation element state determiner 130 determines that the occupant is not in the "Hands On" state by the end of a prescribed period of time after the image shown in FIG. 28 is displayed, the HMI controller 120 displays a screen showing the end of driving assistance (automated driving control) as shown in FIG. 29.

FIG. 29 is a diagram showing an example of a third screen IM3-12 and a fourth screen IM4-12 that display information indicating that the automated driving is ended. The HMI controller 120 causes information for a takeover request to be displayed in a driving assistance state display area 600-12 of the third screen IM3-12 so that the information is superimposed on an image showing a road shape in front of the host vehicle M, an image showing the host vehicle M, and an image showing a future trajectory of the host vehicle M. The takeover request is a process of requesting the occupant to perform an operation of the driving operation element 80 (including the "Hands On" state) in order to start the manual driving by ending the driving assistance. Also, the HMI controller 120 causes an image of "Hands Off" to be highlighted and displayed in a driving assistance state display area 620-12 of the third screen IM3-12, but may cause the image to be highlighted and displayed in a color or the like different from that highlighted and displayed shown in FIG. 28.

Also, the requested action notification image 660 schematically showing a positional relationship between the steering wheel 82 and the hands of the occupant is displayed on the fourth screen IM4-12. Also, the HMI controller 120 may issue a warning having higher strength than a warning in a process of displaying the third screen IM3-11 and the fourth screen IM4-12 shown in FIG. 29 to allow the occupant to operate the steering wheel 82.

Also, for example, the HMI controller 120 may cause the vibrator 484 to vibrate at least one of the seat or the seat belt by operating the actuator for vibrating the seat or the seat belt at a timing at which the third screen IM3-12 is displayed on the first display 450 and the fourth screen IM4-12 is displayed on the HUD 460. In this case, the HMI controller 120 may cause the actuator to be operated so that vibrations are stronger than those when the third screen IM3-11 and the fourth screen IM4-11 are displayed. Thereby, the occupant may intuitively ascertain that the automated driving ends.

Also, when the operation element state determiner 130 determines that the occupant is not in the "Hands On" state by the end of a prescribed period of time after the screen shown in FIG. 29 is displayed, the master controller 100 causes the automated driving controller 300 to execute the alternative control. In this case, as shown in FIG. 30, the HMI controller 120 displays a screen indicating that the automated driving for executing the alternative control is executed.

Figure 30:
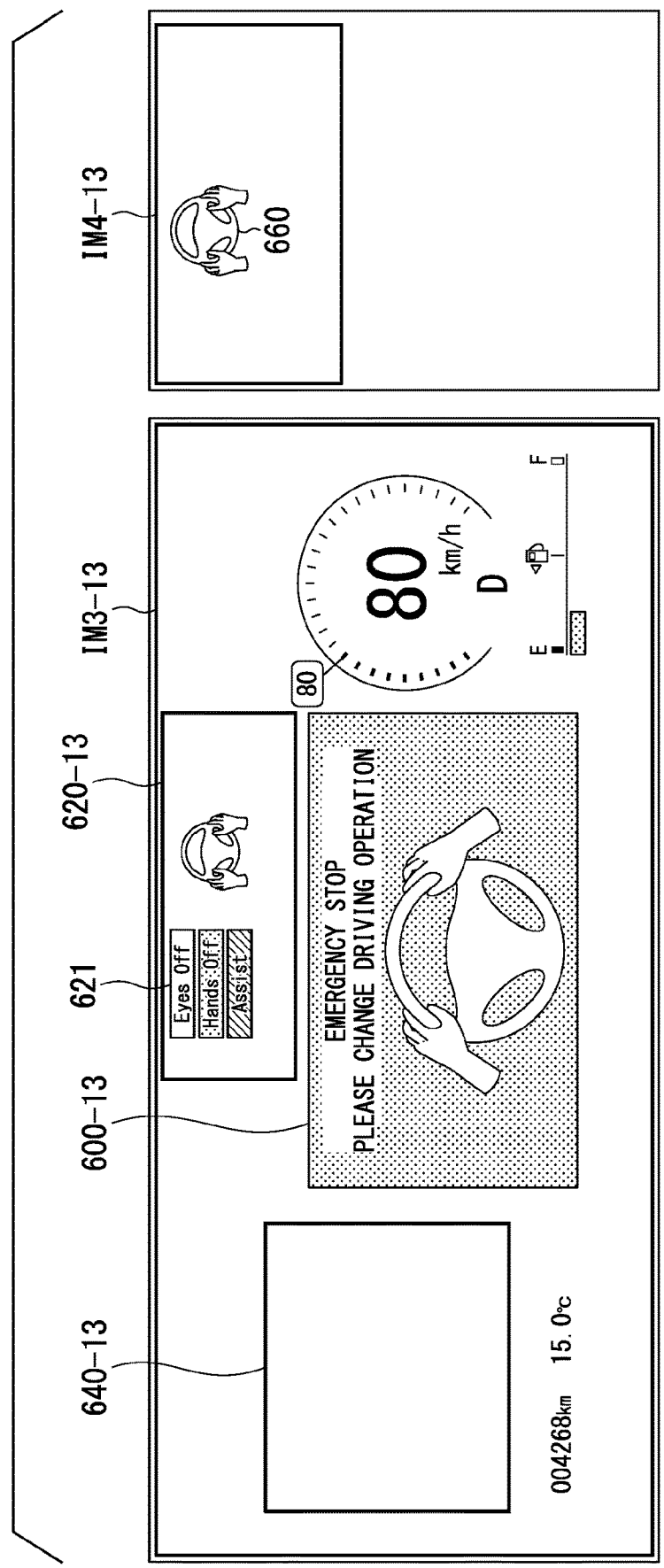
FIG. 30 is a diagram showing an example of a third screen IM3-13 and a fourth screen IM4-13 during alternative control.

FIG. 30 is a diagram showing an example of a third screen IM3-13 and a fourth screen IM4-13 at the time of the alternative control. In a driving assistance state display area 600-13 of the third screen IM3-13, information indicating that the host vehicle M is stopped as the alternative control ("Emergency stop, please change driving operation in FIG. 30) is displayed.

<Scene (9)>

In the scene (9), the occupant receives an instruction for allowing the occupant to operate the steering wheel 82, the occupant operates the steering wheel 82 until the driving assistance is ended, the manual driving is started, and the host vehicle M enters the general road from the expressway. The switching controller 110 switches the driving state of the host vehicle M to a state in which the occupant performs the manual driving. The HMI controller 120 performs control so that the first screen IM1-1 is displayed on the first display 450 and the second screen IM2-1 is displayed on the HUD 460.

<Process Flow Corresponding to Scenes (7) to (9)>

Figure 31:
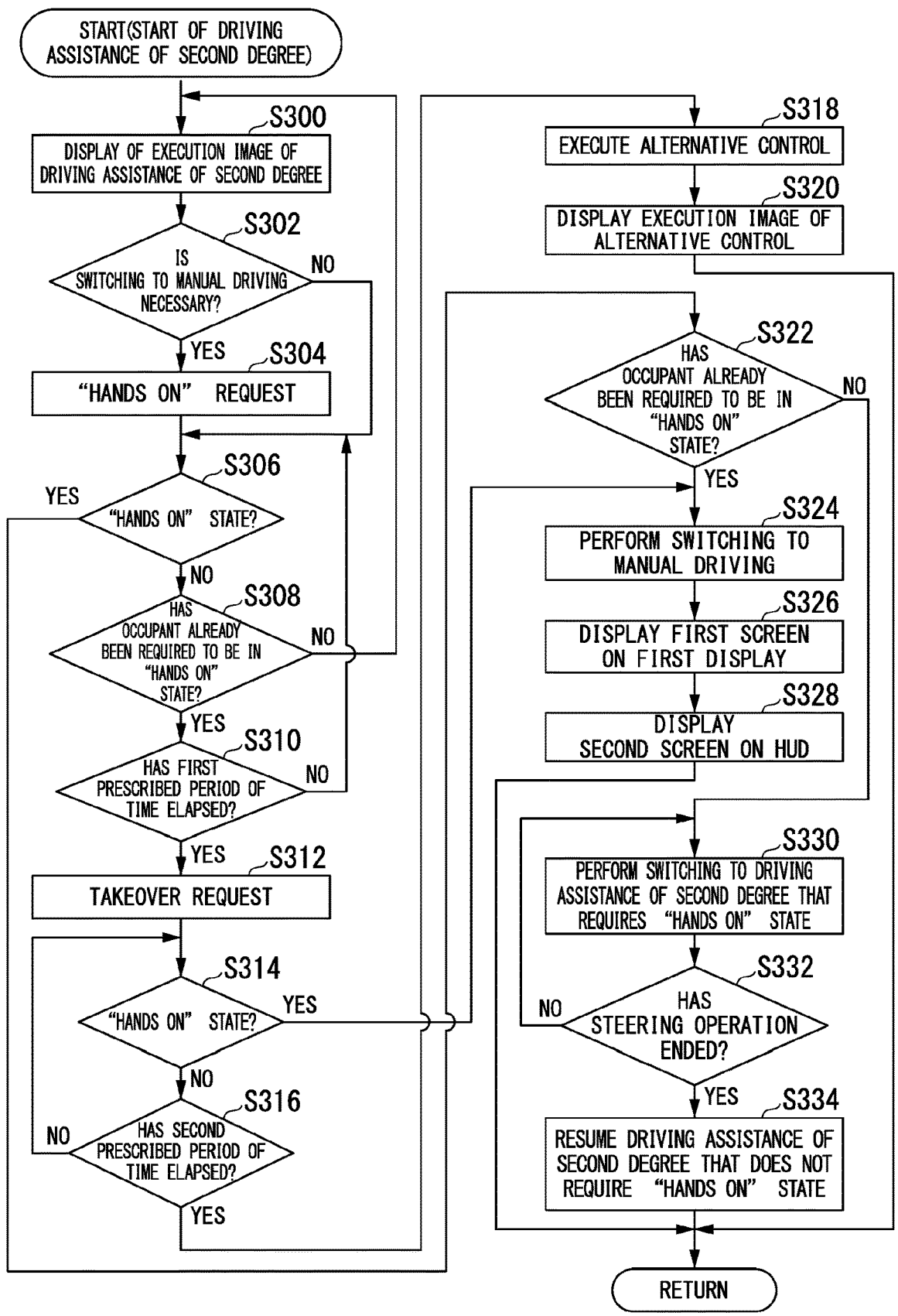
FIG. 31 is a flowchart showing an example of a flow of a process to be executed by an HMI controller 120 in scenes (7) to (9).

FIG. 31 is a flowchart showing an example of a flow of a process to be executed by the HMI controller 120 in scenes (7) to (9). The process of the present flowchart is executed with the start of the driving assistance of the second degree.

First, the HMI controller 120 causes an image showing that the driving assistance of the second degree is being executed to be displayed on the third screen IM3 and the fourth screen IM4 (step S300).

Next, the switching controller 110 determines whether or not switching to the manual driving is necessary (step S302). For example, when the host vehicle M has reached an end point of a section where the automated driving is possible (a section where lane recognition is possible) such as the vicinity of an exit of an expressway, the switching controller 110 determines that switching to the manual driving is necessary.

When the switching controller 110 determines that the switching to the manual driving is necessary, the HMI controller 120 causes the requested action notification image 628 for requesting the occupant to be in the "Hands On" state to be displayed in the surroundings detection information display area 600-10 of the third screen IM3-10 (step S304). On the other hand, when the switching controller 110 determines that the switching to the manual driving is not necessary, the HMI controller 120 omits the processing of step S304.

Next, the operation element state determiner 130 determines whether the occupant is in the "Hands On" state or the "Hands Off" state on the basis of a detection signal of the grip sensor 82A (step S306).

When the operation element state determiner 130 determines that the occupant is in the "Hands Off" state, the HMI controller 120 determines whether or not the occupant has already been requested to be in the "Hands On" state (i.e., whether or not the processing of step S304 has been performed) (step S308).

When the occupant is in the "Hands Off" state and the occupant has not yet been requested to be in the "Hands On" state, the HMI controller 120 returns the process to the above-described step S300.

On the other hand, when the occupant is in the "Hands Off" state and the occupant has already been requested to be in the "Hands On" state, the HMI controller 120 determines whether or not a first prescribed period of time has elapsed from the request for the "Hands On" request (step S310).

When it is determined that the first prescribed period of time has not elapsed from the request for the "Hands On" state, the HMI controller 120 returns the process to the above-described step S306.

On the other hand, when it is determined that the first prescribed period of time has elapsed from the request for the "Hands On" state, the HMI controller 120 causes information for a takeover request to be displayed in the driving assistance state display area 600-12 of the third screen IM3-12 (step S312).

Next, the operation element state determiner 130 determines whether the occupant is in the "Hands On" state or the "Hands Off" state on the basis of a detection signal of the grip sensor 82A (step S314).

When the operation element state determiner 130 determines that the occupant is in the "Hands On" state, the HMI controller 120 moves the process to step S324 to be described below.

On the other hand, when the operation element state determiner 130 determines that the occupant is in the "Hands Off" state, the HMI controller 120 determines whether a second prescribed period of time has elapsed from the takeover request (step S316). The second prescribed period of time may be the same length as the first prescribed period of time or may be a length different from that of the first prescribed period of time.

When it is determined that the second prescribed period of time has not elapsed from the takeover request, the HMI controller 120 returns the process to the above-described step S314.

On the other hand, when the HMI controller 120 determines that the second prescribed period of time has elapsed from the takeover request, the switching controller 110 causes the automated driving controller 300 to perform the alternative control (step S318). At this time, the HMI controller 120 causes each display of the HMI 400 to display a screen indicating that the alternative control is being executed (step S320).

On the other hand, when the operation element state determiner 130 determines that the occupant is in the "Hands On" state in the processing of step S306 described above, the HMI controller 120 determines whether or not the occupant has already been requested to be in the "Hands On" state (i.e., whether or not the processing of step S304 has been performed) (step S322).

Because it is possible to determine that the occupant is in the "Hands On" state in response to the "Hands On" request when the occupant is in the "Hands On" state and the occupant has already been requested to be in the "Hands On" state, the switching controller 110 causes the automated driving controller 300 to stop the driving assistance of the second degree (the automated driving control) as originally scheduled and performs switching to the manual driving (step S324).

Also, the switching controller 110 may temporarily perform switching from the driving assistance of the second degree to the driving assistance of the first degree without performing switching from the driving assistance of the second degree to the manual driving and perform switching from the driving assistance of the first degree to the manual driving after the driving assistance of the first degree is continued for a prescribed period of time. For example, when switching to the driving assistance of the first degree is temporarily performed, the switching controller 110 causes the automated driving controller 300 to stop the driving assistance of the second degree (the automated driving control) and causes the driving assistance controller 200 to start the driving assistance of the first degree (the driving assistance controller). In this case, for example, the driving assistance controller 200 performs steering control for maintaining a travel lane such as LKAS as the driving assistance of the first degree. The steering control for maintaining the travel lane is control for changing a direction of the steerable wheel to the lane center side and assisting the host vehicle M to return to the inside of a host vehicle lane, for example, when the host vehicle M is at a prescribed distance or more from the center of the host vehicle lane or when a distance from a lane marking that divides the host vehicle lane is less than or equal to a prescribed distance. Also, the driving assistance controller 200 may perform speed control such as ACC as the driving assistance of the first degree.

Next, the HMI controller 120 causes the first display 450 to display the first screen IM1 showing that the manual driving is being executed (step S326) and equally causes the HUD 460 to display the second screen IM2 showing that the manual driving is being executed (step S328).

On the other hand, because it is possible to determine that the occupant has indicated an intention to perform the driving operation regardless of the request from the system side when the occupant is in the "Hands On" state and the occupant has not yet been requested to be in the "Hands On" state, the switching controller 110 switches the driving assistance of the second degree that does not require the operation of the occupant in principle to the driving assistance of the second degree that requires the operation of the occupant on the steering wheel 82 (the "Hand On" state) in order to permit the intervention of the steering control according to the operation on the steering wheel 82 (step S330). A state in which the driving assistance of the second degree that requires the "Hands On" state is performed is an example of a "first driving assistance mode" and a state in which the driving assistance of the second degree that does not require the "Hands On" state is performed is an example of a "second driving assistance mode". Also, a state in which the driving assistance of the first degree is performed is an example of a "third driving assistance mode".

For example, the travel controller 342 of the automated driving controller 300 determines amounts of control of the travel driving force output device 500 and the brake device 510 on the basis of a target speed included in a target trajectory generated by the action plan generator 323 as the driving assistance of the second degree that requires the operation of the occupant on the steering wheel 82. At this time, the travel controller 342 may stop a process of determining an amount of control of the steering device 520 on the basis of a positional relationship (an angle formed) between trajectory points included in the target trajectory and perform steering control so that the host vehicle lane is maintained regardless of the target trajectory. Thereby, the vehicle system 1 can control the steering of the host vehicle M according to the manual driving while apparently continuing the driving assistance of the second degree (the automated driving control).

Also, while the driving assistance of the second degree that requires the operation of the occupant is being executed, the HMI controller 120 causes an image showing that the driving assistance of the second degree is being executed to be displayed on the third screen IM3 and the fourth screen IM4 like when the driving assistance of the second degree that does not require the operation of the occupant is being executed. Thereby, the occupant can recognize that the automated driving control is continued even when the steering of the host vehicle M is controlled by his/her own operation.

Also, when the occupant is in the "Hands On" state and the occupant has not yet been requested to be in the "Hands On" state, the switching controller 110 may interrupt the driving assistance of the second degree by switching the degree of driving assistance from the second degree to the first degree. In this case, the automated driving controller 300 stops the automated driving control. Alternatively, the driving assistance controller 200 starts driving assistance control such as ACC or LKAS.

Next, the switching controller 110 determines whether or not the operation of the occupant on the steering wheel 82 has ended on the basis of a detection result of the operation detection sensor of the steering wheel 82 (step S332), and stops the driving assistance of the second degree that does not require the operation of the occupant and causes the driving assistance of the second degree that requires the operation of the occupant to be continued until the operation of the occupant on the steering wheel 82 ends.

On the other hand, when the operation of the occupant on the steering wheel 82 has ended, the switching controller 110 causes the driving assistance of the second degree that requires the operation of the occupant to be stopped and causes the driving assistance of the second degree that does not require the operation of the occupant to be resumed (step S334). Thereby, the process of the present flowchart ends.

Also, although a case in which, when the "Hands On" state has been reached, the switching controller 110 performs switching to the manual driving if the occupant has already been requested to be in the "Hands On" state and causes the automated driving controller 300 to continue the driving assistance if the occupant has not yet been requested to be in the "Hands On" state has been described in the above-described flowchart, the present invention is not limited thereto. For example, when the "Hands On" state has been reached, the switching controller 110 may determine whether to perform switching to the manual driving or to continue the driving assistance in accordance with the presence or absence of a takeover request or the presence or absence of the display of an execution screen of the alternative control. For example, when the "Hands On" state has been reached, the switching controller 110 performs switching to the manual driving if the takeover request has already been made and causes the automated driving controller 300 to perform the alternative control which is one type of driving assistance if the takeover request has not yet been made. Also, when the "Hands On" state has been reached, the switching controller 110 may perform switching to the manual driving if the execution screen of the alternative control has already been displayed and cause the automated driving controller 300 to perform the alternative control if the execution screen of the alternative control has not yet been displayed. A process of making the takeover request or displaying the execution screen of the alternative control is another example of a process of outputting "prescribed information".

Figure 32:
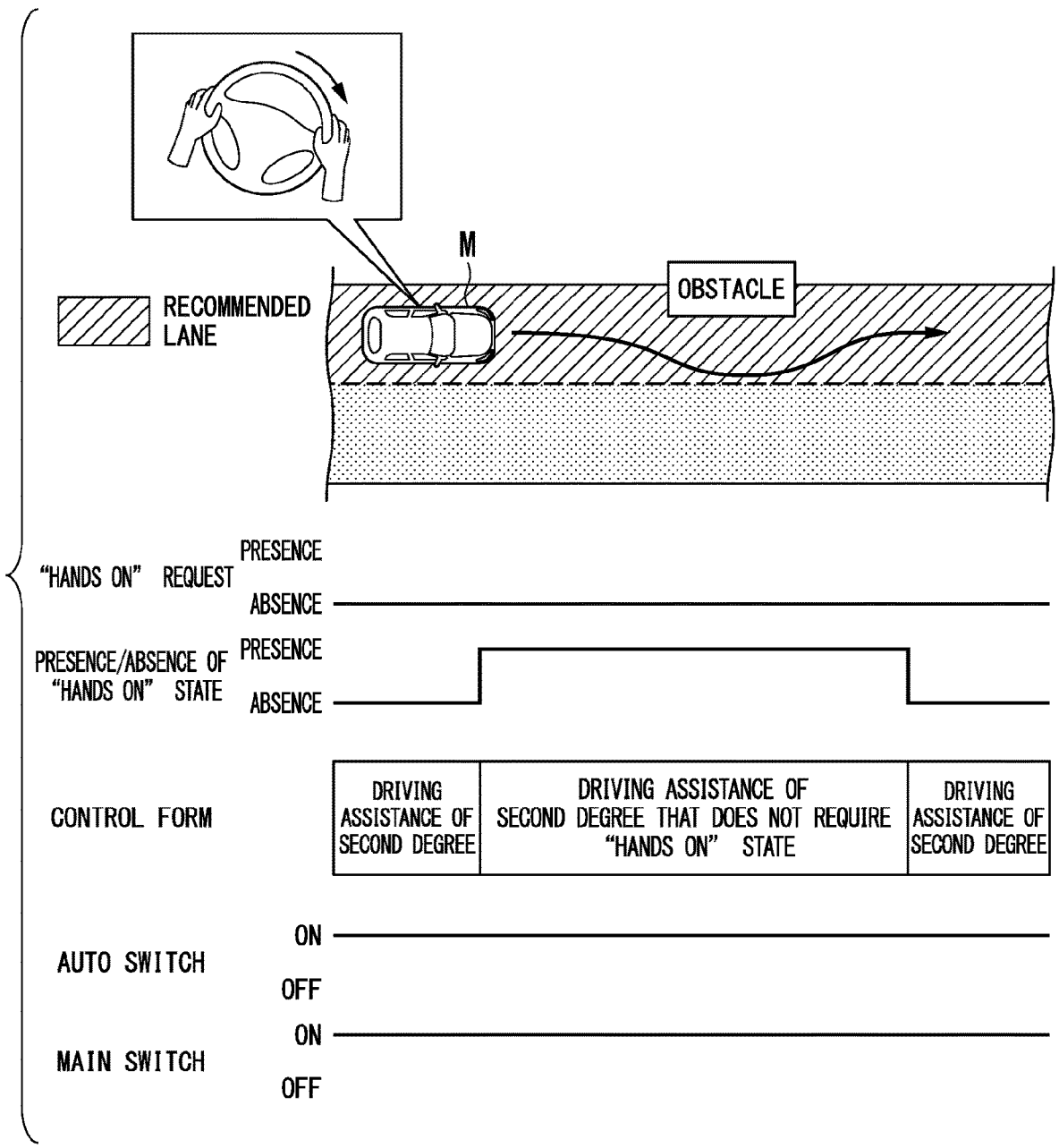
FIG. 32 is a diagram showing an example of a scene in which a "Hands On" state is reached before a "Hands On" request.

FIG. 32 is a diagram showing an example of a scene in which the "Hands On" state is reached before the "Hands On" request. As shown in FIG. 32, when the occupant recognizes that there is an obstacle in front of the host vehicle M according to visual observation or the like, the steering wheel 82 may be operated to avoid the obstacle even when driving assistance is being performed. In this case, the switching controller 110 switches the driving assistance of the second degree that does not require the operation of the occupant to the driving assistance of the second degree that requires the operation of the occupant while the steering wheel 82 is being operated and causes the driving assistance to return to the original driving assistance of the second degree that does not require the operation of the occupant at a point in time at which the operation of the steering wheel 82 has ended. As a result, the speed control based on the target trajectory and the steering control based on the lane marking of the travel lane are executed according to automated driving control while the steering wheel 82 is being operated and the speed control and the steering control based on the target trajectory are executed according to automated driving when the operation of the steering wheel 82 ends. Also, because the second driving assistance is constantly continued before and after the operation of the steering wheel 82, the main switch 412 and the auto switch 414 are maintained in an on state.

Figure 33:
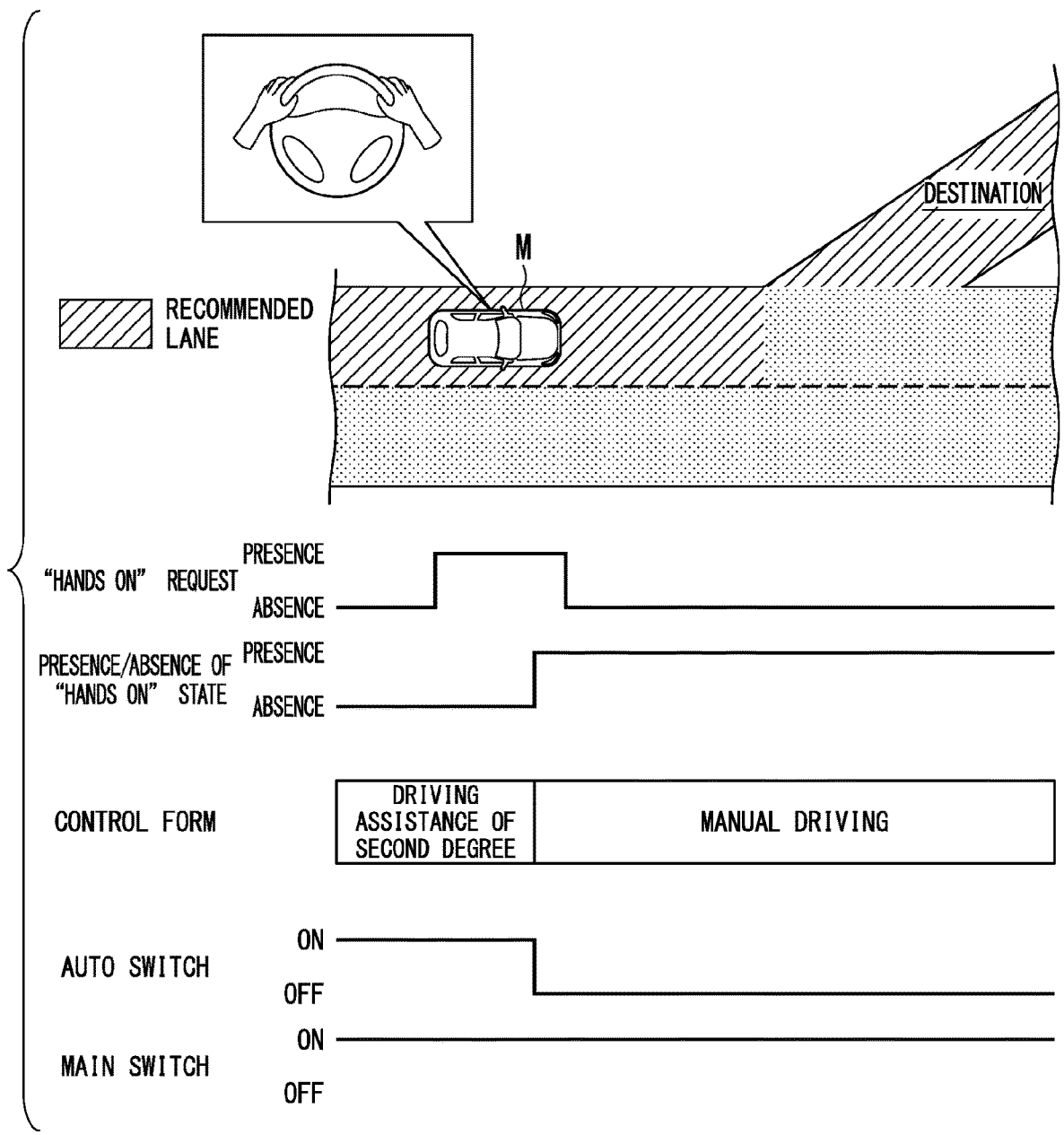
FIG. 33 is a diagram showing an example of a scene in which the "Hands On" state is reached after the "Hands On" request.

FIG. 33 is a diagram showing an example of a scene in which the "Hands On" state is reached after the "Hands On" request. As shown in FIG. 33, if the "Hands On" state has been reached by the occupant operating (gripping) the steering wheel 82 after the "Hands On" request is made when the vehicle goes down the expressway, the switching controller 110 causes the automated driving controller 300 to stop the automated driving control serving as the driving assistance of the second degree and performs switching to the manual driving. At this time, the main switch 412 is maintained in an on state regardless of the change in the control form and the auto switch 414 is changed to an off state at the timing of switching to the manual driving. Also, when the "Hands On" state has been reached after the "Hands On" request, the switching controller 110 may cause the automated driving controller 300 to stop the automated driving control serving as the driving assistance of the second degree by switching the degree of driving assistance from the second degree to the first degree and cause the driving assistance controller 200 to perform driving assistance control such as LKAS as the driving assistance of the first degree. Also, similar to the auto switch 414, the main switch 412 may be changed to an off state at the timing of switching to the manual driving.

Figure 34:
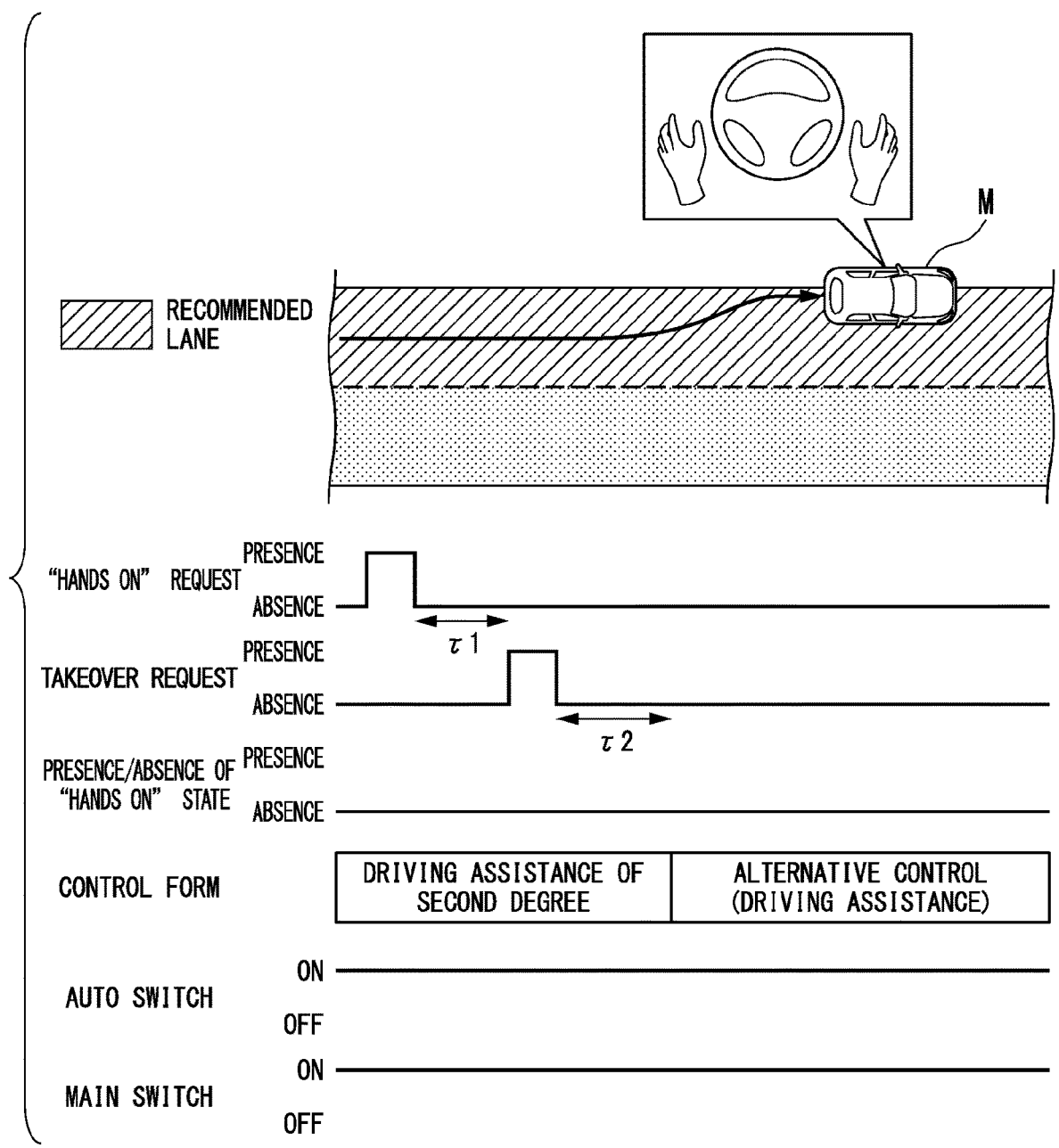
FIG. 34 is a diagram showing an example of a scene in which the "Hands On" state is not reached after the "Hands On" request.

FIG. 34 is a diagram showing an example of a scene in which the "Hands On" state is not reached after the "Hands On" request. In the shown example, the "Hands On" state is not reached from the "Hands On" request to the end of a period of first prescribed time τ1 and takeover is further requested. Because the "Hands On" state is not reached by the end of a period of second prescribed time τ2 after the takeover request, the switching controller 110 causes the automated driving controller 300 to perform the alternative control. At this time, the main switch 412 and the auto switch 414 are maintained in an on state.

Figure 35:
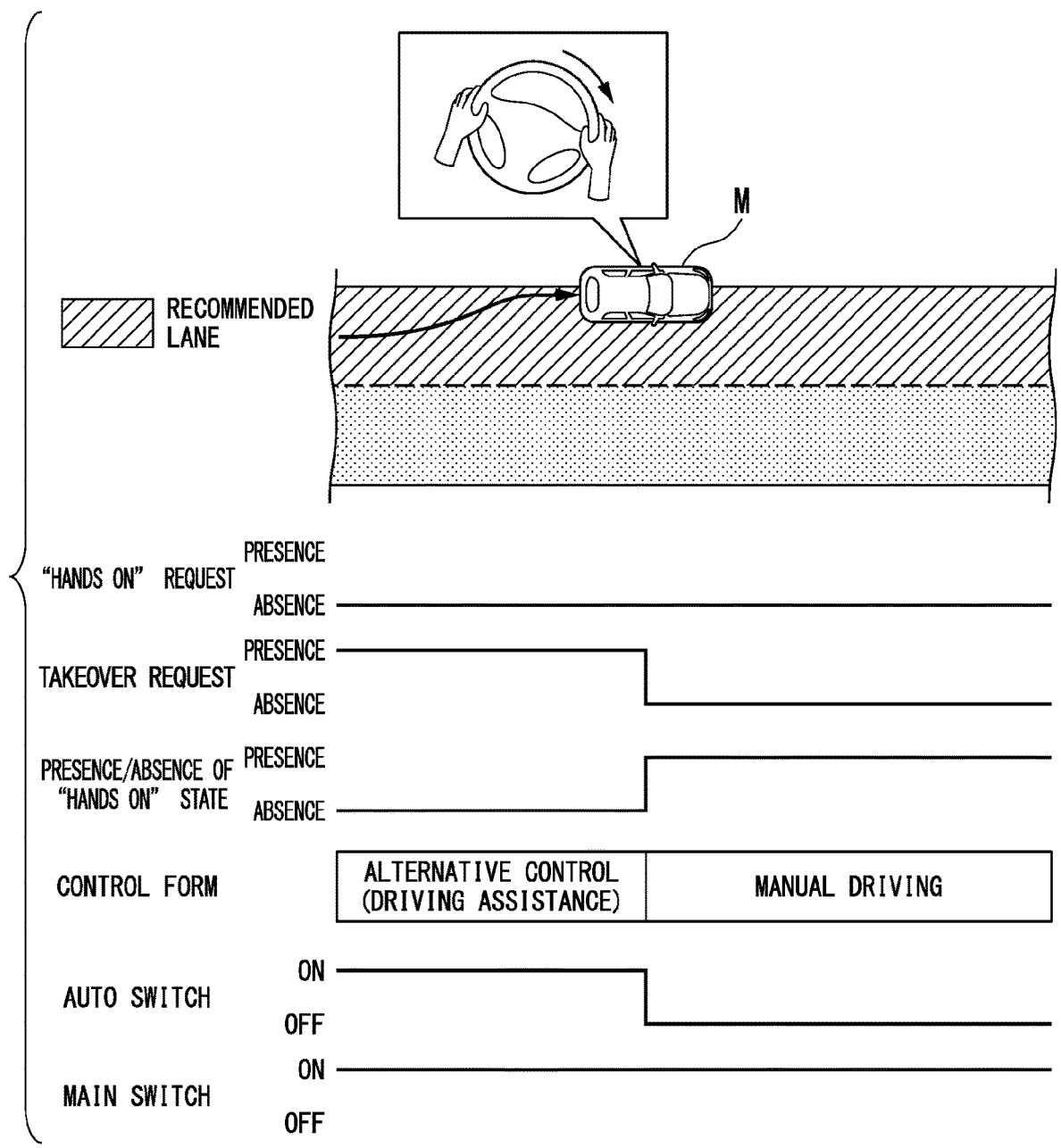
FIG. 35 is a diagram showing an example of a scene in which the "Hands On" state is reached after the host vehicle M is stopped according to the alternative control.

FIG. 35 is a diagram showing an example of a scene in which the "Hands On" state is reached after the host vehicle M is stopped according to the alternative control. As in the example shown in FIG. 35, the HMI controller 120 causes takeover request information to be continuously displayed in the driving assistance state display area 600-12 of the third screen IM3-12 until the "Hands On" state is reached while the alternative control is performed. For example, when the "Hands On" state is not reached after the host vehicle M stops in an area where the host vehicle M can stop such as a road shoulder according to the alternative control, the switching controller 110 causes information for a takeover request to be displayed in the driving assistance state display area 600-12 of the third screen IM3-12 even after the host vehicle M stops. Also, the main switch 412 and the auto switch 414 are maintained in an on state until the "Hands On" state is reached after the host vehicle M is stopped according to the alternative control.

For example, when the "Hands Off" state continues after the host vehicle M is stopped according to the alternative control, the switching controller 110 causes the automated driving controller 300 to continue the automated driving control that stops the host vehicle M as the alternative control. On the other hand, when the "Hands On" state is reached after the host vehicle M is stopped according to the alternative control, the switching controller 110 performs switching from the alternative control which is one type of driving assistance to the manual driving. Accordingly, the auto switch 414 is changed to an off state.

<Switching Timings of Various Types of Equipment or Control Related to Driving Assistance>

Hereinafter, switching timings of various types of equipment or control related to the driving assistance of the host vehicle M will be described with reference to the drawings. FIG. 36 is a diagram showing switching timings of various types of equipment or control related to driving assistance.

In FIG. 36, switching timings related to a passage of time of (A) on/off of the main switch 412, (B) on/off of the auto switch 414, (C) on/off of the manual driving mode display, (D) on/off of the driving assistance mode display, (E) on/off of the driving assistance of the first degree, (F) gripping/non-gripping of the steering wheel 82, (G) on/off of the driving assistance of the second degree, (H) on/off of the driving assistance of the third degree, and (I) necessity/non-necessity of the driving monitoring of the occupant are shown with respect to the switching related to the driving assistance.

At time T0, the host vehicle M is traveling according to the manual driving of the occupant. In this case, the main switch 412 and the auto switch 414 are not operated and the screens (the first screen IM1 and the second screen IM2) of the manual driving are displayed on the first display 450 and the HUD 460. Also, at the time T0, because the driving assistance of any degree is not performed, the occupant necessarily operates the steering wheel 82 and monitors surroundings.

At time T1, an operation of turning on the main switch 412 is being executed by the occupant. In this case, the screens (the third screen IM3 and the fourth screen IM4) of the driving assistance mode are displayed on the first display 450 and the HUD 460. During a period between times T1 and T2, the driving control of the driving assistance is not performed and the manual driving is continued.

At time T2, an operation of turning on the auto switch 414 is being executed by the occupant. In this case, the switching controller 110 of the master controller 100 switches the degree of driving assistance to the first degree. Thereby, the driving assistance controller 200 executes the driving assistance of the first degree. The HMI controller 120 displays an image showing that the driving assistance of the second degree is executed when the occupant separates his/her hands from the steering wheel 82 in the driving assistance mode display.

At time T3, the occupant is separating his/her hands from the steering wheel 82 in a state in which the driving assistance of the second degree is possible in the host vehicle M. In this case, the switching controller 110 switches the degree of driving assistance from the first degree to the second degree. Accordingly, the driving assistance controller 200 stops the driving assistance control and the automated driving controller 300 newly starts the driving assistance of the second degree (i.e., automated driving control).

At time T4, for example, a start condition of the low-speed following travel is satisfied and the switching controller 110 switches the degree of driving assistance to the third degree. Thereby, the automated driving controller 300 starts the low-speed following travel as the driving assistance of the third degree. Accordingly, the surroundings monitoring of the occupant is unnecessary.

At time T5, the driving assistance of the third degree is ended and the driving assistance is switched to the driving assistance of the second degree. Accordingly, the occupant is obligated to monitor surroundings. Also, at the time T5, the display for switching from the driving assistance of the second degree to the manual driving is performed. In this case, the HMI controller 120 displays information for allowing the occupant to operate the steering wheel 82 in the driving assistance mode display.

At time T6, the occupant operates the steering wheel 82 and the "Hands On" state is reached. In this case, the switching controller 110 switches the degree of driving assistance from the second degree to the first degree. Thereby, the automated driving controller 300 stops the driving assistance of the second degree and the driving assistance controller 200 starts the driving assistance of the first degree. At this time, the switching controller 110 may switch the driving assistance of the first degree to the manual driving when a prescribed period of time has elapsed.

At time T7, the host vehicle M is switched to the manual driving. In this case, the main switch 412 and the auto switch 414 are switched to an off state at a timing when the host vehicle M is switched to the manual driving.

According to the above-described embodiment, there are provided the operation element state determiner 130 configured to determine whether or not the driving operation element 80 has been operated by an occupant; the automated driving controller 300 configured to execute automated driving control for automatically controlling the traveling of the host vehicle M; the switching controller 110 configured to switch driving assistance for causing the automated driving controller 300 to execute the automated driving control to one of a plurality of types of driving assistance including driving assistance of a second degree that requires a "Hand On" state (a first driving assistance mode) or driving assistance of a second degree that does not require the "Hand On" state (a second driving assistance mode); and the HMI controller 120 configured to cause the HMI 400 to output prescribed information when the switching controller 110 switches the driving assistance for executing the automated driving control from the driving assistance of the second degree that does not require the "Hand On" state to the driving assistance of the second degree that requires the "Hand On" state. For example, the switching controller 110 can allow the occupant to recognize that the driving assistance of the second degree (the automatic driving control) is apparently continued while actually performing the driving assistance of the first degree or control corresponding thereto until the driving operation element 80 is operated in response to the output of the prescribed information because the driving assistance of the second degree that does not require the "Hand On" state is continued until the operation element state determiner 130 determines that the driving operation element 80 is operated after the prescribed information is output, the driving assistance of the second degree that does not require the "Hand On" state is cancelled when the operation element state determiner 130 determines that the driving operation element 80 is operated, and switching to the driving assistance of the second degree that requires the "Hand On" state is performed. Thus, because the automated driving control is apparently continued even during a period in which the request from the system side is not responded, it is possible to eliminate complexity due to frequent termination of the automated driving.

Although modes for carrying out the present invention have been described using embodiments, the present invention is not limited to the embodiments, and various modifications and substitutions can also be made without departing from the scope and spirit of the present invention.

What is claimed is:

1. A vehicle control system comprising:
   a human machine interface configured to output information;
   a steering wheel configured to receive an operation of issuing an instruction for steering of a host vehicle;
   a grip sensor or steering torque sensor configured to detect that the steering wheel has been operated by an occupant;
   a memory storing a program; and
   a processor configured to execute the program to:
   execute automated driving control for automatically controlling traveling of the host vehicle;
   switch a driving mode to execute the automated driving control to one of a plurality of driving modes including a first driving assistance mode in which the occupant is requested to operate the steering wheel and a second driving assistance mode having a lower degree to which the operation of the steering wheel is requested than the first driving assistance mode; and
   cause the human machine interface to output prescribed information when the driving mode is switched from the second driving assistance mode to the first driving assistance mode,
   wherein the processor is further configured to execute the program to:
   continue the second driving assistance mode until the grip sensor or steering torque sensor detects that the steering wheel has been operated after the human machine interface outputs the prescribed information and switches the driving mode to the first driving assistance mode by cancelling the second driving assistance mode when the grip sensor or steering torque sensor detects that the steering wheel has been operated,
execute driving assistance control for controlling one or both of speed control and steering control of the host vehicle so that a driving operation on the steering wheel is assisted;
switch the driving mode to a third driving assistance mode to execute the driving assistance control when a prescribed condition is satisfied, and
wherein maximum steering torque of the steering control in the third driving assistance mode is less than maximum steering torque of the steering control in the first driving assistance mode or the second driving assistance mode.

2. The vehicle control system according to claim 1, wherein the first driving assistance mode and the second driving assistance mode are modes for executing speed control and steering control of the host vehicle as the automated driving control.

3. The vehicle control system according to claim 1, further comprising a display configured to display a first screen when the driving mode is neither the first driving assistance mode nor the second driving assistance mode and display a second screen different from the first screen when the driving mode is the first driving assistance mode or the second driving assistance mode.

4. The vehicle control system according to claim 1, wherein the processor is further configured to execute the program to:
execute at least steering control for keeping a travel lane as the automated driving control when the driving mode is switched from the second driving assistance mode to the first driving assistance mode.

5. A vehicle control method comprising causing an in-vehicle computer mounted in a vehicle including a human machine interface configured to output information, a steering wheel configured to receive an operation of issuing an instruction for steering of a host vehicle, and a grip sensor or steering torque sensor configured to detect that the steering wheel has been operated by an occupant to:
execute automated driving control for automatically controlling traveling of the host vehicle;
switch a driving mode for executing the automated driving control to one of a plurality of driving modes including a first driving assistance mode in which the occupant is requested to operate the steering wheel and a second driving assistance mode having a lower degree to which the operation of the steering wheel is requested than the first driving assistance mode;
cause the human machine interface to output prescribed information when the driving mode is switched from the second driving assistance mode to the first driving assistance mode;
continue the second driving assistance mode until the grip sensor or steering torque sensor detects that the steering wheel has been operated after the human machine interface outputs the prescribed information and switch the driving mode to the first driving assistance mode by cancelling the second driving assistance mode when the grip sensor or steering torque sensor detects that the steering wheel has been operated;
execute driving assistance control for controlling one or both of speed control and steering control of the host vehicle so that a driving operation on the steering wheel is assisted;
switch the driving mode to a third driving assistance mode to execute the driving assistance control when a prescribed condition is satisfied, and
wherein maximum steering torque of the steering control in the third driving assistance mode is less than maximum steering torque of the steering control in the first driving assistance mode or the second driving assistance mode.

6. A computer-readable non-transitory storage medium storing a program for causing an in-vehicle computer mounted in a vehicle including a human machine interface configured to output information, a steering wheel configured to receive an operation of issuing an instruction for steering of a host vehicle, and a grip sensor or steering torque sensor configured to detect that the steering wheel has been operated by an occupant to execute:
executing automated driving control for automatically controlling traveling of the host vehicle;
switching a driving mode for executing the automated driving control to one of a plurality of driving modes including a first driving assistance mode in which the occupant is requested to operate the steering wheel and a second driving assistance mode having a lower degree to which the operation of the steering wheel is requested than the first driving assistance mode;
causing the human machine interface to output prescribed information when the driving mode is switched from the second driving assistance mode to the first driving assistance mode;
continuing the second driving assistance mode until the grip sensor or steering torque sensor detects that the steering wheel has been operated after the human machine interface outputs the prescribed information and switching the driving mode to the first driving assistance mode by cancelling the second driving assistance mode when the grip sensor or steering torque sensor detects that the steering wheel has been operated;
executing driving assistance control for controlling one or both of speed control and steering control of the host vehicle so that a driving operation on the steering wheel is assisted;
switching the driving mode to a third driving assistance mode to execute the driving assistance control when a prescribed condition is satisfied, and
wherein maximum steering torque of the steering control in the third driving assistance mode is less than maximum steering torque of the steering control in the first driving assistance mode or the second driving assistance mode.

* * * * *